US008229252B2

(12) United States Patent
Cohen et al.

(10) Patent No.: US 8,229,252 B2
(45) Date of Patent: Jul. 24, 2012

(54) ELECTRONIC ASSOCIATION OF A USER EXPRESSION AND A CONTEXT OF THE EXPRESSION

(75) Inventors: Alexander J. Cohen, Mill Valley, CA (US); Edward K. Y. Jung, Bellevue, WA (US); Royce A. Levien, Lexington, MA (US); Robert W. Lord, Seattle, WA (US); Mark A. Malamud, Seattle, WA (US); John D. Rinaldo, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 1679 days.

(21) Appl. No.: 11/114,245

(22) Filed: Apr. 25, 2005

(65) Prior Publication Data
US 2006/0209175 A1    Sep. 21, 2006

Related U.S. Application Data

(63) Continuation-in-part of application No. 11/083,567, filed on Mar. 18, 2005, and a continuation-in-part of application No. 11/097,977, filed on Mar. 31, 2005, and a continuation-in-part of application No. 11/097,980, filed on Mar. 31, 2005.

(51) Int. Cl.
*G06K 9/00* (2006.01)
*G06K 9/18* (2006.01)
*G06K 9/22* (2006.01)
*G06K 9/20* (2006.01)
*G06F 3/033* (2006.01)
*H04N 1/04* (2006.01)

(52) U.S. Cl. ........ 382/313; 382/100; 382/181; 382/182; 382/186; 382/187; 382/188; 382/321; 382/314; 382/315; 345/179; 358/474; 358/488

(58) Field of Classification Search ........................ None
See application file for complete search history.

(56) References Cited

U.S. PATENT DOCUMENTS

| 1,550,048 | A | 8/1925 | Ruben |
| 4,053,024 | A | 10/1977 | Hoyt |
| 4,384,196 | A | 5/1983 | McCumber et al. |
| 4,475,240 | A | 10/1984 | Brogardh et al. |

(Continued)

FOREIGN PATENT DOCUMENTS

JP         07334639 A      12/1995

OTHER PUBLICATIONS

Shneiderman et al.; "Direct Annotation: A Drag-and-Drop Strategy for Labeling Photos"; bearing a date of 2000; pp. 88-95; ® 2000 IEEE.

(Continued)

*Primary Examiner* — Michelle Entezari

(57) ABSTRACT

Embodiments include an apparatus, device, system, computer-program product, and method. In an embodiment, a method is provided. The method includes receiving an annotation environment signal that includes a context information indicative of a recognizable aspect of an item. The method also includes receiving an expression signal that includes an annotation information indicative of a user expression associated with the recognizable aspect of the item. The method further includes electronically associating the context information indicative of a recognizable aspect of an item and the annotation information indicative of a user expression associated with the recognizable aspect of the item.

63 Claims, 49 Drawing Sheets

U.S. PATENT DOCUMENTS

| | | | |
|---|---|---|---|
| 4,523,235 A | 6/1985 | Rajchman | |
| 4,685,142 A | 8/1987 | Ooi et al. | |
| 4,703,511 A | 10/1987 | Conoval | |
| 4,728,784 A | 3/1988 | Stewart | |
| 4,746,937 A | 5/1988 | Realis Luc et al. | |
| 4,799,560 A | 1/1989 | Kobayashi | |
| 4,829,431 A | 5/1989 | Ott et al. | |
| 4,839,634 A | 6/1989 | More et al. | |
| 4,864,618 A | 9/1989 | Wright et al. | |
| D306,316 S | 2/1990 | Shintani | |
| 4,927,766 A | 5/1990 | Auerbach et al. | |
| 5,022,086 A * | 6/1991 | Crane et al. | 382/121 |
| 5,064,280 A | 11/1991 | Ringens et al. | |
| 5,109,439 A | 4/1992 | Froessl | |
| 5,129,320 A | 7/1992 | Fadner | |
| 5,215,397 A | 6/1993 | Taguchi et al. | |
| 5,227,985 A | 7/1993 | DeMenthon | |
| 5,250,804 A | 10/1993 | Chin | |
| 5,303,312 A | 4/1994 | Comerford et al. | |
| 5,311,207 A | 5/1994 | Kusumoto et al. | |
| 5,325,444 A | 6/1994 | Cass et al. | |
| 5,331,137 A | 7/1994 | Swartz | |
| 5,339,412 A | 8/1994 | Fueki | |
| 5,339,734 A | 8/1994 | Mustafa et al. | |
| 5,369,714 A | 11/1994 | Withgott et al. | |
| 5,434,371 A | 7/1995 | Brooks | |
| 5,454,046 A | 9/1995 | Carman, II | |
| 5,501,535 A | 3/1996 | Hastings et al. | |
| 5,509,966 A | 4/1996 | Sykes | |
| 5,513,278 A | 4/1996 | Hashizume et al. | |
| 5,521,722 A | 5/1996 | Colvill et al. | |
| 5,634,730 A | 6/1997 | Bobry | |
| 5,659,639 A | 8/1997 | Mahoney et al. | |
| 5,687,259 A | 11/1997 | Linford | |
| 5,729,618 A | 3/1998 | Fujisawa et al. | |
| 5,740,271 A | 4/1998 | Kunkler et al. | |
| 5,754,434 A | 5/1998 | Delfer et al. | |
| 5,758,574 A | 6/1998 | Bernardo et al. | |
| 5,779,482 A | 7/1998 | Fukumoto | |
| 5,793,397 A | 8/1998 | Barker et al. | |
| 5,823,572 A | 10/1998 | NakaMats | |
| 5,823,691 A | 10/1998 | Langner | |
| 5,828,783 A | 10/1998 | Ishigaki | |
| 5,860,754 A | 1/1999 | Garland et al. | |
| 5,864,635 A | 1/1999 | Zetts et al. | |
| 5,880,451 A | 3/1999 | Smith et al. | |
| 5,889,888 A | 3/1999 | Marianetti, II et al. | |
| 5,970,455 A | 10/1999 | Wilcox et al. | |
| 5,974,204 A | 10/1999 | Lin et al. | |
| 5,978,523 A | 11/1999 | Linford et al. | |
| 5,981,884 A | 11/1999 | Sato et al. | |
| 5,999,666 A | 12/1999 | Gobeli et al. | |
| 6,004,048 A | 12/1999 | Moh et al. | |
| 6,005,945 A | 12/1999 | Whitehouse | |
| 6,031,936 A | 2/2000 | Nakamura | |
| 6,044,165 A | 3/2000 | Perona et al. | |
| 6,050,490 A | 4/2000 | Leichner et al. | |
| 6,055,332 A | 4/2000 | Aitani et al. | |
| 6,070,805 A | 6/2000 | Kaufman et al. | |
| 6,122,042 A | 9/2000 | Wunderman et al. | |
| 6,128,414 A | 10/2000 | Liu | |
| 6,181,836 B1 | 1/2001 | Delean | |
| 6,188,789 B1 | 2/2001 | Marianetti, II et al. | |
| 6,195,053 B1 | 2/2001 | Kodukula et al. | |
| 6,246,382 B1 | 6/2001 | Maguire, Jr. | |
| 6,259,043 B1 | 7/2001 | Clary et al. | |
| 6,262,804 B1 | 7/2001 | Friend et al. | |
| 6,310,615 B1 | 10/2001 | Davis et al. | |
| 6,330,057 B1 | 12/2001 | Lederer et al. | |
| 6,348,914 B1 | 2/2002 | Tuli | |
| 6,376,783 B1 | 4/2002 | Vaghi | |
| 6,377,249 B1 | 4/2002 | Mumford | |
| 6,395,234 B1 | 5/2002 | Hunnell et al. | |
| 6,405,929 B1 * | 6/2002 | Ehrhart et al. | 235/486 |
| 6,408,092 B1 | 6/2002 | Sites | |
| 6,446,208 B1 | 9/2002 | Gujar et al. | |
| 6,452,683 B1 | 9/2002 | Kinrot et al. | |
| 6,454,482 B1 | 9/2002 | Silverbrook et al. | |
| 6,456,740 B1 | 9/2002 | Carini et al. | |
| 6,486,874 B1 | 11/2002 | Muthuswamy et al. | |
| 6,502,912 B1 | 1/2003 | Bernard et al. | |
| 6,509,893 B1 | 1/2003 | Akhlagi et al. | |
| 6,525,716 B1 | 2/2003 | Makino | |
| 6,550,685 B1 | 4/2003 | Kindberg | |
| 6,594,406 B1 | 7/2003 | Hecht | |
| 6,603,464 B1 | 8/2003 | Rabin | |
| 6,649,849 B2 | 11/2003 | Bass et al. | |
| 6,654,496 B1 | 11/2003 | Goldberg | |
| 6,666,376 B1 | 12/2003 | Ericson | |
| 6,686,579 B2 | 2/2004 | Fagin et al. | |
| 6,686,910 B2 | 2/2004 | O'Donnell, Jr. | |
| 6,703,570 B1 | 3/2004 | Russell et al. | |
| 6,715,687 B2 | 4/2004 | Berson | |
| 6,741,335 B2 | 5/2004 | Kinrot et al. | |
| 6,752,316 B2 | 6/2004 | Mizoguchi | |
| 6,788,815 B2 | 9/2004 | Lui et al. | |
| 6,791,537 B1 | 9/2004 | Shim et al. | |
| 6,798,403 B2 * | 9/2004 | Kitada et al. | 345/173 |
| 6,806,867 B1 | 10/2004 | Arruda et al. | |
| 6,808,330 B1 | 10/2004 | Lapstun et al. | |
| 6,816,615 B2 | 11/2004 | Lui et al. | |
| 6,826,551 B1 | 11/2004 | Clary et al. | |
| 6,836,555 B2 | 12/2004 | Ericson et al. | |
| 6,839,453 B1 | 1/2005 | McWilliam et al. | |
| 6,839,464 B2 | 1/2005 | Hawkins et al. | |
| 6,864,880 B2 | 3/2005 | Hugosson et al. | |
| 6,885,759 B2 | 4/2005 | Cox et al. | |
| 6,897,853 B2 | 5/2005 | Keely et al. | |
| 6,917,722 B1 | 7/2005 | Bloomfield | |
| 6,921,223 B2 | 7/2005 | Marschand | |
| 6,925,565 B2 | 8/2005 | Black | |
| 6,931,153 B2 | 8/2005 | Nakao et al. | |
| 6,940,617 B2 | 9/2005 | Ma et al. | |
| RE38,884 E | 11/2005 | Kakii | |
| 6,980,704 B2 | 12/2005 | Kia et al. | |
| 6,982,808 B1 | 1/2006 | Ogg et al. | |
| 6,991,164 B2 | 1/2006 | Lemelson et al. | |
| 6,992,655 B2 | 1/2006 | Ericson et al. | |
| 7,002,712 B2 | 2/2006 | Barker et al. | |
| 7,015,950 B1 | 3/2006 | Pryor | |
| 7,043,056 B2 | 5/2006 | Edwards et al. | |
| 7,047,419 B2 | 5/2006 | Black | |
| 7,082,213 B2 | 7/2006 | Black | |
| 7,092,934 B1 | 8/2006 | Mahan et al. | |
| 7,094,977 B2 | 8/2006 | Ericson et al. | |
| 7,098,898 B2 | 8/2006 | Hattori et al. | |
| 7,120,320 B2 | 10/2006 | Petterson et al. | |
| 7,158,678 B2 | 1/2007 | Nagel et al. | |
| 7,167,164 B2 | 1/2007 | Ericson et al. | |
| 7,176,896 B1 | 2/2007 | Fahraeus et al. | |
| 7,197,174 B1 | 3/2007 | Koizumi | |
| 7,203,384 B2 | 4/2007 | Carl | |
| 7,239,747 B2 * | 7/2007 | Bresler et al. | 382/176 |
| 7,262,764 B2 | 8/2007 | Wang et al. | |
| 7,289,105 B2 | 10/2007 | Dort | |
| 7,289,110 B2 | 10/2007 | Hansson | |
| 7,289,643 B2 | 10/2007 | Brunk et al. | |
| 7,295,193 B2 | 11/2007 | Fahraeus | |
| D558,166 S | 12/2007 | Black | |
| 7,319,799 B2 | 1/2008 | Berche et al. | |
| 7,322,526 B1 | 1/2008 | Koenck | |
| 7,328,995 B2 | 2/2008 | Campagna et al. | |
| 7,341,456 B2 | 3/2008 | McAdams et al. | |
| 7,345,673 B2 | 3/2008 | Ericson et al. | |
| 7,353,453 B1 | 4/2008 | Simmons | |
| 7,360,706 B2 * | 4/2008 | Zhu et al. | 235/462.22 |
| 7,363,505 B2 | 4/2008 | Black | |
| 7,369,677 B2 * | 5/2008 | Petrovic et al. | 382/100 |
| 7,376,630 B2 | 5/2008 | Blair et al. | |
| 7,408,536 B2 | 8/2008 | Hugosson et al. | |
| 7,433,499 B2 | 10/2008 | Kim | |
| 7,447,537 B1 | 11/2008 | Funda et al. | |
| 7,456,820 B1 | 11/2008 | Lapstun et al. | |
| 7,545,951 B2 | 6/2009 | Davis et al. | |
| 7,609,410 B2 | 10/2009 | Lapstun et al. | |
| 7,639,898 B1 | 12/2009 | Chan | |
| 7,649,659 B2 * | 1/2010 | Nabemoto et al. | 358/538 |

| | | |
|---|---|---|
| 7,965,864 B2 | 6/2011 | Davis et al. |
| 7,991,206 B1 | 8/2011 | Kaminski, Jr. |
| 8,130,951 B2 | 3/2012 | Tian |
| 2002/0012134 A1 | 1/2002 | Calaway |
| 2002/0031243 A1 | 3/2002 | Schiller et al. |
| 2002/0040817 A1 | 4/2002 | LeKuch et al. |
| 2002/0044152 A1 | 4/2002 | Abbott, III et al. |
| 2002/0044689 A1 | 4/2002 | Roustaei et al. |
| 2002/0064308 A1 | 5/2002 | Altman et al. |
| 2002/0079371 A1 | 6/2002 | Bobrow et al. |
| 2002/0085843 A1 | 7/2002 | Mann |
| 2002/0105484 A1 | 8/2002 | Navab et al. |
| 2002/0126105 A1 | 9/2002 | O'Donnell, Jr. |
| 2002/0126872 A1 | 9/2002 | Brunk et al. |
| 2002/0143994 A1 | 10/2002 | Sun et al. |
| 2002/0156902 A1 | 10/2002 | Crandall |
| 2002/0183890 A1 | 12/2002 | Bass et al. |
| 2002/0196978 A1 | 12/2002 | Hawkins et al. |
| 2003/0001020 A1 | 1/2003 | Kardach |
| 2003/0001950 A1* | 1/2003 | Eriksson .......... 348/61 |
| 2003/0024375 A1 | 2/2003 | Sitrick |
| 2003/0043266 A1 | 3/2003 | Yoshikawa et al. |
| 2003/0048948 A1 | 3/2003 | Confer et al. |
| 2003/0051362 A1 | 3/2003 | Buckman et al. |
| 2003/0066691 A1 | 4/2003 | Jelinek et al. |
| 2003/0081038 A1 | 5/2003 | Valero |
| 2003/0090734 A1 | 5/2003 | Lapstun et al. |
| 2003/0099398 A1 | 5/2003 | Izumi |
| 2003/0115470 A1 | 6/2003 | Cousins et al. |
| 2003/0144034 A1 | 7/2003 | Hack et al. |
| 2003/0146286 A1 | 8/2003 | Berson |
| 2003/0148539 A1 | 8/2003 | van Dam et al. |
| 2003/0151596 A1 | 8/2003 | Moyne et al. |
| 2003/0173121 A1 | 9/2003 | Zloter et al. |
| 2003/0184649 A1 | 10/2003 | Mann |
| 2003/0187458 A1 | 10/2003 | Carlson, II |
| 2003/0193544 A1 | 10/2003 | Eguchi |
| 2003/0218070 A1 | 11/2003 | Tsikos et al. |
| 2004/0002926 A1 | 1/2004 | Coffy et al. |
| 2004/0005915 A1 | 1/2004 | Hunter |
| 2004/0013454 A1 | 1/2004 | Manduley |
| 2004/0023024 A1 | 2/2004 | Landberg et al. |
| 2004/0035936 A1 | 2/2004 | Hoson et al. |
| 2004/0036699 A1 | 2/2004 | Nettamo |
| 2004/0037463 A1 | 2/2004 | Calhoun et al. |
| 2004/0070573 A1 | 4/2004 | Graham |
| 2004/0085301 A1 | 5/2004 | Furukawa et al. |
| 2004/0085358 A1 | 5/2004 | Tolmer et al. |
| 2004/0093330 A1 | 5/2004 | Westphal |
| 2004/0101178 A1 | 5/2004 | Fedorovskaya et al. |
| 2004/0103111 A1 | 5/2004 | Miller et al. |
| 2004/0108381 A1 | 6/2004 | Elliott et al. |
| 2004/0120404 A1 | 6/2004 | Sugahara et al. |
| 2004/0130614 A1 | 7/2004 | Valliath et al. |
| 2004/0131252 A1 | 7/2004 | Seto |
| 2004/0133189 A1 | 7/2004 | Sakurai |
| 2004/0135776 A1 | 7/2004 | Brouhon |
| 2004/0140965 A1 | 7/2004 | Wang et al. |
| 2004/0144575 A1 | 7/2004 | Zloter et al. |
| 2004/0164970 A1 | 8/2004 | Benard et al. |
| 2004/0179000 A1 | 9/2004 | Fermgard et al. |
| 2004/0182925 A1 | 9/2004 | Anderson et al. |
| 2004/0210444 A1 | 10/2004 | Arenburg et al. |
| 2004/0212848 A1 | 10/2004 | Lapstun et al. |
| 2004/0218738 A1 | 11/2004 | Arai et al. |
| 2004/0225282 A1 | 11/2004 | Ness |
| 2004/0236244 A1 | 11/2004 | Allen et al. |
| 2004/0236315 A1 | 11/2004 | Hered |
| 2004/0241424 A1 | 12/2004 | Barbera-Guillem |
| 2004/0260507 A1 | 12/2004 | Chang et al. |
| 2005/0013104 A1 | 1/2005 | Feague et al. |
| 2005/0024346 A1 | 2/2005 | Dupraz et al. |
| 2005/0024690 A1 | 2/2005 | Picciotto et al. |
| 2005/0030297 A1 | 2/2005 | Burstrom et al. |
| 2005/0033724 A1 | 2/2005 | Antognini et al. |
| 2005/0041100 A1 | 2/2005 | Maguire |
| 2005/0052434 A1 | 3/2005 | Kolmykov-Zotov et al. |
| 2005/0060644 A1 | 3/2005 | Patterson |
| 2005/0064503 A1 | 3/2005 | Lapstun et al. |
| 2005/0083516 A1 | 4/2005 | Baker |
| 2005/0138541 A1 | 6/2005 | Euchner et al. |
| 2005/0148828 A1 | 7/2005 | Lindsay |
| 2005/0152602 A1 | 7/2005 | Chen et al. |
| 2005/0194444 A1 | 9/2005 | Gieske |
| 2005/0199724 A1 | 9/2005 | Lubow |
| 2005/0202844 A1 | 9/2005 | Jabri et al. |
| 2005/0231482 A1 | 10/2005 | Theytaz et al. |
| 2005/0246337 A1 | 11/2005 | Forman et al. |
| 2005/0251397 A1 | 11/2005 | Zanovitch et al. |
| 2005/0286743 A1* | 12/2005 | Kurzweil et al. .......... 382/114 |
| 2006/0001667 A1 | 1/2006 | La Viola, Jr. et al. |
| 2006/0018546 A1 | 1/2006 | Lagardere et al. |
| 2006/0036557 A1 | 2/2006 | Mattern |
| 2006/0045308 A1* | 3/2006 | Abrams et al. .......... 382/100 |
| 2006/0067572 A1 | 3/2006 | White et al. |
| 2006/0078866 A1 | 4/2006 | Marggraff et al. |
| 2006/0086811 A1 | 4/2006 | Yoshida et al. |
| 2006/0109237 A1 | 5/2006 | Morita et al. |
| 2006/0109238 A1* | 5/2006 | Lau et al. .......... 345/156 |
| 2006/0138211 A1 | 6/2006 | Lubow |
| 2006/0149296 A1 | 7/2006 | Stanners |
| 2006/0149549 A1 | 7/2006 | Napper |
| 2006/0155589 A1 | 7/2006 | Lane et al. |
| 2006/0159345 A1 | 7/2006 | Clary et al. |
| 2006/0209051 A1 | 9/2006 | Cohen et al. |
| 2006/0210172 A1 | 9/2006 | Sutanto et al. |
| 2006/0219776 A1 | 10/2006 | Finn |
| 2006/0238877 A1 | 10/2006 | Ashkenazi et al. |
| 2006/0239532 A1* | 10/2006 | Petrovic et al. .......... 382/100 |
| 2006/0267965 A1 | 11/2006 | Clary |
| 2006/0275068 A1 | 12/2006 | Breton |
| 2006/0283962 A1 | 12/2006 | Silverstein |
| 2006/0285147 A1 | 12/2006 | Wolfman et al. |
| 2007/0046649 A1 | 3/2007 | Reiner |
| 2007/0184422 A1 | 8/2007 | Takahashi |
| 2007/0220494 A1 | 9/2007 | Spooner |
| 2007/0253614 A1 | 11/2007 | Jung et al. |
| 2007/0273674 A1 | 11/2007 | Cohen et al. |
| 2007/0273918 A1 | 11/2007 | Gonzalez |
| 2007/0286486 A1 | 12/2007 | Goldstein |
| 2008/0088606 A1 | 4/2008 | Cohen et al. |
| 2008/0088607 A1 | 4/2008 | Sandstrom et al. |
| 2008/0141117 A1 | 6/2008 | King et al. |
| 2009/0098925 A1 | 4/2009 | Gagner et al. |

OTHER PUBLICATIONS

"Pen-One, Inc. Announces Biometric Pen Developer's Kit at CARTES Worldwide Card and Security Conference"; Breaking News Nov. 2, 2004 Paris, France; pp. 1-2; printed on Dec. 13, 2006; bearing dates of 2001-2004; located at http://pen-one.com/html/Informatica_SDK_110204.htm; Pen One.

"Pen-One, Inc. Selects Award Winning P9 Design to Develop New Fingerprint Sensing Pen"; Breaking News Jul. 27, 2004 10:00 AM Southfield, MI (For Release Jul. 27, 2004); pp. 1-2; printed on Dec. 13, 2006; bearing dates of 2001-2004; located at http://pen-one.com/html/biometric_P9_news_072604.htm; Pen One.

"Pen-One, Inc. to Unveil Connaitre Biometric Pen at CARTES Worldwide Card and Security Conference"; Breaking News Oct. 20, 2004 Southfield, MI (For Release Oct. 22, 2004); pp. 1-2; printed on Dec. 13, 2006; bearing dates of 2001-2004; located at http://pen-one.com/html/connaitre_news_102004.htm; Pen One.

"Pen-One News Releases Worldwide Pen-One in the News . . . "; pp. 1-2; printed on Dec. 13, 2006; bearing dates of 2001-2004; located at http://pen-one.com/html/Pen-One_in_the_news.htm.; Pen One.

"The World's First Fingerprint Sensing Pen! Pen One in the news . . . "; pp. 1-2; printed on Dec. 13, 2006; bearing dates of 2001-2004; located at http://pen-one.com/index.html; Pen One.

"World's First Use of Fraud Resistant Fingerprint Scanning Biometric Pen"; May 6, 2004; pp. 1-2 ; printed on Dec. 13, 2006; bearing dates of 2001-2004; located at http://pen-one.com/html/biometric_news_050604.html; Pen One.

U.S. Appl. No. 11/603,336, Cohen et al.

U.S. Appl. No. 11/603,334, Cohen et al.

U.S. Appl. No. 11/603,333, Cohen et al.

U.S. Appl. No. 11/603,332, Cohen et al.
U.S. Appl. No. 11/603,289, Cohen et al.
U.S. Appl. No. 11/603,275, Cohen et al.
U.S. Appl. No. 11/580,218, Cohen et al.
U.S. Appl. No. 11/580,217, Cohen et al.
U.S. Appl. No. 11/167,072, Cohen et al.
U.S. Appl. No. 11/167,058, Cohen et al.
U.S. Appl. No. 11/166,780, Cohen et al.
U.S. Appl. No. 11/166,035, Cohen et al.
U.S. Appl. No. 11/137,716, Cohen et al.
U.S. Appl. No. 11/137,694, Cohen et al.
U.S. Appl. No. 11/137,687, Cohen et al.
Heim, Kristi; "Stroke of a pen captures data"; The Seattle Times; Apr. 10, 2006; pp. 1-3; The Seattle Times Company; Seattle; U.S.A.; located at http://seattletimes.nwsource.com/html/businesstechnology/2002921837_smartpen10.html; printed on Apr. 11, 2006.
"AirPen Storage Notebook"; Pegasus Technologies; pp. 1-2; bearing a date of Jul. 1, 2004; located at: http://www.pegatech.com/Articles/Article.asp?ArticleID=82&CategoryID=8; printed on Jan. 28, 2005.
Bricklin, Dan; "About Tablet Computing Old and New"; Dan Bricklin's Web Site: www.bricklin.com; bearing dates of Nov. 22, 2002, 1999-2004; pp. 1-7; located at: http://www.bricklin.com/tabletcomputing.htm; printed on Dec. 30, 2004.
Buderi, Robert; Huang, Gregory; "Microsoft plumbs China for IT talent"; NewScientist.com; bearing a date of Nov. 22, 2004; pp. 1-2; located at: www.Newscientist.com; printed on Jan. 7, 2005.
Handschuh, Siegfried; Staab, Steffen; Maedche, Alexander; "CREAM—Creating relational metadata with a component-based, ontology-driven annotation framework"; Institute AIFB, University of Karlsruhe;Ontoprise GmbH; FZI Research Center for Information Technologies; pp. 1-8; Karlsruhe, Germany; located at: http://www.aifb.uni-karlsruhe.de/WBS?Sha/papers/kcap2001-annotate-sub.pdf; printed on Jan. 26, 2005.
"Extended Abstract"; pp. 1-3; bearing a date of Sep. 16, 2003; located at : http://csidc.des.elf.stuba.sk/ips/project.html; printed on Jan. 3, 2005.
"Logitech® io™ personal digital pen"; Anotofunctionality.com—Logitech; bearing dates of Jul. 5, 2004 and 1997-2004; p. 1 of 1; located at: http://www.anotofunctionality.com/Default.asp?id=54; Anoto AB; printed on Jan. 12, 2005.
"Mobile Note Taker"; Pegasus—Digital Pens; bearing a date of 2003; pp. 1-4; located at: https://www.pegatech.com/shop/; Pegasus Technologies Ltd.; printed on Jan. 28, 2005.
"Mobile Note Taker"; Pegasus—Digital Pens; bearing a date of 2003; pp. 1-3; located at: https://www.pegatech.com/shop/; Pegasus Technologies Ltd.; printed on Mar. 7, 2005.
"Nokia Digital Pen—As Personal as Your Signature"; Nokia—Messaging Enhancements—Nokia Digital Pen; bearing a date of 2004; p. 1 of 1 located at: http://www.nokia.com/nokia/0,5184,5787,00.html; Nokia.com; printed on Jan. 12, 2005.
"OTM Technologies: Products, VPen™—How does it work?"; OTM Technologies—VPen; pp. 1-2; located at: http://www.otmtech.com/vpen3.asp; printed on Jan. 3, 2005.
"OTM Technologies: Products, VPen—What is it?"; OTM Technologies—VPen; pp. 1-2; located at: http://www.otmtech.com/vpen.asp; printed on Jan. 3, 2005.

"PC Notes Taker tracking technology"; 2P; pp. 1-2; located at: http://www.pc-notetaker.com/; printed on Jan. 3, 2005.
Poupyrev, Ivan; Tomokazu, Numada; Weghorst, Suzanne; "Virtual Notepad: Handwriting in Immersive VR"; IS Lab, Hiroshima University; HIT Lab, University of Washington; bearing a date of Mar. 1998; pp. 1-7; Higashi-Hiroshima, Japan; Seattle, WA; printed on Jan. 3, 2005.
Stroud, Michael; "DigiPens Search for Write Market" Wired News; bearing a date of Dec. 21, 2002; pp. 1-2; located at: http://www.wired.com/news/print/0,1294,56951,00.html; printed on Jan. 12, 2005.
VPEN Brochure; "VPEN—Revolutionizing human interaction with the digital world™; OTM Technologies—Light Speed Innovation"; pp. 1-6; located at: http://www.otmtech.com/upload/publications/VPenBrochureFinal.pdf; printed on Jan. 3, 2005.
W., Daniel; Pegasus—Digital Pens : "News & Events>Review—Private review"; bearing dates of Feb. 1, 2004, and 2003; pp. 1-5; located at: http://www.pegatech.com/Articles/Article.asp?ArticleID=68&CategorgyID=55; Pegasus Technologies; printed on Jan. 3, 2005.
Zhong, Youliang; Shen, Jianliang; Jin, Jesse S.; Zhang, Guoyin; "Sonar-based Visual Information Architecture for Handwriting Information Processing"; School of Computer Science & Engineering, University of New South Wales, Computer Science & Tech School of Harbin Engineering University; pp. 1-6; . Australia, China; printed on Jan. 3, 2005.
"CAMEDIA Digital Camera AZ-1 Reference Manual"; Olympus Corporation; bearing a date of 2004; pp. 1-212.
Excerpts from The Oxford English Dictionary $2^{nd}$ Edition; bearing a date of 1989; printed on Apr. 1, 2009; pp. 1-4 and pp. 1-2.
"6 tips for adding international characters and symbols to your document, for Microsoft Office Word 2003, Microsoft Word 2000 and 2002"; Microsoft Office Online; Bearing a date of 2009; pp. 1-6; Microsoft Corporation; printed on Jun. 6, 2009; located at: http://office.microsoft.com/en-us/world/HA011268771033.aspx.
Definition of "tag"; Merriam Webster Online Dictionary; pp. 1-2; located at http://www.meriam-webster.com/dictionary/tag, Apr. 2009.
U.S. Appl. No. 11/713,092, Cohen et al.
U.S. Appl. No. 12/806,115, filed Aug. 5, 2010, Cohen et al.
U.S. Appl. No. 12/806,112, filed Aug. 5, 2010, Cohen et al.
U.S. Appl. No. 12/806,054, filed Aug. 4, 2010, Cohen et al.
U.S. Appl. No. 12/924,991, Cohen et al.
U.S. Appl. No. 13/135,206, Cohen et al.
U.S. Appl. No. 13/007,982, filed Jan. 17, 2011, Cohen et al.
Calhoun et al.; "Recognizing Multi-Stroke Symbols"; AAAI Technical Report SS-02-08; bearing a date of 2002; 9 pages; AAAI.
Liang et al.; "Segmentation of Handwritten Interference Marks Using Multiple Directional Stroke Planes and Reformalized Morphological Approach"; IEEE Transactions On Image Processing; Aug. 1997; pp. 1195-1202; vol. 6, No. 8; IEEE.
Stevenson et al.; "Combining Weak Knowledge Sources for Sense Disambiguation"; Natural Language Processing; bearing a date of 1999; pp. 884-889.

\* cited by examiner

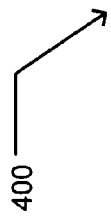

FIG. 11

402 A computer-readable medium.

404 A computer program product embodied in a code and operable to execute a computer process in a handheld device, the computer process comprising:
a) generating in the handheld device a first data set indicative of a handwriting movement by a writing element physically associated with the handheld device; and
b) generating in the handheld device a second data set indicative of a content portion of a document proximate to the handwriting movement by the writing element.

406 c) Saving in a digital storage medium physically associated with the handheld device the first data set indicative of a handwriting movement and the second data set indicative of a content portion of the document proximate to the handwriting movement.

408 c) Transmitting the first data set indicative of the handwriting movement.

410 c) Transmitting the second data set indicative of a content portion of the document proximate to the handwriting movement.

955 Context module operable to generate a first information indicative of a recognizable aspect of an item.

960 Annotation module operable to generate a second information indicative of a user expression associated with the recognizable aspect of an item.

965 Communications module operable to transmit at least one of the first information indicative of a recognizable aspect of an item and the second information indicative of a user expression associated with the recognizable aspect of an item.

970 Storage module operable to save at least one of the first information indicative of a recognizable aspect of an item and the second information indicative of a user expression associated with the recognizable aspect of an item.

1502 A computer-readable signal-bearing media.

1504 Program instructions configured to perform a process that associates information in a computer system, the process comprising:
a) receiving an annotation environment signal that includes a context information indicative of a recognizable aspect of an item;
b) receiving an expression signal that includes an annotation information indicative of a user expression associated with the recognizable aspect of the item; and
c) associating the context information indicative of a recognizable aspect of an item and the annotation information indicative of a user expression associated with the recognizable aspect of the item.

1506 d) recognizing the recognizable aspect of an item in response to the context information indicative of a recognizable aspect of an item.

1508 d) recognizing the user expression associated with the recognizable aspect of the item in response to the annotation information indicative of a user expression associated with the recognizable aspect of the item.

1510 d) requesting a recognition of the recognizable aspect of the item from a remote computing device; and
e) receiving the recognition of the recognizable aspect of the item from the remote computing device.

1512 d) saving the associated context information indicative of a recognizable aspect of an item and annotation information indicative of a user expression associated with the recognizable aspect of the item.

1514 The signal-bearing media includes a computer storage media.

1516 The signal-bearing media includes a communication media.

1652  A computer-readable signal-bearing media.

1654  Program instructions configured to perform a process that associates information in a computer system, the process comprising:
a) receiving information generated by a handheld writing device indicative of a handwriting movement by a writing element of the handheld writing device;
b) receiving information generated by the handheld writing device indicative of a content portion of a document proximate to the handwriting movement; and
c) generating an annotation by logically linking the handwriting movement and the content portion of a document proximate to the handwriting movement.

1656 The signal-bearing media includes a computer storage media.

1658 The signal-bearing media includes a communication media.

ELECTRONIC ASSOCIATION OF A USER EXPRESSION AND A CONTEXT OF THE EXPRESSION

PRIORITY CLAIM, CROSS-REFERENCE TO RELATED APPLICATION, AND INCORPORATION BY REFERENCE

The present application is related to, claims the earliest available effective filing date(s) from (e.g., claims earliest available priority dates for other than provisional patent applications; claims benefits under 35 U.S.C. §119(e) for provisional patent applications), and incorporates by reference in its entirety all subject matter of the herein listed application(s); the present application also claims the earliest available effective filing date(s) from, and also incorporates by reference in its entirety all subject matter of any and all parent, grandparent, great-grandparent, etc. applications of the herein listed application(s). The United States Patent Office (USPTO) has published a notice to the effect that the USPTO's computer programs require that patent applicants reference both a serial number and indicate whether an application is a continuation or continuation in part. The present applicant entity has provided below a specific reference to the application(s) from which priority is being claimed as recited by statute. Applicant entity understands that the statute is unambiguous in its specific reference language and does not require either a serial number or any characterization such as "continuation" or "continuation-in-part." Notwithstanding the foregoing, applicant entity understands that the USPTO's computer programs have certain data entry requirements, and hence applicant entity is designating the present application as a continuation in part of its parent applications, but expressly points out that such designations are not to be construed in any way as any type of commentary and/or admission as to whether or not the present application contains any new matter in addition to the matter of its parent application(s).

1. For purposes of the USPTO extra-statutory requirements, the present application constitutes a continuation in part of currently co-pending U.S. patent application entitled ELECTRONIC ACQUISITION OF A HAND FORMED EXPRESSION AND A CONTEXT OF THE EXPRESSION, naming Alexander J. Cohen, Edward K. Y. Jung, Royce A. Levien, Robert W. Lord, Mark A. Malamud, and John D. Rinaldo, Jr., as inventors, filed Mar. 18, 2005, Ser. No. 11/083,567.
2. For purposes of the USPTO extra-statutory requirements, the present application constitutes a continuation in part of currently co-pending U.S. patent application entitled ACQUISITION OF A USER EXPRESSION AND A CONTEXT OF THE EXPRESSION, naming Alexander J. Cohen, Edward K. Y. Jung, Royce A. Levien, Robert W. Lord, Mark A. Malamud, and John D. Rinaldo, Jr., as inventors, filed Mar. 31, 2005, Ser. No. 11/097,977.
3. For purposes of the USPTO extra-statutory requirements, the present application constitutes a continuation in part of currently co-pending U.S. patent application entitled ACQUISITION OF A USER EXPRESSION AND AN ENVIRONMENT OF THE EXPRESSION, naming Alexander J. Cohen, Edward K. Y. Jung, Royce A. Levien, Robert W. Lord, Mark A. Malamud, and John D. Rinaldo, Jr., as inventors, filed Mar. 31, 2005, Ser. No. 11/097,980.

SUMMARY

An embodiment provides a method. The method includes receiving an annotation environment signal that includes a context information indicative of a recognizable aspect of an item. The method also includes receiving an expression signal that includes an annotation information indicative of a user expression associated with the recognizable aspect of the item. The method further includes electronically associating the context information indicative of a recognizable aspect of an item and the annotation information indicative of a user expression associated with the recognizable aspect of the item. The method may further include saving the electronically associated context information indicative of a recognizable aspect of an item and annotation information indicative of a user expression associated with the recognizable aspect of the item. In addition to the foregoing, other method embodiments are described in the claims, drawings, and text forming a part of the present application.

An embodiment provides a method. The method includes electronically associating a context information indicative of a recognizable item and an annotation information indicative of a user expression associated with the recognizable item. The method also includes saving the electronically associated context information indicative of a recognizable item and annotation information indicative of a user expression associated with the recognizable the item.

Another embodiment provides a method. The method includes recognizing an aspect of an item in response to an annotation environment signal that may include a context information indicative of a recognizable aspect of an item. The method also includes recognizing a user expression associated with the recognizable aspect of the item in response to an expression signal that may include an annotation information indicative of a user expression associated with the recognizable aspect of the item. The method further includes electronically associating the recognized user expression and the recognizable aspect of the item. In addition to the foregoing, other method embodiments are described in the claims, drawings, and text forming a part of the present application.

A further embodiment provides a device. The device includes a context receptor module operable to receive an annotation environment signal that includes a context information indicative of a recognizable aspect of an item. The device also includes an annotation receptor module operable to receive an expression signal that includes an annotation information indicative of a user expression associated with the recognizable aspect of the item. The device further includes an associator module operable to associate the context information indicative of a recognizable aspect of an item and the annotation information indicative of a user expression associated with the recognizable aspect of the item.

The device may include a context identifier module operable to recognize the recognizable aspect of an item in response to the context information indicative of a recognizable aspect of an item. The device may include an annotation identifier module operable to recognize the user expression associated with the recognizable aspect of the item in response to the annotation information indicative of a user expression associated with the recognizable aspect of the item. The device may further include a storage device operable to save the electronically associated context information indicative of a recognizable aspect of an item and the annotation information indicative of a user expression associated with the recognizable aspect of the item. In addition to the foregoing, other device embodiments are described in the claims, drawings, and text forming a part of the present application.

An embodiment provides a computer-program product. The computer-program product includes program instructions operable to perform a process that associates information in a computer system and a computer-readable signal-bearing media bearing the program instructions. The process includes receiving an annotation environment signal that includes a context information indicative of a recognizable aspect of an item, and receiving an expression signal that includes an annotation information indicative of a user expression associated with the recognizable aspect of the item. The process also includes associating the context information indicative of a recognizable aspect of an item and the annotation information indicative of a user expression associated with the recognizable aspect of the item. The process may further include saving the associated context information indicative of a recognizable aspect of an item and annotation information indicative of a user expression associated with the recognizable aspect of the item. In addition to the foregoing, other computer-program product embodiments are described in the claims, drawings, and text forming a part of the present application.

Another embodiment provides a method. The method includes receiving an annotation information indicative of a hand-formed expression. The method also includes receiving a context information indicative of a content portion of a document proximate to the hand-formed expression, and logically linking the annotation information indicative of a hand-formed expression and the context information indicative of a content portion of a document proximate to the hand-formed expression. In addition to the foregoing, other method embodiments are described in the claims, drawings, and text forming a part of the present application.

A further embodiment provides a method. The method includes receiving information generated by a handheld writing device indicative of a handwriting movement by a writing element of the handheld writing device, and receiving information generated by the handheld writing device indicative of a content portion of a document proximate to the handwriting movement. The method also includes generating an annotation by logically linking the handwriting movement and the content portion of a document proximate to the handwriting movement. In addition to the foregoing, other method embodiments are described in the claims, drawings, and text forming a part of the present application.

An embodiment provides a computer-program product. The computer-program product includes program instructions configured to perform a process that associates information in a computer system and a computer-readable signal-bearing media bearing the program instructions. The process includes receiving information generated by a handheld writing device indicative of a handwriting movement by a writing element of the handheld writing device. The process also includes receiving information generated by the handheld writing device indicative of a content portion of a document proximate to the handwriting movement, and generating an annotation by logically linking the handwriting movement and the content portion of a document proximate to the handwriting movement. The signal-bearing media may include a computer storage media. The signal-bearing media may include a communication media.

The foregoing is a summary and thus by necessity contains simplifications, generalizations and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein.

BRIEF DESCRIPTION OF THE DRAWINGS

FIG. 11 illustrates a partial view of an exemplary computer-program product that includes a computer program for executing a computer process in a handheld computing device;

FIG. 22 illustrates a partial view of an exemplary wearable apparatus;

FIG. 43 illustrates a partial view of an exemplary computer-program product that includes a computer program;

FIG. 49 illustrates a partial view of an exemplary computer-program product that includes a computer program.

DETAILED DESCRIPTION

In the following detailed description of exemplary embodiments, reference is made to the accompanying drawings, which form a part hereof. In the several figures, like referenced numerals identify like elements. The detailed description and the drawings illustrate exemplary embodiments. Other embodiments may be utilized, and other changes may be made, without departing from the spirit or scope of the subject matter presented here. The following detailed description is therefore not to be taken in a limiting sense, and the scope of the claimed subject matter is defined by the appended claims.

Figure 1:
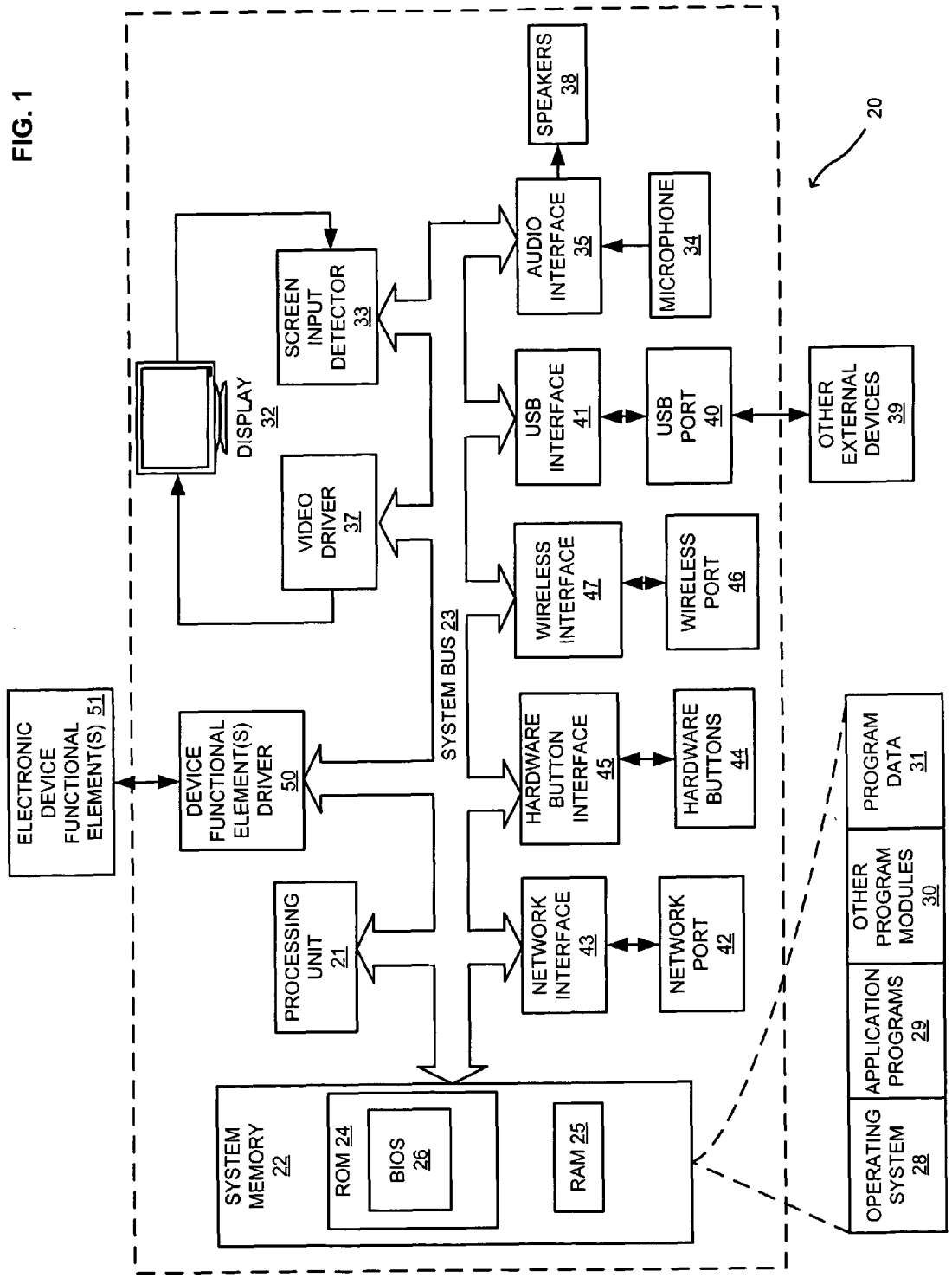
FIG. 1 illustrates an exemplary system in which embodiments may be implemented, including a thin computing device.

FIG. 1 and the following discussion are intended to provide a brief, general description of an environment in which embodiments may be implemented. FIG. 1 illustrates an exemplary system that includes a thin computing device 20 that interfaces with an electronic device (not shown) that includes one or more functional elements 51. For example, the electronic device may include any item having electrical and/or electronic components playing a role in a functionality of the item, such as a limited resource computing device, a digital camera, a cell phone, a printer, a refrigerator, a car, and an airplane. The thin computing device 20 includes a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that help to transfer information between sub-components within the thin computing device 20, such as during start-up, is stored in the ROM 24. A number of program modules may be stored in the ROM 24 and/or RAM 25, including an operating system 28, one or more application programs 29, other program modules 30, and program data 31.

A user may enter commands and information into the computing device 20 through input devices, such as a number of switches and buttons, illustrated as hardware buttons 44, connected to the system via a suitable interface 45. Input devices may further include a touch-sensitive display screen 32 with suitable input detection circuitry 33. The output circuitry of the touch-sensitive display 32 is connected to the system bus 23 via a video driver 37. Other input devices may include a microphone 34 connected through a suitable audio interface 35, and a physical hardware keyboard (not shown). In addition to the display 32, the computing device 20 may include other peripheral output devices, such as at least one speaker 38.

Other external input or output devices 39, such as a joystick, game pad, satellite dish, scanner or the like may be connected to the processing unit 21 through a USB port 40 and USB port interface 41, to the system bus 23. Alternatively, the other external input and output devices 39 may be connected by other interfaces, such as a parallel port, game port or other port. The computing device 20 may further include or be capable of connecting to a flash card memory (not shown) through an appropriate connection port (not shown). The computing device 20 may further include or be capable of connecting with a network through a network port 42 and network interface 43, and through wireless port 46 and corresponding wireless interface 47 may be provided to facilitate communication with other peripheral devices, including other computers, printers, and so on (not shown). It will be appreciated that the various components and connections shown are exemplary and other components and means of establishing communications links may be used.

The computing device 20 may be primarily designed to include a user interface having a character, key-based, other user data input via the touch sensitive display 32 using a stylus (not shown). Moreover, the user interface is not limited to an actual touch-sensitive panel arranged for directly receiving input, but may alternatively or in addition respond to another input device, such as the microphone 34. For example, spoken words may be received at the microphone 34 and recognized. Alternatively, the computing device 20 may be designed to include a user interface having a physical keyboard (not shown).

The device functional elements (not shown) are typically application specific and related to a function of the electronic device. The device functional elements are driven by a device functional element(s) interface 50, which coupled with the system bus 23. A functional element may typically perform a single well-defined task with little or no user configuration or setup, such as a refrigerator keeping food cold, a cell phone connecting with an appropriate tower and transceiving voice or data information, and a camera capturing and saving an image.

Figure 2:
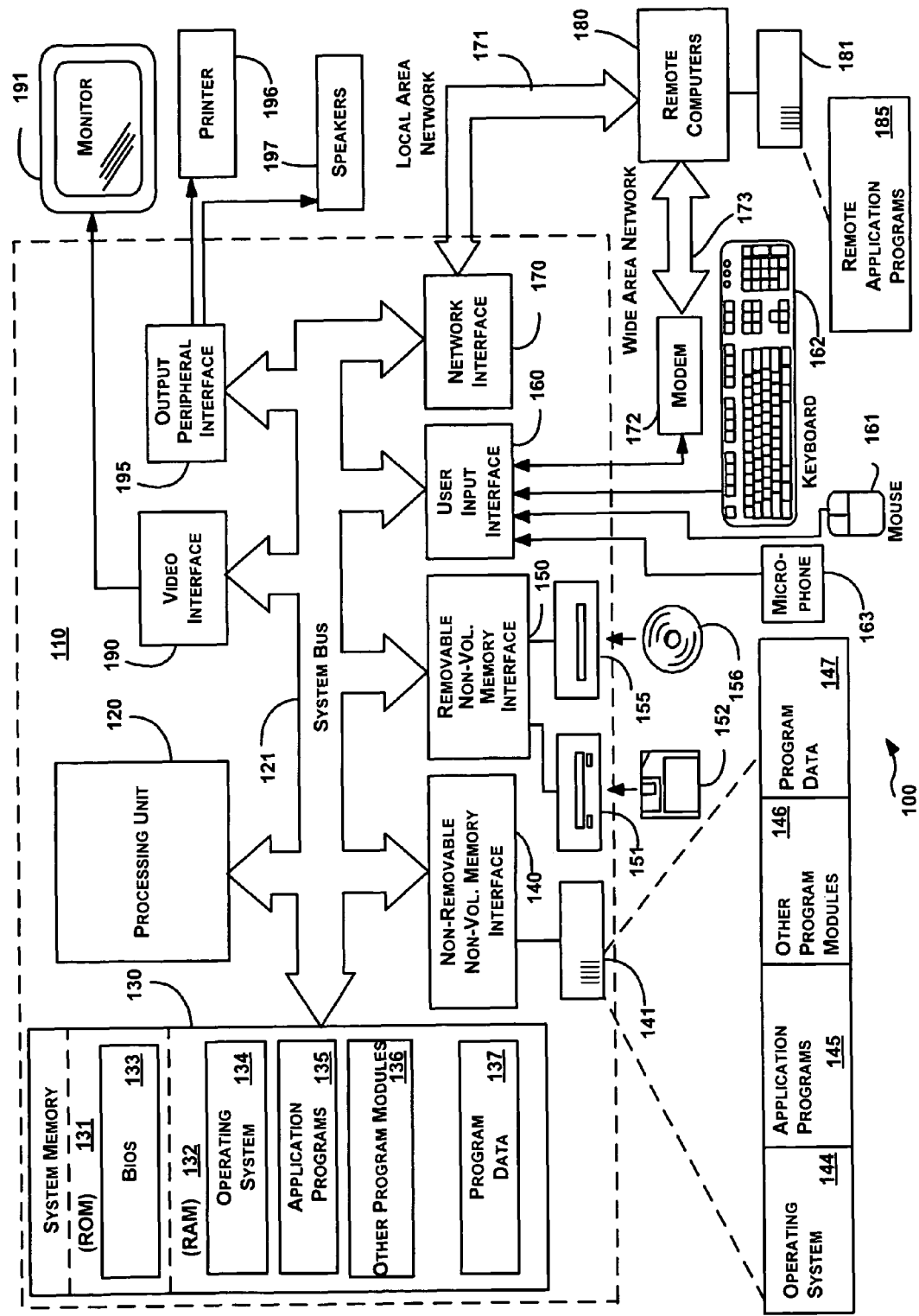
FIG. 2 illustrates another exemplary system in which embodiments may be implemented, including a general-purpose computing device.

FIG. 2 illustrates another exemplary system in which embodiments may be implemented. FIG. 2 illustrates an electronic device that may correspond in whole or part to a general-purpose computing device, shown as a computing system environment 100. Components of the computing system environment 100 may include, but are not limited to, a computing device 110 having a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computing system environment 100 typically includes a variety of computer-readable media products. Computer-readable media may include any media that can be accessed by the computing device 110 and include both volatile and nonvolatile media, removable and non-removable media. By way of example, and not of limitation, computer-readable media may include computer storage media and communications media. Computer storage media includes both volatile and nonvolatile, removable and non-removable media implemented in any method or technology for storage of information such as computer-readable instructions, data structures, program modules, or other data. Computer storage media include, but are not limited to, random-access memory (RAM), read-only memory (ROM), electrically erasable programmable read-only memory (EEPROM), flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computing device 110. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media such as a wired network and a direct-wired connection and wireless media such as acoustic, RF, optical, and infrared media. Combinations of any of the above should also be included within the scope of computer-readable media.

The system memory 130 includes computer storage media in the form of volatile and nonvolatile memory such as ROM 131 and RAM 132. A basic input/output system (BIOS) 133, containing the basic routines that help to transfer information between elements within the computing device 110, such as during start-up, is typically stored in ROM 131. RAM 132 typically contains data and program modules that are immediately accessible to or presently being operated on by processing unit 120. By way of example, and not limitation, FIG. 2 illustrates an operating system 134, application programs 135, other program modules 136, and program data 137. Often, the operating system 134 offers services to applications programs 135 by way of one or more application programming interfaces (APIs) (not shown). Because the operating system 134 incorporates these services, developers of applications programs 135 need not redevelop code to use the services. Examples of APIs provided by operating systems such as Microsoft's "WINDOWS" are well known in the art.

The computing device 110 may also include other removable/non-removable, volatile/nonvolatile computer storage media products. By way of example only, FIG. 2 illustrates a non-removable non-volatile memory interface (hard disk interface) 140 that reads from and writes to non-removable, non-volatile magnetic media, a magnetic disk drive 151 that reads from and writes to a removable, non-volatile magnetic disk 152, and an optical disk drive 155 that reads from and writes to a removable, non-volatile optical disk 156 such as a CD ROM. Other removable/nonremovable, volatile/nonvolatile computer storage media that can be used in the exemplary operating environment include, but are not limited to, magnetic tape cassettes, flash memory cards, DVDs, digital video tape, solid state RAM, and solid state ROM. The hard disk drive 141 is typically connected to the system bus 121 through a non-removable memory interface, such as the interface 140, and magnetic disk drive 151 and optical disk drive 155 are typically connected to the system bus 121 by a removable non-volatile memory interface, such as interface 150.

The drives and their associated computer storage media discussed above and illustrated in FIG. 2 provide storage of computer-readable instructions, data structures, program modules, and other data for the computing device 110. In FIG. 2, for example, hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that, at a minimum, they are different copies. A user may enter commands and information into the computing device 110 through input devices such as a microphone 163, keyboard 162, and pointing device 161, commonly referred to as a mouse, trackball, or touch pad. Other input devices (not shown) may include a joystick, game pad, satellite dish, and scanner. These and other input devices are often connected to the processing unit 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computing system environment 100 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computing device 110, although only a memory storage device 181 has been illustrated in FIG. 2. The logical connections depicted in FIG. 2 include a local area network (LAN) 171 and a wide area network (WAN) 173, but may also include other networks such as a personal area network (PAN) (not shown). Such networking environments are commonplace in offices, enterprise-wide computer networks, intranets, and the Internet.

When used in a LAN networking environment, the computing system environment 100 is connected to the LAN 171 through a network interface or adapter 170. When used in a WAN networking environment, the computing device 110 typically includes a modem 172 or other means for establishing communications over the WAN 173, such as the Internet. The modem 172, which may be internal or external, may be connected to the system bus 121 via the user input interface 160, or via another appropriate mechanism. In a networked environment, program modules depicted relative to the computing device 110, or portions thereof, may be stored in a remote memory storage device. By way of example, and not limitation, FIG. 2 illustrates remote application programs 185 as residing on memory device 181. It will be appreciated that the network connections shown are exemplary and other means of establishing a communications link between the computers may be used.

In the description that follows, certain embodiments may be described with reference to acts and symbolic representations of operations that are performed by one or more computing devices, such as computing device 110 of FIG. 2. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

FIG. 2 illustrates an example of a suitable environment on which embodiments may be implemented. The computing system environment 100 of FIG. 2 is an example of a suitable environment and is not intended to suggest any limitation as to the scope of use or functionality of an embodiment. Neither should the environment be interpreted as having any dependency or requirement relating to any one or combination of components illustrated in an exemplary operating environment.

Embodiments may be implemented with numerous other general-purpose or special-purpose computing devices and computing system environments or configurations. Examples of well-known computing systems, environments, and configurations that may be suitable for use with an embodiment include, but are not limited to, personal computers, server computers, hand-held or laptop devices, personal digital assistants, multiprocessor systems, microprocessor-based systems, set top boxes, programmable consumer electronics, network, minicomputers, mainframe computers, and distributed computing environments that include any of the above systems or devices.

Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in distributed computing environments where tasks are performed by remote processing devices that are linked through a communications network. In a distributed computing environment, program modules may be located in both local and remote computer storage media including memory storage devices.

The following includes a series of illustrations depicting implementations of processes. For ease of understanding, certain illustrations are organized such that the initial illustrations present implementations via an overall "big picture" viewpoint and thereafter the following illustrations present alternate implementations and/or expansions of the "big picture" illustrations as either sub-steps or additional steps building on one or more earlier-presented illustrations. This style of presentation utilized herein (e.g., beginning with a presentation of a illustration(s) presenting an overall view and thereafter providing additions to and/or further details in subsequent illustrations) generally allows for a rapid and easy understanding of the various process implementations.

Figure 3:
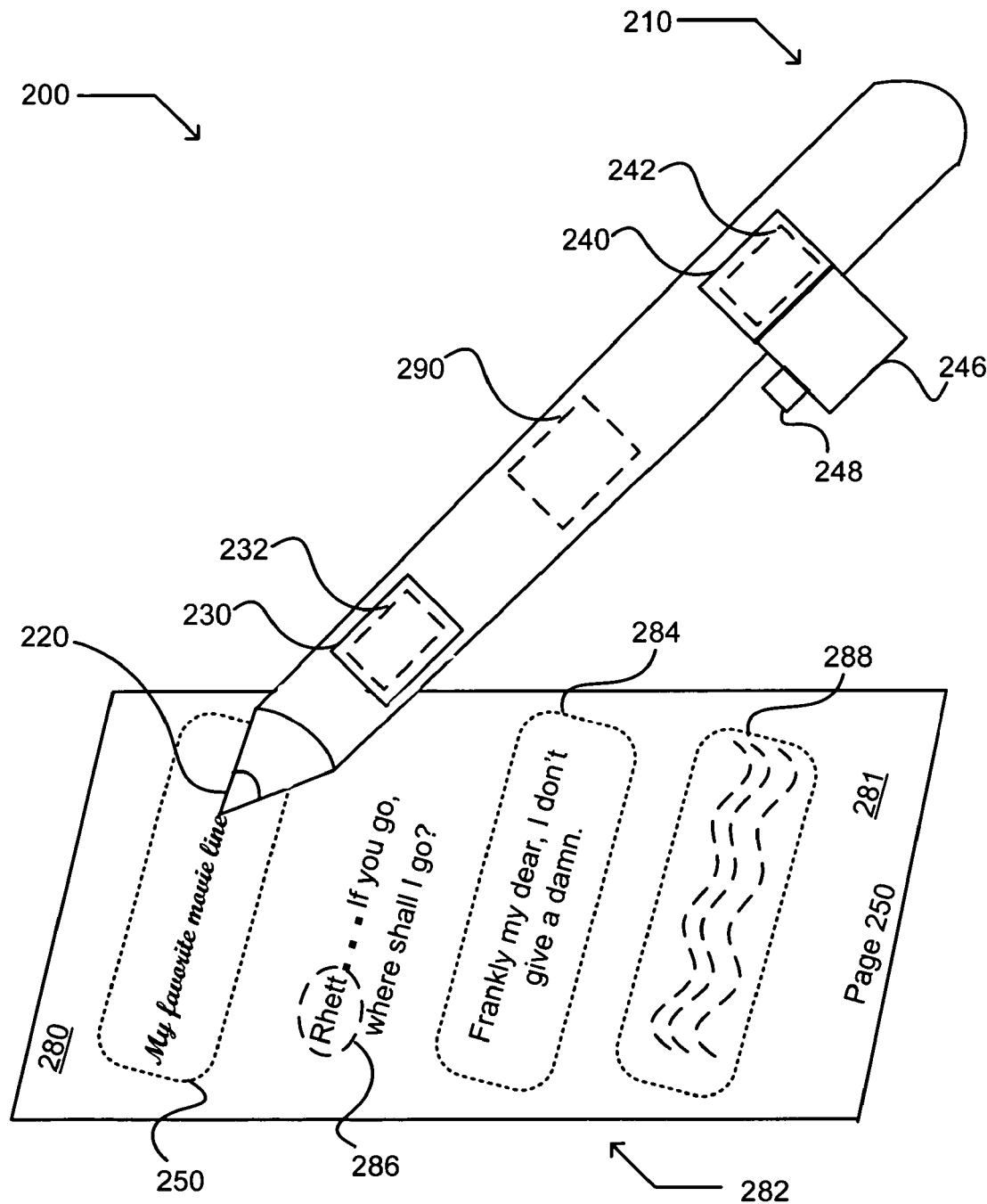
FIG. 3 illustrates an environment that includes partial view of an exemplary handheld writing device, and an exemplary document environment.

FIG. 3 illustrates an environment 200 that includes partial view of exemplary handheld writing device 210, and an exemplary document environment 280.

In an embodiment, the exemplary document environment 280 (hereafter "document 280") may include a single sheet, a part of a page, a single page, a poster, a display, multiple pages, a chapter, a volume, and/or a file. In a further embodiment, the document may include a book, such as a bound volume, a box, such as a retail package, a container, a carton, a label, a currency bill or note, and/or check. In another embodiment, the document may include an article of clothing, an item, a structure, a vehicle, and/or an indicator, such as a temperature gauge or speedometer. In an embodiment, a document includes any thing having a human recognizable content.

The document 280 includes a content portion 282. The content portion 282 may include a word 286, illustrated as a word "Rhett," a phrase 284, illustrated as the phrase "Frankly my dear, I don't give a damn," and/or other printed or native content, schematically illustrated as a textual paragraph 288. In another embodiment, the content portion may include a textual content portion. For example, a textual content portion may include words printed on a page, such as a page of a book, and/or words printed on a cover or a spine of a book. In a further embodiment, the content portion may include a human language content, for example, text printed in roman alphabet characters, math symbols, and/or script characters such as Asian language characters. In another embodiment, the content portion may include a human readable content, and/or graphical content. In an embodiment, the content portion may include a graphical content having a meaning or a significance to a human, such as a picture, a drawing, a figure, a photograph, an illustration, a diagram, a doodle, a decoration, a sketch, and/or a portrait. In another embodiment, the content portion may be arbitrary and not recognizable by an individual human reader. In a further embodiment, the content portion may include any content primarily useful to a human reader. For example, a content portion may include a textual and/or graphical label on a retail article, such as clothing, a retail package, or a carton. A content portion may include an address written on shipping label or an address written on a side of a building. A content portion may include an odometer reading on a vehicle or a temperature reading on a thermometer. In another embodiment, the content portion may include an incidental element not primarily employed by a human reader but that aids in distinguishing the document. For example, an incidental element may include a coffee stain, a torn page, and/or a physical attribute of the document. In an embodiment, a content portion may include a human and/or machine recognizable characteristic form or shape, such a pair of skis, a car, and/or a dress.

In an embodiment, the content portion 282 of the document 280 may be displayed on a surface 281, such as a paper surface, a surface of a sheet of paper, a surface of a newspaper, a surface of a book, and/or a surface of a poster. In a further embodiment, the surface may include a surface of a box, a surface of a container, a surface of a carton, a surface of a label, a surface of a currency bill or note, and/or a surface of a check. In another embodiment, a surface may include a surface of an article of clothing, a surface of an item, a surface of a structure, a surface of a vehicle, and/or a surface of an indicator. In an embodiment, a surface may include content located in at least two planes. In another embodiment, a surface may include a planar surface. In an embodiment, the content portion 282 may be electronically displayed, such as a text displayed through the surface 281, and/or a text projected on the surface. The surface electronically displaying the content portion may include a surface of a computer monitor, a surface of a television screen, and/or a surface of an e-paper, The exemplary handheld writing device 210 includes a writing element 220. In an embodiment, the writing element may include an active writing element, such as an ink cartridge operable to discharge a marking fluid onto a surface of a document. The active writing element may include a replaceable ink cartridge. In another embodiment, the active writing element may include a pencil lead. In a further embodiment, the writing element may include a non-marking element, such as non-marking stylus.

The writing device 210 also includes a writing detector module 230 operable to generate information indicative of a handwriting movement 250 by the writing element 220. The handwriting movement is illustrated as "My favorite movie line." The writing detector module 230 may be implemented in any manner, including software, hardware, firmware, and/or a combination thereof. An embodiment of the writing detector module 230 may be implemented using reflected light, optical image, sonar, ultrasound, and/or accelerometer detection of a handwriting movement. The handwriting movement may be formed in response to hand movements. In an alternative embodiment, the handwriting movement may be formed in response to movements of another part of a body, such as by movement of a user's head while holding the writing device in their mouth.

In an embodiment, "information" includes data that may be processed, stored, or transmitted by a computing device. In another embodiment, "information" includes a meaning of data as may be interpreted by or meaningful to people. In an embodiment, "data" includes a piece or pieces of information. Data may include facts, quantities, characters, and/or symbols. Data may be subject to operations by a computer, saved, and transmitted by electrical signals.

In an embodiment, the writing detector module 230 may be implemented by illuminating a surface 281 of the document 280 from the handheld writing device 210, and determining the handwriting movement 250 of the writing element 220 in response to reflected illumination from the surface, such as more fully described in U.S. Pat. No. 6,741,335, titled OPTICAL TRANSLATION MEASUREMENT, issued on May 25, 2004, Kinrot, et al. as inventor; U.S. Pat. No. 6,452,683, titled OPTICAL TRANSLATION MEASUREMENT, issued on Sep. 17, 2002, Kinrot, et al. as inventor; and U.S. Pat. No. 6,330,057, titled OPTICAL TRANSLATION MEASUREMENT, issued on Dec. 11, 2001, Lederer, et al. as inventor, each of which is incorporated herein by reference in their entirety for all that they disclose and teach. In another embodiment, the writing detector module may be implemented by capturing images of a pattern in a writing base and handwriting movements of the pen determined by calculating positions of the writing element based on the images of the writing base, such as more fully described in U.S. Pat. No. _____ (published as US 2004/0179000) titled ELECTRONIC PEN, MOUNTING PART THEREFOR AND METHOD OF MAKING THE PEN, filed Jun. 26, 2002, under application Ser. No. 10/179,949, Fermgard, et al. as inventor, which is incorporated herein by reference in its entirety for all that is discloses and teaches. In a further embodiment, the writing detector module may be implemented using ultrasound to track a handwriting movement of a writing element, such as more fully described in U.S. Pat. No. _____ (published as US 2003/0173121) titled DIGITIZER PEN filed Mar. 18, 2002, under application Ser. No. 10/098,390, Zloter, et al. as inventor, which is incorporated herein by reference in its entirety for all that it discloses and teaches. In an embodiment, the writing detector module may be implemented using a sensor package that measures velocity, acceleration, and angular acceleration in a handheld writing device, such as more fully described in U.S. Pat. No. _____ (published as US 2004/0260507) titled 3D INPUT APPARATUS AND METHOD THEREOF, filed Jun. 17, 2004 under application Ser. No. 10/868,959, Chang, et al. as inventor, which is incorporated herein by reference in its entirety for all that it discloses and teaches. In another embodiment, the writing detector module may be implemented using an image processing approach that captures and saves segments of a writing movement as a separate image. The final output is a combination of multiple images superimposed on each other.

In another embodiment, the writing detector module 230 may generate information indicative of a handwriting movement 250 by capturing images of the handwriting movement, and stitching the images together.

In an embodiment, the writing detector module 230 may include an electrical circuit 232 operable to generate information indicative of a handwriting movement of the writing element. In a further embodiment, the writing detector module 230 may include operability to generate information indicative of a movement of the writing element generated by an activity of writing by hand. In another embodiment, the writing detector module may include operability to generate information indicative of a movement of the writing element in response to a hand generated activity.

In a further embodiment, the writing detector module 230 may generate raw handwriting movement information. In another embodiment, the writing detector module may process the raw handwriting movement information.

The writing device 210 also includes a context detector module 240 operable to generate information indicative of a content portion of a document proximate to the handwriting movement of the writing element. In an embodiment, a content portion of a document proximate to the handwriting may include a content portion separated from the handwriting movement of less than approximately one to two inches. In another embodiment, a content portion of a document proximate to the handwriting movement may include a content portion and a handwriting movement both on a page. In a further embodiment, a content portion of a document proximate to the handwriting movement may include a content portion on a body that includes the handwriting movement. In an inanimate example, the content portion may be a book title and/or author printed on a book spine or cover, and the handwriting movement being on a page of the book. In an animate example, the content portion may include a portion of a human body, such as a skin surface having a landmark, and the handwriting movement being on the skin surface and proximate to the landmark, such a surgeon marking incision lines before beginning a procedure.

The context detector module 240 may be implemented in any manner, including software, hardware, firmware, and/or any combination thereof. In an embodiment, the context detector module 240 may include an electrical circuit 242 operable to generate information indicative of a content portion 282 of a document proximate to the handwriting movement of the writing element 220, such as the phrase 284 and/or the word 286. An embodiment includes a context detector module operable to generate information indicative of a content portion of a displayed document proximate to the handwriting movement of the writing element. A further alternative embodiment includes a context detector module operable to generate information indicative of a content portion of an electronically displayed document proximate to the handwriting movement of the writing element. Another embodiment includes a context detector module operable to generate information indicative of a printed content portion of a document proximate to the handwriting movement of the writing element. An embodiment includes a context detector module operable to generate information indicative of a printed content portion of a paper-based document proximate to the handwriting movement of the writing element. A further alternative embodiment includes a context detector module operable to generate information indicative of a content portion of an e-paper document proximate to the handwriting movement of the writing element.

In an embodiment, the context detector module 240 may include an image capture device 246 having a lens 248. The image capture device 246 includes operability to capture at least one image of the content portion 282 proximate to the handwriting movement 250, such as the phrase 284 and/or the word 286. The image capture device 246 and the lens 248 may have any location with respect to the handheld writing device 210 suitable for capturing at least one image of a content portion proximate to the handwriting movement, including within an outer periphery of the handheld writing device, and/or outside the outer periphery. In another embodiment, the image capture device 246 includes operability to capture image information of the displayed content portion proximate to the handwriting movement with a resolution sufficient to render the image information into textural information by an optical character resolution process.

In a further embodiment, the image capture device 246 includes operability to capture at least one image of a displayed content portion as a writer moves the writing element 220 of the handheld writing device 210 toward the document 280. In another embodiment, the image capture device includes operability to capture at least one image of a displayed content portion as a writer imparts a handwriting movement to the writing element. In a further embodiment, the image capture device includes operability to capture at least one image of a displayed content portion as a writer moves the writing element of the handheld writing device away from the document. The lens 248 may include a user adjustable orientation allowing a user to optimize image capture.

In an embodiment, the context detector module 240 may include a user activatable switch (not shown) allowing a user to select when the information indicative of a content portion of a document element will be captured. For example, the image capture device 246 may include a user activatable switch allowing a user to select when an image of a content portion is obtained. A user may aim the lens 248 at a content portion and capture an image by activating the switch. The switch may include a hardware switch, a motion sensitive switch, and/or a voice activated switch.

In an embodiment, the context detector module 240 may further include operability to acquire contextual information from another source, and to use that contextual information to generate information indicative of a content portion of a document proximate to the handwriting movement of the writing element. For example, the handwriting movement may occur proximate to a surface or a device operable to generate contextual information indicative of a content portion of a document proximate to the handwriting movement. The surface may include a touch sensitive screen coupled to a circuit operable to generate the contextual information. Alternatively, the handwriting movement may occur proximate to a surface monitored by an ultrasonic system coupled to a circuit operable to generate contextual information indicative of a content portion of a document proximate to the handwriting movement.

In a further embodiment, the context detector module 240 may generate raw information indicative of a content portion of a document proximate to the handwriting movement of the writing element. In another embodiment, the context detector module may process the raw context portion information.

In another embodiment, the context detector module 240 may include operability to generate information indicative of a content portion of a document proximate to the handwriting movement using other technologies. For example, information indicative of a content portion may be generated using data from a radio frequency identification device (RFID) associated with the document, a global positioning satellite system, and/or other data signal.

In an alternative embodiment, the handheld writing device 210 may include a recognition module 290. The recognition module includes operability to generate information indicative of a human readable content in response to the information indicative of the hand driven movement of the writing element. For example, in an embodiment, the recognition module may determine a presence of human readable content in the information indicative of the hand driven or handwriting movement 250 generated by the writing detector module 230, recognize the human readable content as "My favorite movie line," and generate information indicative of that content. In another embodiment, the recognition module may determine a presence of human readable content, recognize the handwriting movements as forming the human readable content as a script character, and generate information indicative of that script character.

In an operation of an embodiment, a reader may wish to annotate the document 280 with a comment or sketch. The reader holds the handheld writing device 210 in their hand in a manner similar to a conventional pen or pencil, and begins handwriting an annotation using the writing element 220 proximate to a content portion 282. The handheld writing device 210 captures a handwriting movement, or hand driven movement, of the writing element imparted by the user's hand to the writing device, and through the writing detector module 230, generates information indicative of the handwriting movement. The handheld writing device captures a context of the handwriting movement through the context detector module 240 by capturing at least one image of the content portion of the document proximate to the handwriting movement. The context may be captured before the handwriting movement, during the handwriting movement, and/or after the handwriting movement. The context detector module generates information indicative of the content portion of the document proximate to the handwriting movement.

Figure 4:
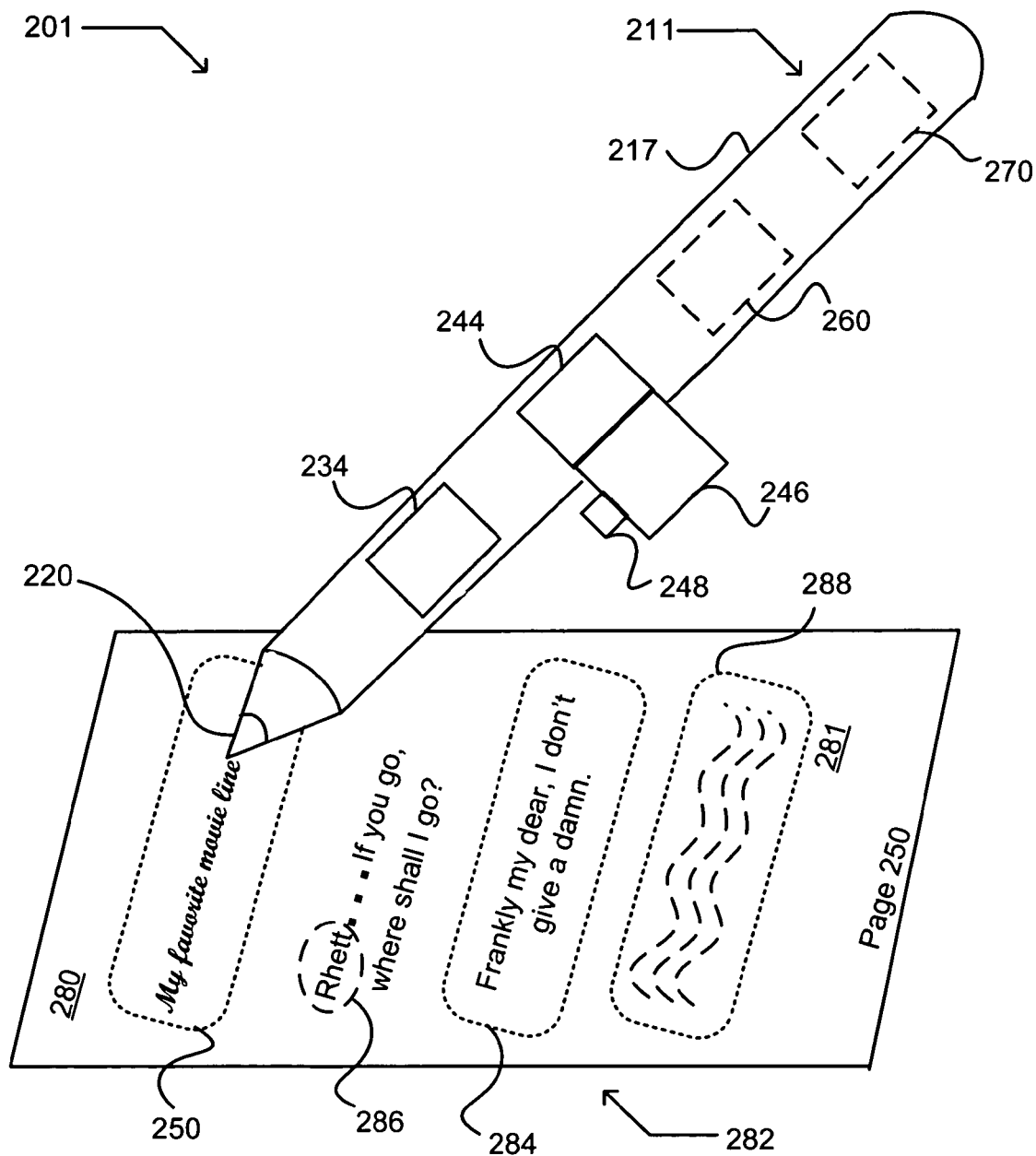
FIG. 4 illustrates a partial view of an environment that includes an exemplary electronic pen, and the exemplary document environment of FIG. 3.

FIG. 4 illustrates a partial view of an environment 201 that includes an exemplary electronic pen 211, and the exemplary document environment 280 of FIG. 3. The electronic pen 211 includes a generally elongated body 217 and the writing element 220 extending from the generally elongated body. In an embodiment, the writing element may be configured to make a visible mark. A visible mark may include any mark visible to a human eye. For example, a visible mark may include an ink mark, and/or a pencil mark. A visible mark may include a letter, a character, a symbol, a line, and/or a figure.

The electronic pen 211 also includes a writing detector module 234 operable to generate information indicative of a hand driven movement of the writing element. In an embodiment, a hand driven movement includes a hand-generated movement. In an alternative embodiment, the writing detector module includes operability to generate information indicative of a hand driven movement of the writing element in contact with the surface 281 of a document 280. In another alternative embodiment, the writing detector module includes operability to generate information indicative of a hand driven movement of the writing element in contact with the surface of a paper document. In a further embodiment, the writing detector module includes operability to generate information indicative of a hand driven movement of the writing element in contact with a surface displaying an electronic document. The writing detector module may be implemented in any manner, including software, hardware, firmware, and/or a combination thereof. An embodiment of the writing detector module may be implemented using reflected light, optical image, sonar, ultrasound, and/or accelerometer detection of the handwriting movement. In an embodiment, the writing detector module may be implemented in a manner at least substantially similar to the writing detector module 230 of FIG. 3.

The electronic pen further includes a context detector module 244 operable to generate information indicative of a content portion of a document proximate to the hand driven movement of the writing element. In an alternative embodiment, the context detector module may include operability to generate information indicative of a content portion of a page of multiage document proximate to the handwriting movement of the writing element. In another alternative embodiment, the context detector module may include operability to generate information indicative of a hand-generated writing movement of the writing element. The context detector module 244 may be implemented in any manner, including software, hardware, firmware, and/or any combination thereof. In an embodiment, the context detector module 244 may be implemented in a manner at least substantially similar to the writing detector module 240 of FIG. 3.

In an alternative embodiment, the electronic pen 211 may include at least one additional module. Additional modules may include a communications module 260 and a storage module 270. In an embodiment, the communications module 260 includes operability to transmit at least one of the signal indicative of a hand driven movement of a writing element and the signal indicative of at least a portion of a document proximate to the hand driven movement of the writing element. The term "signal" means at least one current signal, voltage signal, or signal. In another embodiment, the communications module includes operability to transmit in real time at least one of the information indicative of a hand driven movement of a writing element and the information indicative of at least a portion of a document proximate to the hand driven movement of the writing element. In a further embodiment, the communications module includes operability to transmit at least one of processed information corresponding to the information indicative of a handwriting movement of a writing element and processed information corresponding to the information indicative of at least a portion of a document proximate to the writing movement of the writing element.

The communications module 260 may transmit a signal. In an optional embodiment, the communications module both receives and transmits signals (transceiver). For example and without limitation, "signal" includes a current signal, voltage signal, magnetic signal, or optical signal in a format capable of being stored, transferred, combined, compared, or otherwise manipulated. The communications module may include wireless, wired, infrared, optical, and/or other communications techniques. In an embodiment, the communications module may include operability for communication with a computing device, such as the thin computing device 20 of FIG. 1, and/or the computing device 10 of FIG. 2. The communications module may include an antenna for wireless communication, a connection for wired connection, and/or an optical port for optical communication.

The digital storage module 270 may include any suitable digital storage medium. For example, a digital storage medium may include a computer storage medium. The digital storage module includes operability to save at least one of the information indicative of a hand driven movement of a writing element and the information indicative of at least a portion of a document proximate to the hand driven movement of the writing element. Information may be saved in any form or format, such as a raw data form, or a processed data form. In conjunction with the communications module 260, information may be saved as generated and then be available for uploading at a later time. For example, information may be stored, batched, and subsequently transmitted. In another example, information may be stored, and subsequently transmitted after the electronic pen 211 is docked.

In operation of an embodiment, the electronic pen 211 acquires a handwritten annotation and a context of the handwritten annotation in a manner at least substantially similar to the handheld writing device 210 of FIG. 3. In addition, the electronic pen 211 may transmit signals indicative of the handwritten annotation and the context of the annotation using the communication module 260. One or both of the signals may be transmitted in real time as a reader writes an annotation. In an alternative embodiment, one or both of the signals may be processed by a component of the electronic pen prior to transmission. In another alternative embodiment, the electronic pen may save one or both of the signals in the digital storage medium 270. The saved signal may be transmitted at a later time.

Figure 5:
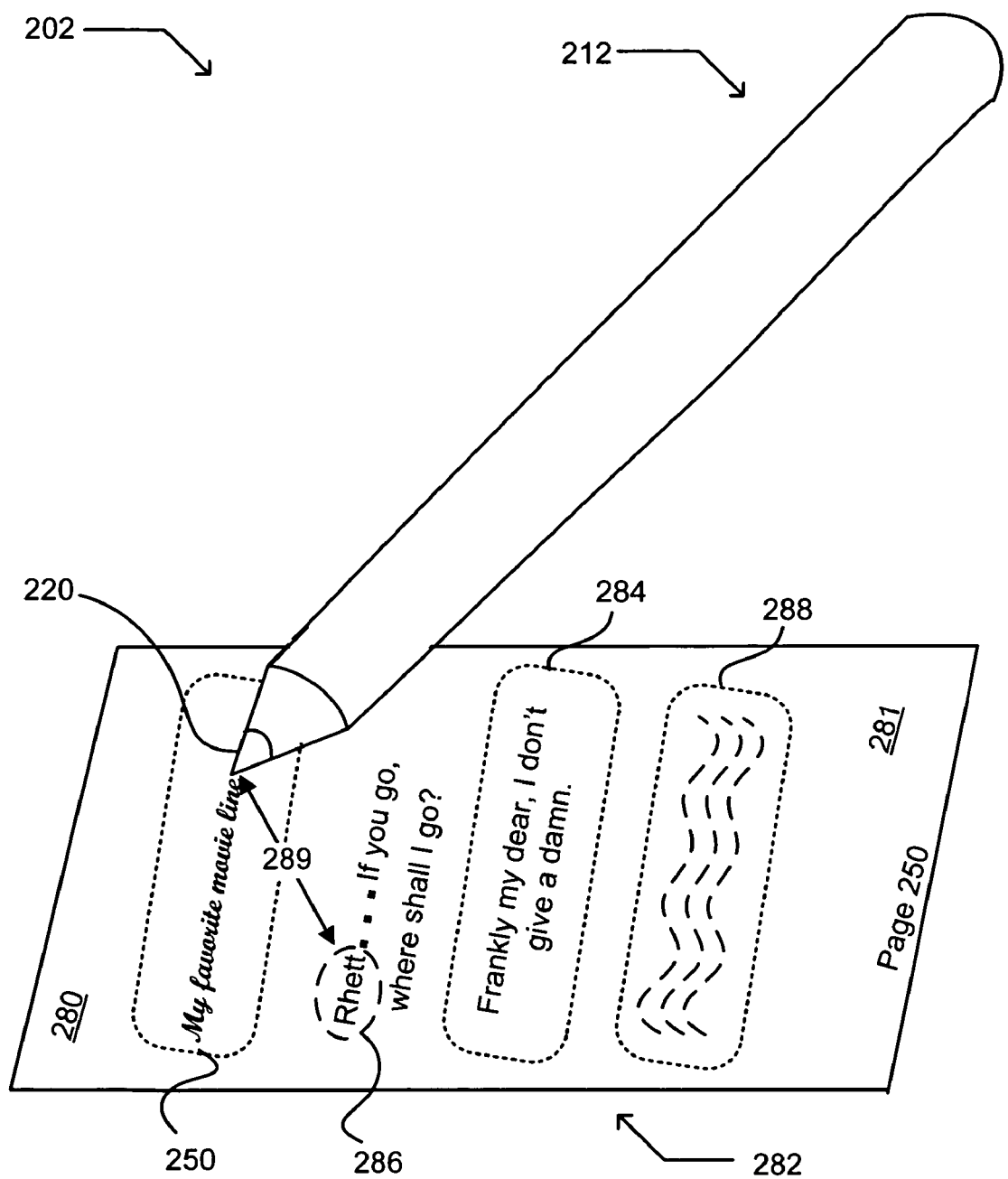
FIG. 5 illustrates a partial view of an environment that includes an exemplary apparatus, and the exemplary document environment of FIG. 3.

FIG. 5 illustrates a partial view of an environment 202 that includes an exemplary apparatus 212, and the exemplary document environment 280 of FIG. 3. The apparatus 212 includes operability to mark the document 280, such as the handwriting movement 250, and to generate an electronic indicator of a position 289 of the mark relative to an existing character, such as the word 286 "Rhett" of the document. The indicator 289 of a position of the mark relative to an existing word 286 may be expressed in any manner, including an indication in Cartesian coordinates, and/or spherical coordinates. In an embodiment, the existing character of the document includes at least one existing letter displayed by the document. In another embodiment, the existing character of the document includes at least one existing word displayed by the document. In a further embodiment, the document includes at least one existing image displayed by the document.

In an alternative embodiment, the apparatus 212 includes a pen configured to mark relative to an existing character, such as the word 286, of a document 280 based, at least in part, on a marking position 289 relative to the existing character of the document, wherein the mark and an indicator of the marking position are saved within the pen.

Figure 6:
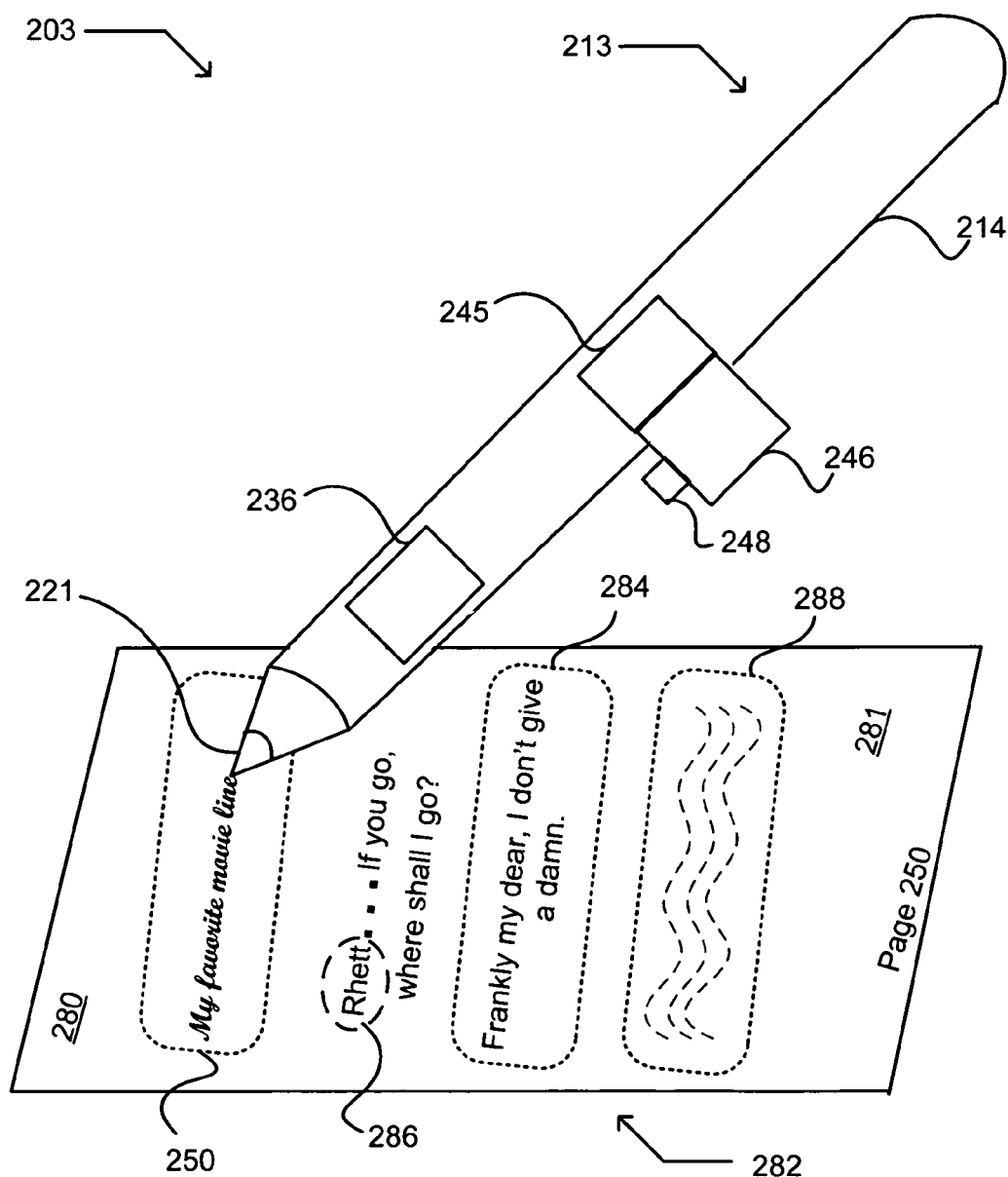
FIG. 6 illustrates a partial view of an environment that includes an exemplary apparatus, and the exemplary document environment of FIG. 3.

FIG. 6 illustrates a partial view of an environment 203 that includes an exemplary apparatus 213, and the exemplary document environment 280 of FIG. 3. The apparatus 213 includes a stylus 221 configured to write on a surface, such as the surface 281 of the document 280. The stylus may be at least similar to the stylus 220 of FIG. 3. The apparatus also includes a position sensor 236 operable to generate information indicative of handwriting movement 250 of the stylus relative to the surface. The apparatus includes an imaging element 245 operable to generate information representing at least a portion of the word 286 displayed from the surface proximate to the handwriting movements.

Figure 7:
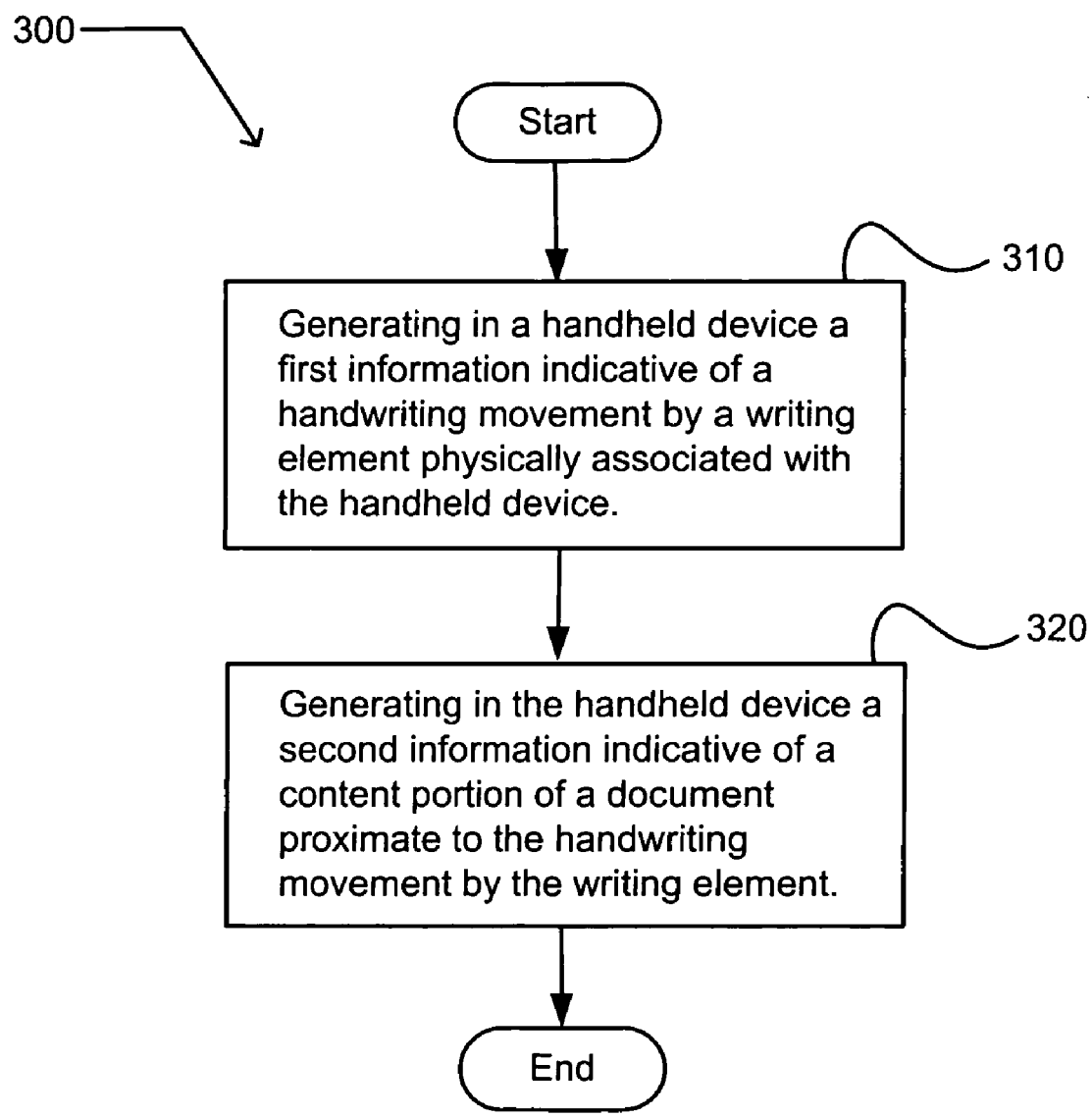
FIG. 7 illustrates an exemplary operational flow.

FIG. 7 illustrates an exemplary operational flow 300. After a start operation, the operational flow 300 moves to a content operation 310. At the content operation 310, a first information is generated in a handheld device indicative of a handwriting movement of a writing element physically associated with the handheld device. At the operation 320, a second information is generated in the handheld device information indicative of a content portion of a document proximate to the handwriting movement of the writing element. The operational flow 300 then proceeds to an end operation.

Figure 8:
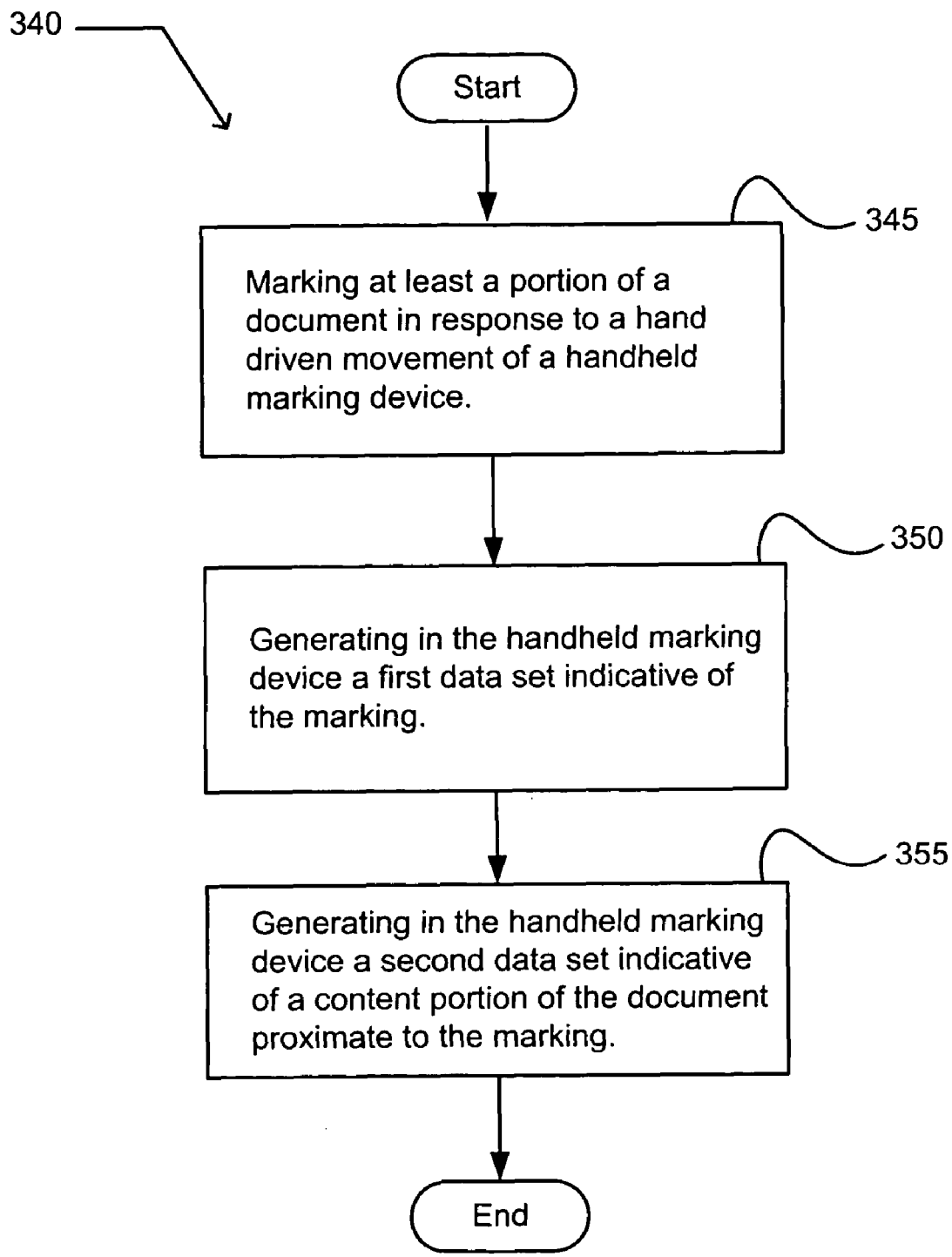
FIG. 8 illustrates another exemplary operational flow.

FIG. 8 illustrates an exemplary operational flow 340. After a start operation, the operational flow 340 moves to a writing operation 345. At the writing operation 345, at least a portion of a document is marked in response to a hand driven movement of a handheld marking device. At a content operation 350, a first data set indicative of the marking is generated in the handheld marking device. At a context operation 355, a second data set indicative of a content portion of the document proximate to the marking is generated in the handheld marking device.

Figure 9:
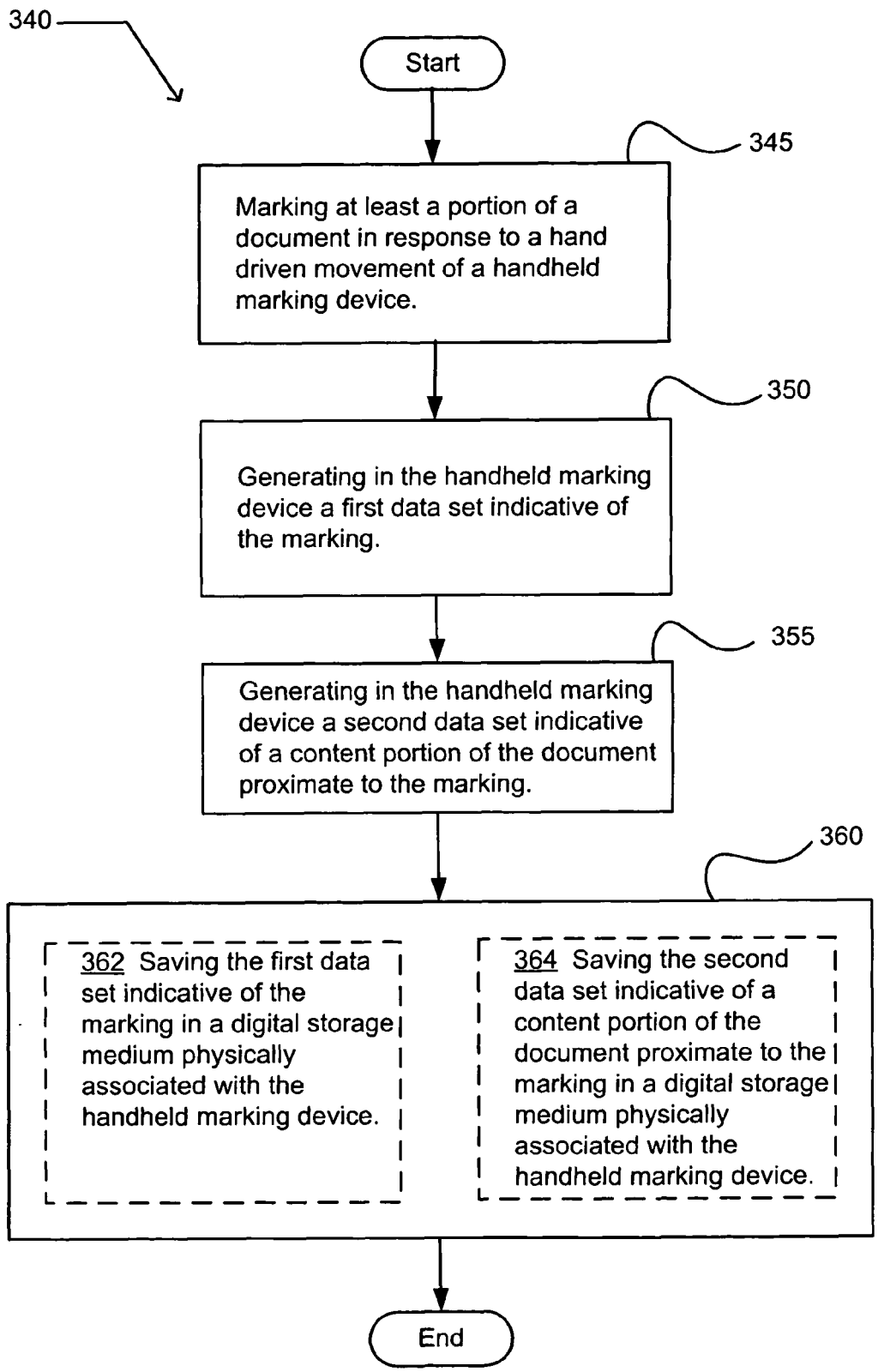
FIG. 9 illustrates an alternative embodiment of the exemplary operational flow of FIG. 8.

FIG. 9 illustrates an alternative embodiment of the exemplary operational flow 340 of FIG. 8. FIG. 9 illustrates an embodiment where the exemplary operation flow 340 may include at least one additional operation 360. The additional operation 360 may include an operation 362 and an operation 364. At the operation 362, the first data set indicative of the marking is saved in a digital storage medium physically associated with the handheld device. At the operation 364, the second data set indicative of a content portion of the document proximate to the marking is saved in a digital storage medium physically associated with the handheld device.

Figure 10:
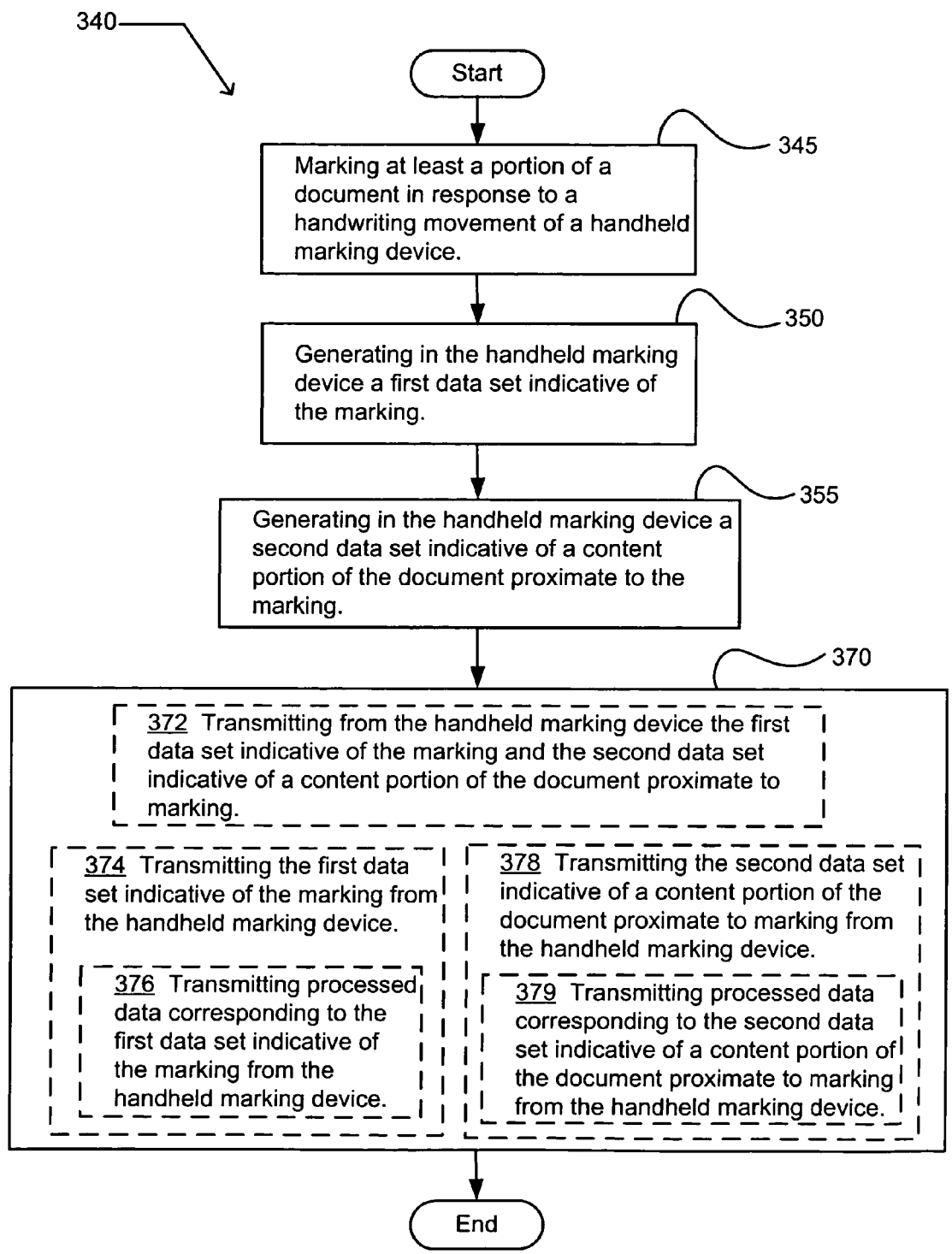
FIG. 10 illustrates another alternative embodiment of the exemplary operational flow of FIG. 8.

FIG. 10 illustrates an alternative embodiment of the exemplary operational flow 340 of FIG. 8. FIG. 10 illustrates an embodiment where the exemplary operation flow 340 may include at least one additional operation 370. The additional operation 370 may include an operation 372, an operation 374, and an operation 378. At the operation 372, the first data set indicative of the marking and the second data set indicative of a content portion of the document proximate to marking are transmitted from the handheld marking device. At the operation 374, the first data set indicative of the marking is transmitted from the handheld marking device. The operation 374 may include at least one additional operation, such as an operation 376. At the operation 376, processed data corresponding to the first data set indicative of the marking is transmitted from the handheld marking device. At the operation 378, the second data set indicative of a content portion of the document proximate to marking is transmitted from the handheld marking device. The operation 378 may include at least one additional operation, such as an operation 379. At the operation 379, processed data corresponding to the second data set indicative of a content portion of the document proximate to marking is transmitted from the handheld marking device.

FIG. 11 illustrates a partial view of an exemplary computer-program product 400 that includes a computer program 404 for executing a computer process in a handheld computing device. An embodiment of the exemplary computer-program product 400 may be provided using a computer-readable medium 402, and includes computer executable instructions. The computer product 400 encodes the computer program 404 for executing on the handheld computing device a computer process. The computer process includes generating in the handheld device a first data set indicative of a handwriting movement of a writing element physically associated with the handheld device, and generating in the handheld device a second data set indicative of a content portion of a document proximate to the handwriting movement of the writing element. In an alternative embodiment, the computer process 404 may further include an additional process, such as a process 406, a process 408, and a process 410. At the process 406, the first data set indicative of a handwriting movement and the second data set indicative of a content portion of the document proximate to the handwriting movement are saved in a digital storage medium physically associated with the handheld device. At the process 408, the first data set indicative of the handwriting movement is transmitted. At the process 410, the second data set indicative of a content portion of the document proximate to the handwriting movement is transmitted. The computer-readable medium 402 may include a computer storage medium, which may be carried by a computer-readable carrier (not shown). The computer-readable medium 402 may include a communications medium (not shown). The computer-program product 400 may be implemented in hardware, software, and/or firmware.

Figure 12:
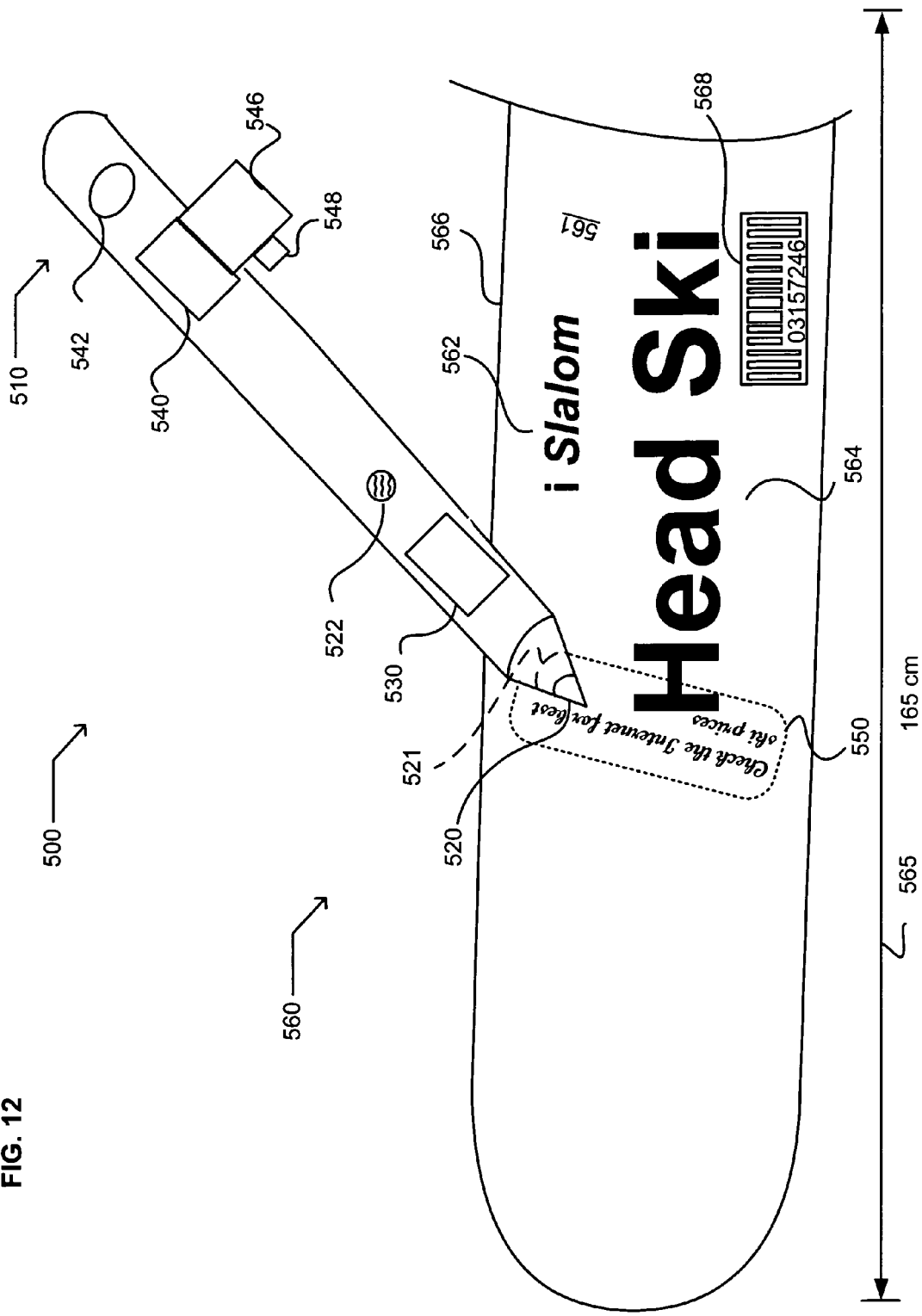
FIG. 12 illustrates an environment that includes a partial view of an exemplary annotation system and a partial view of an exemplary item.

FIG. 12 illustrates an environment 500 that includes a partial view of an exemplary annotation system and a partial view of an exemplary item. The exemplary annotation system is illustrated as an exemplary handheld system 510. The exemplary item is illustrated as a ski 560 having at a top surface 561, and two recognizable aspects printed and/or painted on the surface. Recognizable aspects are illustrated as a text content "i Slalom" 562 and a trademark content "Head Ski" 564. Another recognizable aspect may include a recognizable ski shape, illustrated as a recognizable outer periphery 566, a recognizable electronic product code, illustrated as an electronically readable bar code 568, and/or a recognizable dimension 565, illustrated as a length of 165 cm.

In a further embodiment, a recognizable aspect may include a textual content portion. For example, a textual content portion may include words printed or displayed on a surface, such as a page of a book, and/or words printed on a cover or a spine of a book. In a further embodiment, a recognizable aspect may include a human language content, for example, text printed in roman alphabet characters, math symbols, and/or script characters such as Asian language characters. In another embodiment, a recognizable aspect may include a human readable content, and/or graphical content. In an embodiment, a recognizable aspect may include a graphical content having a meaning or a significance to a human, such as a picture, a drawing, a figure, a photograph, an illustration, a diagram, a doodle, a decoration, a sketch, and/or a portrait. In another embodiment, a recognizable aspect may be arbitrary and recognizable by an individual human reader, and not recognizable by another individual human reader. In a further embodiment, a recognizable aspect may include any content primarily useful to a human reader. For example, a recognizable aspect may include a textual and/or graphical label on a retail article, such as clothing, a retail package, or a carton. A recognizable aspect may include an address written on a shipping label or an address written on a side of a building. A recognizable aspect may include dynamically displayed matter, such as an alignment of an indicator needle with a speed value on a vehicle speedometer, or a temperature reading on a thermometer. In another embodiment, a recognizable aspect may include an incidental element not primarily employed by a human reader but that aids in distinguishing the item. In an embodiment, a recognizable aspect may include any aspect recognizable by a human, a computing device, a recognition program running on a computing device, a computer implement method, and/or a machine. In another embodiment, a recognizable aspect may include a characteristic form and/or shape, such a pair of skates, a car, and/or a dress. In an embodiment, an aspect may be recognizable locally in response to information indicative of a recognizable aspect of an item. In another embodiment, an aspect may be recognizable in response to information provided by a remote third-party responsive at least in part to information indicative of a recognizable aspect of an item.

The exemplary handheld system 510 includes a writing element 520 operable to form a user expression. The user expression is illustrated as a handwritten user expression "Check the Internet for best ski prices" 550. In an embodiment, the writing element may include an active writing element, such as an ink cartridge operable to discharge a marking fluid onto a surface of a document. The active writing element may include a replaceable ink cartridge. The active writing element may include a disappearing ink. The active writing element may include a pencil lead. In a further embodiment, the writing element may include a non-marking element, such as non-marking stylus. In an alternative embodiment, the system may include a microphone 522 operable to capture an audible user expression, such as a sound, word, and/or sentence.

The handheld system 510 includes an annotating device 530 operable to generate information indicative of a user expression associated with a recognizable aspect of the item 560. In an embodiment where the user expression includes the handwritten user expression 550 visually or spatially associated with the recognizable trademark content "Head Ski" 564 and/or the text content "i Slalom" 562 on the top surface 561, the annotating device includes operability to generate information indicative of the handwritten user expression 550 formed by the writing element 520. Where the exemplary item includes a retail item in a store, such as the ski 560, the writing element may include a non-marking writing element. Alternatively, when the item includes a retail item in a store, a user may adhere a "Post It" type notepaper proximate to a recognizable aspect, handwrite on the "Post It" so as not to damage or mar the item, capture the handwritten expression, and then remove the "Post It." In an embodiment where the user expression includes an audible user expression, such as a spoken sentence "Check the Internet for best ski prices," the annotating device may include operability to generate information indicative of the spoken sentence received by the microphone 522.

The annotating device 530 may be implemented in any manner, including software, hardware, firmware, and/or a combination thereof. The annotating device may be implemented in a manner at least substantially similar to the writing detector module 230 of FIG. 3. In an embodiment, the annotating device may include operability to generate information indicative of a user verbal expression (not shown) associated with the recognizable aspect of the item. The annotating device may include operability to generate information indicative of the handwritten user expression "Check the Internet for best ski prices" 550 associated with the recognizable aspect of the item. The annotating device may include operability to generate information indicative of a user hand drawn expression associated with the recognizable aspect of the item. The annotating device may include operability to generate information indicative of a user gesture associated with the recognizable aspect of the item. The annotating device may include operability to generate information indicative of a user gesture formed at least in part by a user limb. The annotating device may include operability to generate information indicative of a user gesture formed with a user held stylus.

Continuing with FIG. 12, the handheld system 510 includes an annotation environment capture device 540 operable to generate information indicative of a recognizable aspect of an item, such as the text content "i Slalom" 562. The annotation environment capture device may be implemented in any manner, including software, hardware, firmware, and/or any combination thereof. The context-detecting device may be implemented in a manner at least substantially similar to the context detector module 240 of FIG. 3. In an embodiment, the context-detecting device 540 may include operability to generate information indicative of a recognizable aspect of an item in response to data acquired from at least one of several technologies and/or data sources. For example, data indicative of a recognizable aspect of an item may be acquired from data corresponding to the recognizable aspect of the item, such as for example, time of day, time of user expression, time period of user expression, user-entered time, time bracket, date, location, presence of another person, presence of other items, temperature, elevation, bearing, and/or global position coordinates. By way of further example, data corresponding to the recognizable aspect of an item may be acquired at least in part from a radio frequency identification device (RFID). The RFID may be directly associated with the aspect of item, associated with the item, and/or indirectly associated with the item.

In another embodiment, the context-detecting device 540 may include an image capture device 546 having a lens 548. The image capture device and/or the lens may be implemented in a manner at least substantially similar to the image capture device 246 and/or lens 248 of FIG. 3. In an embodiment, the context-detecting device 540 may include a user-activatable switch 542 allowing a user to select when the information indicative of a recognizable aspect of an item will be captured. For example, a user may aim the lens 548 at a recognizable aspect of an item and capture an image by activating the switch 542. The switch may include a hardware switch, a motion sensitive switch, and/or a voice activated switch. In a further embodiment, the context-detecting device may generate raw information indicative of a recognizable aspect of an item. In another embodiment, the context-detecting device may process the raw information indicative of a recognizable aspect of an item.

In an embodiment, the context-detecting device 540 may include operability to generate information indicative of a machine recognizable aspect of an item, such as the ski 560. A machine recognizable aspect of the ski may include a ratio of its length dimension 565 to its width (not shown). The context-detecting device may include operability to generate information indicative of an optically recognizable aspect of an item. The context-detecting device may include operability to generate information indicative of a recognizable human readable content of an item, such as the trademark content "Head Ski" 564. The context-detecting device may include operability to generate information indicative of a recognizable native text of an item, such as the text content "i Slalom" 562. The context-detecting device may include operability to generate information indicative of a recognizable shape aspect of an item, such as the ski shape 566. The context-detecting device may include operability to generate information indicative of a recognizable dimensional aspect of an item, such as the length dimension 565 of the ski 560.

In an alternative embodiment of the handheld system 510, an impact and/or pressure sensitive switch 521 may include a non-marking element version of the writing element 520. Tapping the non-marking element 520 against a surface of an item, such as the surface 561, activates the switch 521. In an embodiment, activation of the switch causes the annotating device 530 to record a verbal user expression. In another embodiment, activation of the switch causes the context-detecting device 540 to acquire an image of a recognizable aspect of the item, such as the trademark content "Head Ski" 564.

In a further embodiment, the context-detecting device 540 may include a module operable to recognize data indicative of the recognizable aspect of an item. The module operable to recognize data indicative of the recognizable aspect of an item may include an artificial intelligence module operable to recognize data indicative of the recognizable aspect of an item. The module operable to recognize data indicative of the recognizable aspect of an item may include a pattern recognition module operable to recognize data indicative of the recognizable aspect of an item.

In an embodiment, the system may include a communications device (not shown). The communications device may include operability to communicate at least one of the information indicative of a recognizable aspect of an item and the information indicative of a user expression associated with the recognizable aspect of the item. In another embodiment, the system may include a storage device (not shown). The storage device may include operability to save at least one of the information indicative of a recognizable aspect of an item and the information indicative of a user expression associated with the recognizable aspect of the item.

As used in this document, an "item" may include a thing, an article, an object, an occurrence, a garment, a vehicle, a body, a person, a worldly matter, and/or a state of an item. An item may include a representation. An item may be very small, such as would require aided vision for human viewing, or an item may be very large, such as a building, an aircraft, vehicle, and/or a vessel that a human could walk through. An item may be animate and/or inanimate.

A user expression may be associated by the user with an item or an aspect of an item in any manner. In an embodiment, the user expression may be physically associated with an aspect of an item by the user. For example, a user may associate a user expression and an aspect of an item by writing the user expression on the item and proximate to the aspect. Writing proximate to the text content "i Slalom" 562 is an example of a user expression associated by the user with an aspect of an item. In another embodiment, the user expression may be temporally associated with an item or aspect of an item. For example, a user may temporally associate a user expression and an item or aspect of an item by speaking at a time when the item or aspect of the item is spatially proximate to the user. In another embodiment, a user may associate a user expression and an item or aspect of an item by a gesture. For example, a user may gesturally associate a user expression and an item or aspect of an item by tapping on or pointing to the item or aspect of the item while speaking.

In operation of an embodiment, a user may wish to associate a user expression with a recognizable aspect of an item.

For example, a user signing a printed credit card slip in a restaurant may wish to associate information indicative of their entries and the printed credit card slip. In addition, a user may wish to associate information indicative of the meal and the printed credit card slip. In this example, the handheld system 510 generally having a shape of a common writing pen may be used. A written user expression associated with the credit card slip may include a user written entry for a tip, a user written entry for a total charge, and a user written signature entry, made with the active writing element 520 having an ink tip.

In an embodiment, the written entries are captured by the annotating device 530. In another embodiment, images of the written entries are captured by the image capture device 546. Further, before, during, and/or after the writing, the user may verbally express a description the meal and the quality of the meal in association with the printed credit card slip, and perhaps a description of a wine consumed during the meal. A user verbal expression is captured by the microphone 522.

Also, before, during, and/or after the writing, the image capture device 546 captures an image indicative of at least one recognizable aspect of the printed credit card slip. A recognizable aspect of the credit card slip may include a name of the restaurant, a date, a time, a charge for meals, a sever name, and/or a charge for wine.

The annotating device 530 generates information indicative of the user's verbal expression(s) and/or the user's handwritten expression(s). The context-detecting device 540 generates information indicative of a recognizable aspect of the credit card slip. The information indicative of a recognizable aspect of the credit card slip and/or the information indicative of the user expression may be saved in the handheld system for later communication to a computing device, such as a computer device running an expense account program.

Figure 13:
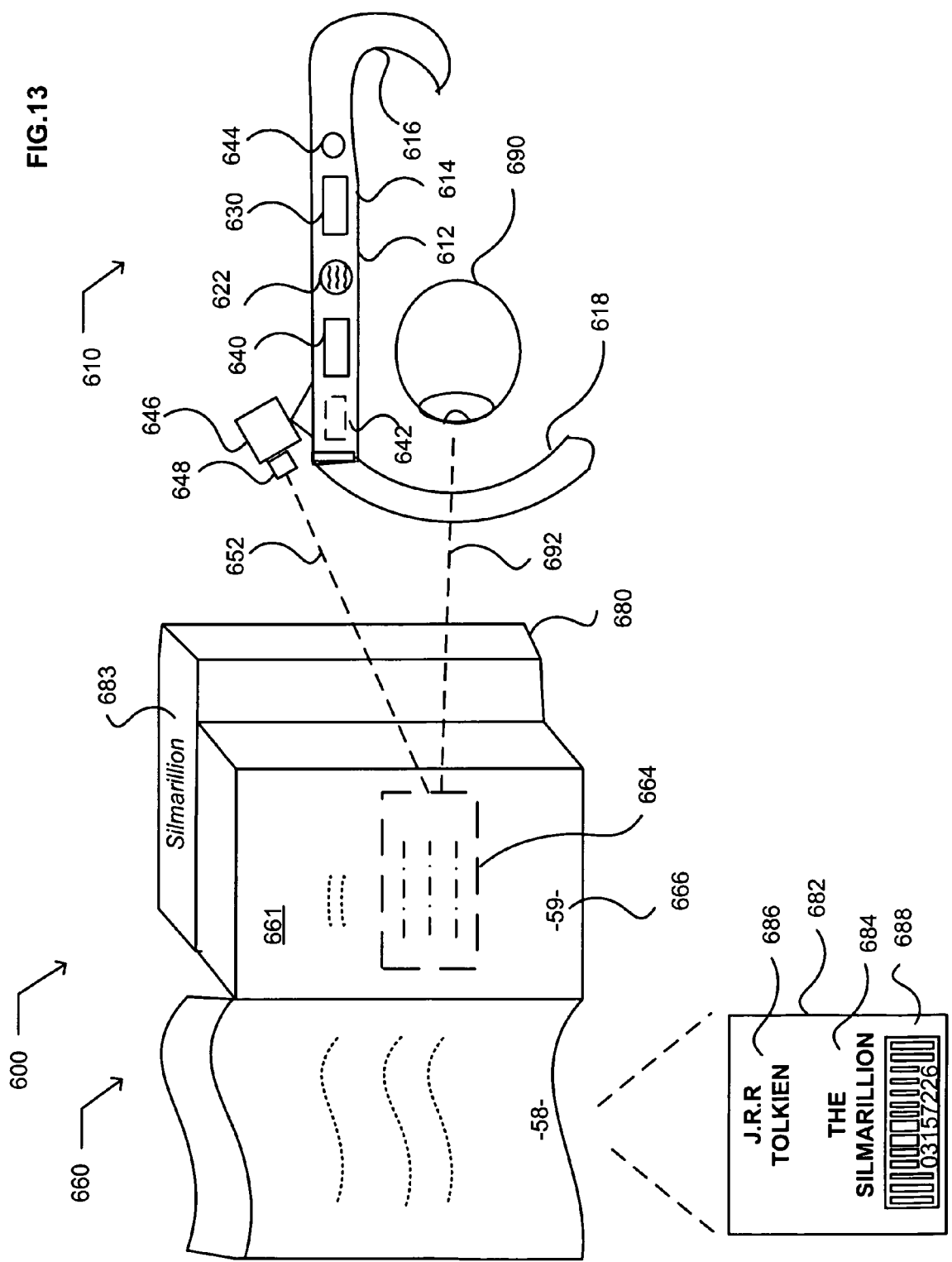
FIG. 13 illustrates an environment that includes a partial view of an exemplary annotation system and a partial view of an exemplary item.

FIG. 13 illustrates an environment 600 that includes a partial view of an exemplary annotation system and a partial view of an exemplary item. The exemplary annotation system is illustrated as an exemplary human wearable annotation system 610, which is further illustrated as an exemplary head mountable system 612. The exemplary item is illustrated as an exemplary bound paper book 660. The exemplary book illustrates several exemplary recognizable aspects, including a cover 682, an author name 686, illustrated as J. R. R. Tolkien, a cover title 684, illustrated as "The Silmarillion," and an electronically readable product code 688, illustrated as a bar code. Further illustrated exemplary recognizable aspects include a page having a page number 666, illustrated as page number "59," a page surface 661, and a binding 680 having a binding title 683, illustrated as "Silmarillion." The exemplary book also illustrates an exemplary recognizable aspect that includes a recognizable text content 664 printed on and native to the page surface 661 of the page number 59.

The exemplary head mountable system 612 includes a frame 614, which includes an earpiece 616 and an eye cover 618. In an optional embodiment, the eye cover may be omitted. The frame includes a configuration to be worn in a manner similar to a pair of eyeglasses. In an embodiment, the eye cover 618 includes a configuration that allows a substantially unobstructed line of sight, illustrated as a eye gaze 692, between an eye 690 and an aspect of an item, illustrated as the recognizable text 664. In an embodiment, the frame provides a structure that incorporates an annotating device 630, an annotation environment capture device 640, and a microphone 622 and associated sound capture circuitry. In an optional embodiment, the frame may also provide a structure that incorporates a user-activatable switch 644. In another embodiment, the system 612 may include any configuration allowing it to be worn on a head.

The annotation environment capture device 640 includes operability to generate information indicative of a recognizable aspect of an item. In an embodiment, annotation environment capture device includes a tracking module 642 operable to track the eye gaze 692 directed proximate to a recognizable aspect of the item. In another embodiment, the annotation environment capture device includes an image capture module 646 operable to acquire an image of a recognizable aspect of the item. In a further embodiment, the annotation environment capture device includes an image capture module 646 and a lens 648 operable to acquire an image of a recognizable aspect of the item in response to a signal indicative of a received user command. The user command may include a verbal command, a gestural command, and/or activation of a switch, such as the switch 644. The capture module 646 and the lens 648 direct a lens track 652 on a recognizable aspect of an item.

The annotation environment capture device 640 operable to generate information indicative of a recognizable aspect of an item may include a module operable to recognize data indicative of the recognizable aspect of an item. The module operable to recognize data indicative of the recognizable aspect of an item may include an artificial intelligence module operable to recognize data indicative of the recognizable aspect of an item. The module operable to recognize data indicative of the recognizable aspect of an item may include a pattern recognition module operable to recognize data indicative of the recognizable aspect of an item.

The annotation environment capture device operable to generate information indicative of a recognizable aspect of an item may include a tracking module operable to track an eye gaze directed proximate to the recognizable aspect of the item. The annotation environment capture device operable to generate information indicative of a recognizable aspect of an item may include a receiver circuit operable to receive a signal containing data indicative of a recognizable aspect of the item. The annotation environment capture device operable to generate information indicative of a recognizable aspect of an item may include an image capture module operable to acquire an image of a recognizable aspect of the item. The annotation environment capture device operable to generate information indicative of a recognizable aspect of an item may include an image capture module operable to acquire an image of a recognizable aspect of the item in response to a signal indicative of a received user command.

The annotation environment capture device 640 may include operability to generate information indicative of a machine recognizable aspect of an item. In an embodiment, a machine recognizable aspect of an item may include the author name 686, the cover title 684, the page number 666, the binding title 683, the electronically readable product code 688, and/or the text content 664. The annotation environment capture device may include operability to generate information indicative of an optically recognizable aspect of an item. In an embodiment, an optically recognizable aspect of an item may include the author name, the cover title, the page number, the binding title, and/or the text content. The annotation environment capture device may include operability to generate information indicative of a human recognizable aspect of an item. In an embodiment, a human recognizable aspect of an item may include the author name, the cover title, the page number, the binding title, and/or the text content. The annotation environment capture device may include operability to generate information indicative of a recognizable native text of an item. In an embodiment, a recognizable native text of an item may include the author name, the cover title, the page number, the binding title, and/or the text content. The annotation environment capture device may include operability to generate information indicative of a recognizable visual aspect of an item. In an embodiment, a recognizable aspect of an item may include an optically recognizable author name, cover title, page number, binding title, and/or text content. The annotation environment capture device may include operability to generate information indicative of a recognizable image aspect of an item. In an embodiment, a recognizable image aspect may include a picture, a figure, a drawing, and/or a graphic element (not shown) of the item. The annotation environment capture device may include operability to generate information indicative of a recognizable aspect of an item. In an embodiment, a recognizable aspect may include any recognizable aspect of the book. The annotation environment capture device may include operability to generate information indicative of a recognizable human readable content. In an embodiment, a recognizable human readable content may include the author name, the cover title, the page number, the binding title, and/or the text content. The context-detecting device operable to generate information indicative of a recognizable aspect of an item may include a context-detecting device operable to generate information indicative of a recognizable audio aspect of an item. For example, the context-detecting device may include an operability to generate information indicative of a recognizable excerpt of a music piece, such as a song, or an excerpt of a speech.

The annotation environment capture device operable to generate information indicative of a recognizable aspect of an item may include an annotation environment capture device operable to generate information indicative of a recognizable aspect of an item in response to an input received from the user. For example, an input received from a user may include an interaction with a user to select an item to which the user expression is associated from among at least two candidate items in an image. By way of further example, an input received from a user may include an interaction with a user to select an aspect of an item to which the user expression is associated from among at least two candidate aspects of an item. The annotation environment capture device operable to generate information indicative of a recognizable aspect of an item may include an annotation environment capture device operable to generate information indicative of a recognizable aspect of an item in response to an input responsive to a gesture by the user. For example, an input responsive to a user gesture may include a user pointing to an item to which the user expression is associated from among at least two candidate items in an environment.

The annotation environment capture device 640 operable to generate information indicative of a recognizable aspect of an item may include an annotation environment capture device operable to generate information indicative of a recognizable shape aspect of an item. The annotation environment capture device operable to generate information indicative of a recognizable aspect of an item may include an annotation environment capture device operable to generate information indicative of a recognizable dimensional aspect of an item.

In a further embodiment, the annotation environment capture device 640 may include a module operable to recognize data indicative of the recognizable aspect of an item. The module operable to recognize data indicative of the recognizable aspect of an item may include an artificial intelligence module operable to recognize data indicative of the recognizable aspect of an item. The module operable to recognize data indicative of the recognizable aspect of an item may include a pattern recognition module operable to recognize data indicative of the recognizable aspect of an item.

The annotation environment capture device 640 may be implemented in any manner, including software, hardware, firmware, and/or any combination thereof. The annotation environment capture device may be implemented in a manner at least substantially similar to the context-detector module 240 of FIG. 3.

Continuing with FIG. 13, the annotating device 630 includes operability to generate information indicative of a user expression associated with the recognizable aspect of the item. In an embodiment, the annotating device may include operability to generate information indicative of a user verbal expression associated with the recognizable aspect of the item. In an embodiment, a user verbal expression may include a verbal sound, a word, at least two words, and/or a sentence. In another embodiment, a user verbal expression may include any vocal expression a user wishes to associate with the recognizable aspect of the item. In an embodiment, the annotating device includes operability to generate information indicative of a preformed user expression associated with the recognizable aspect of the item. In a further embodiment, a preformed user verbal expression may include at least one word representative of at least two words. For example, a verbalized word "high" may represent a verbal expression of "this aspect is of high interest to me."

The annotating device 630 may be implemented in any manner, including software, hardware, firmware, and/or any combination thereof. The annotating device may be implemented in a manner at least substantially similar to the context-detector module 230 of FIG. 3.

In operation of an embodiment, a user may don the exemplary head mountable system 612 in a manner similar to eyeglasses. The person may direct their eye gaze 692 through the eye cover 618 and at one or more recognizable aspects of an item, such as for example, the text content 664. Alternatively, the user's gaze 692 may be directed toward any other recognizable aspect of the book described above, for example, the title 684. The tracking module 642 tracks the gaze 692 of the user's eye 690 and aligns the lens track 652 of the lens 648 of the image capture module 646 with the recognizable text content. An image of the text content 664 may be captured. The capture may be automatic, such as in response to a predetermined time that the gaze 692 is directed toward the recognizable text context, and/or such as in response to the user making a verbal expression associated with the recognizable text context. Alternatively, the capture may be in response the user activating the switch 644 through a touch or verbal command. The context-detector 640 generates information indicative of the recognizable text context responsive to the captured image.

Continuing with the exemplary operation, the user may utter a verbal expression for connection or association with the recognizable aspect of the book 660, which in this example includes the recognizable text aspect 664. The verbal expression may be any verbal expression. For example, a verbal expression may include "This is really interesting stuff," or "This statement contradicts a statement at page 12." The verbal expression is captured by the microphone 622. The annotating device generates information indicative of the user expression in response to the captured verbal expression.

In an alternative embodiment, the exemplary human wearable system 610 may comprise two separate human wearable elements. For example, the annotation environment capture device 640 may be carried in a first element wearable on a person's head and the annotation device 630 carried in a second element wearable around the person's neck. In a further embodiment, the annotating device may include an annotating device having a configuration selected from a group consisting of a handheld device, a wearable device, and a head mountable device. The annotation environment capture device includes an annotation environment capture device having a configuration other than the selected configuration of the annotating device. In another embodiment, the annotation environment capture device may include an annotation environment capture device having a configuration selected from a group consisting of a handheld device, a wearable device, and a head mountable device. The annotating device includes an annotating device having a configuration other than the selected configuration of the annotation environment capture device.

Figure 14:
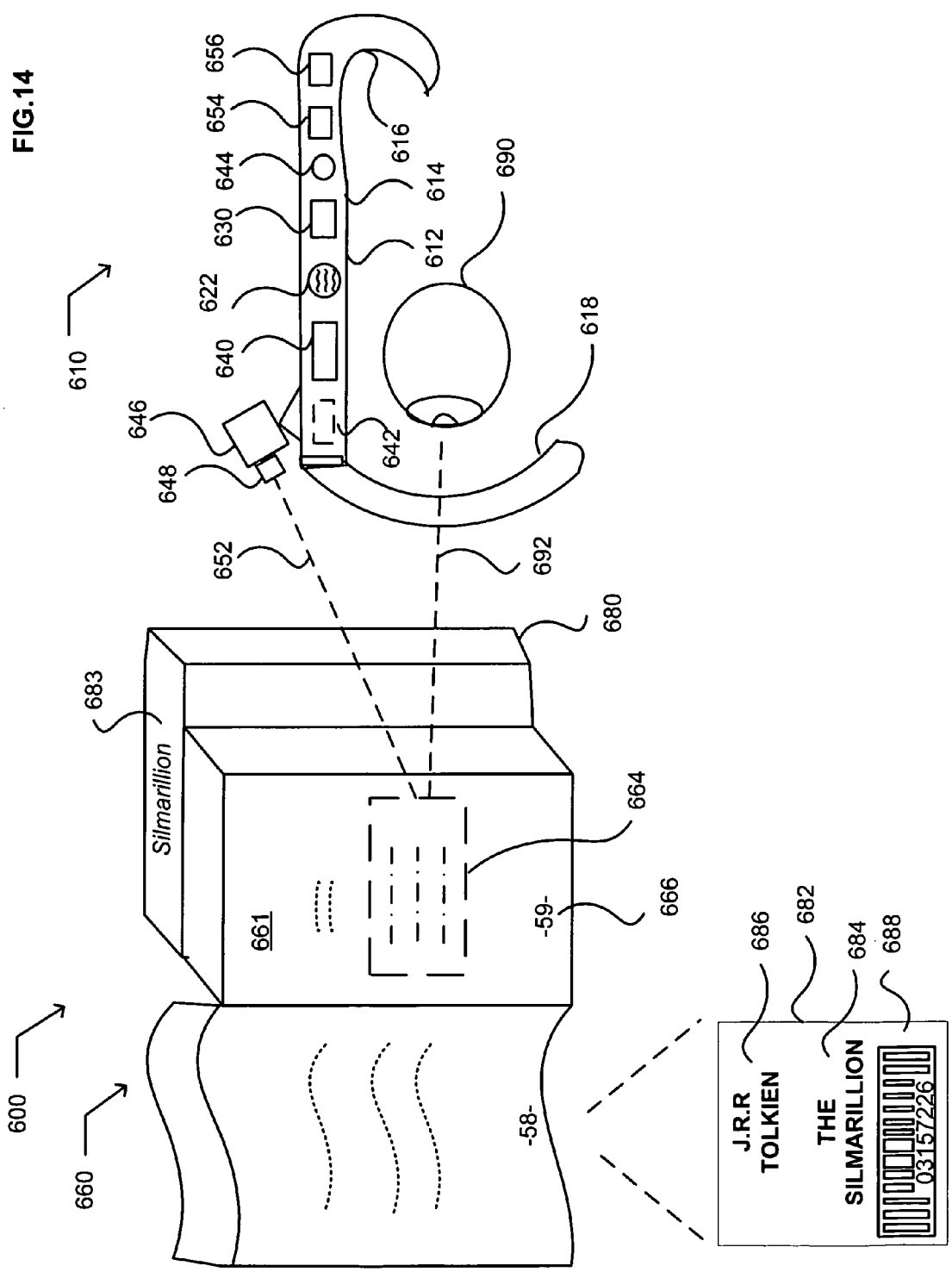
FIG. 14 illustrates a partial view an alternative embodiment of the environment of FIG. 13.

FIG. 14 illustrates a partial view an alternative embodiment of the environment 600 of FIG. 13. The exemplary head mountable system 612 may include at least one additional device. An additional device may include a communications device 654 coupled with an antenna (not shown), and a storage device 656. The communications device includes operability to communicate at least one of the information indicative of a recognizable aspect of an item and the information indicative of a user expression associated with the recognizable aspect of the item. The storage device includes operability to save at least one of the information indicative of a recognizable aspect of an item and the information indicative of a user expression associated with the recognizable aspect of the item.

Figure 15:
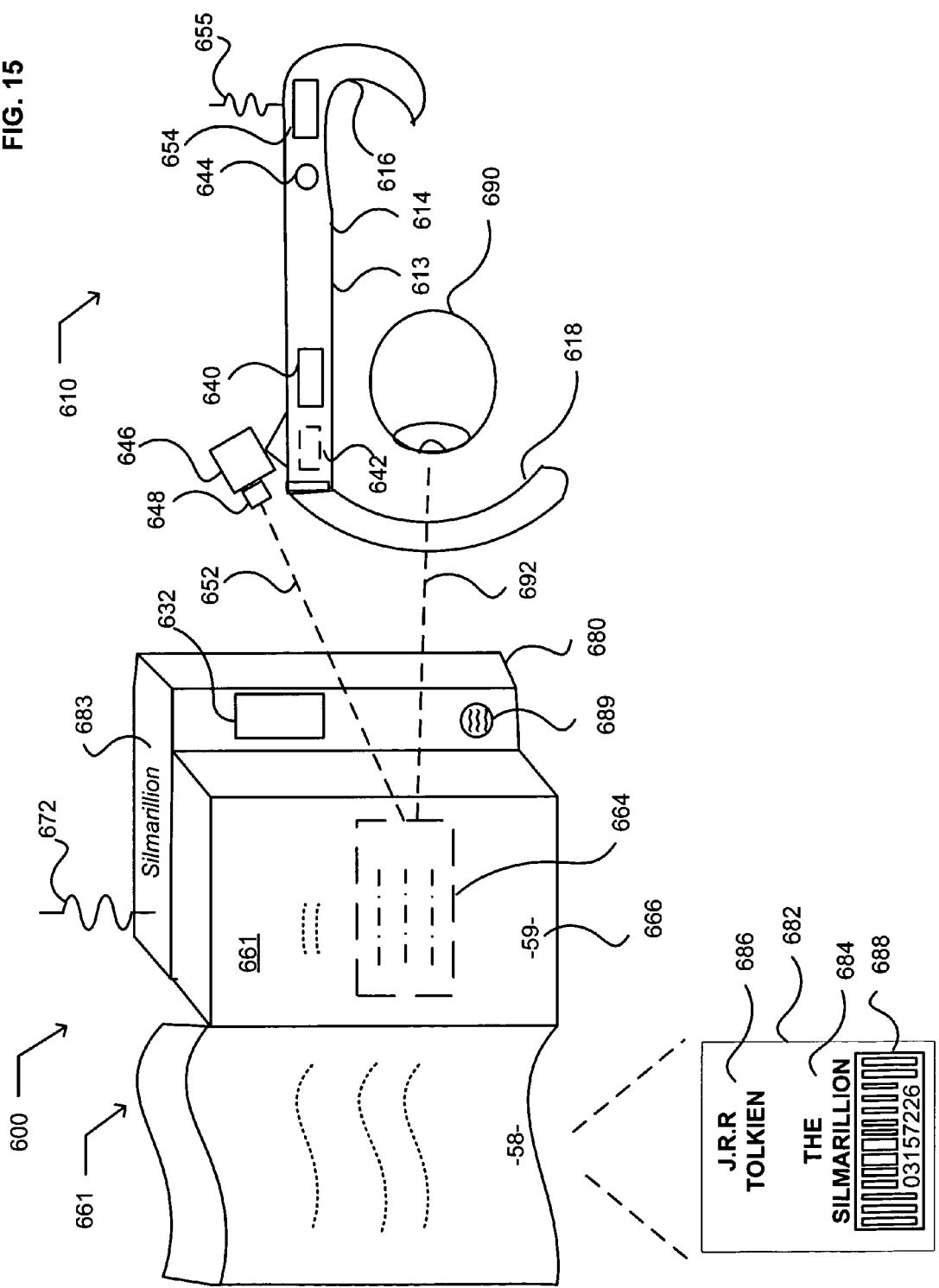
FIG. 15 illustrates a partial view of an alternative embodiment of the environment of FIG. 13 that includes an exemplary head mountable system and an exemplary item illustrated as an exemplary bound book.

FIG. 15 illustrates a partial view of an alternative embodiment of the environment 600 of FIG. 13 that includes an exemplary head mountable system 613 and an exemplary item illustrated as an exemplary bound book 661. The alternative embodiment of the environment 600 includes an exemplary distributed annotation system. The system 613 includes the context-detection module 640, a communications device 654 coupled with an antenna 655. The system 613 is operable to generate information indicative of a recognizable aspect of the item, illustrated as the book 661.

The book 661 includes microphone 689 and associated sound capture circuitry, an annotating device 632, and an antenna 672 coupled with a communications device (not shown). The annotating device 632 includes operability to generate information indicative of a user expression associated with a recognizable aspect of the item, illustrated as the book 661. The annotating device 632 is at least substantially similar to the annotating device 630 of FIG. 13. The microphone 689 and associated sound capture circuitry is at least substantially similar to the microphone 622 and associated sound capture circuitry of FIG. 13. At least one of the communications devices may be configured as a receiver circuit, a transmission circuit, and/or a transceiver circuit.

In operation of an embodiment, a user may don and use the exemplary head mountable system 613 to generate information indicative of a recognizable aspect of an item in a manner at least substantially similar to the system 612 of FIG. 13. Also, as described in conjunction with FIG. 13, the user utters a verbal expression for connection or association with the recognizable aspect of the book 660, which in this example includes the recognizable text aspect 664. In the embodiment illustrated in FIG. 15, the verbal expression is captured by the microphone 689. The annotating device 632 generates information indicative of the user expression in response to the captured verbal expression. In one embodiment, one of the book 661 and the head mountable system 613 may transmit the respective information generated by their device to the other. In another embodiment, the book and the system may transmit the respective information generated by their devices to a third device.

Figure 16:
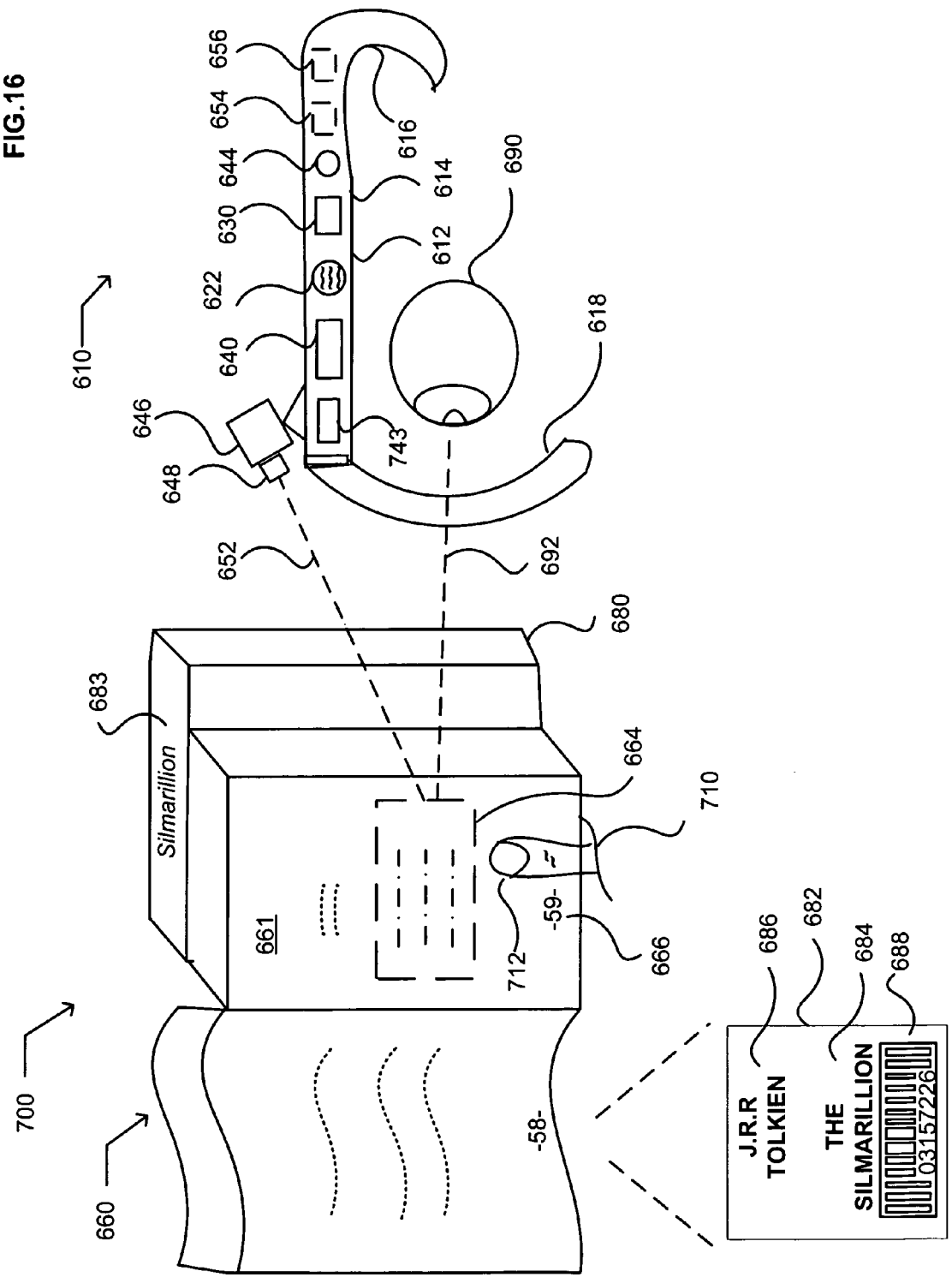
FIG. 16 illustrates an environment that includes a partial view of an exemplary annotation system and a partial view of an exemplary item.

FIG. 16 illustrates an environment 700 that includes a partial view of an exemplary annotation system and a partial view of an exemplary item. The exemplary annotation system is illustrated as an exemplary human wearable system 610, which is further illustrated as an exemplary head mountable system 612. The exemplary item is illustrated as an exemplary bound paper book 660.

The system 612 includes a tracking module 743 carried in the frame 614 and operable to track a user finger 710 and/or a user fingertip 712 proximate to a recognizable aspect of the item, such as the recognizable text content 664 printed on and/or native to the page surface 661. In an embodiment, the tracking module may include operability to track a gesture formed by the user finger and/or the user fingertip.

In an alternative embodiment, the tracking module 743 includes operability to track a stylus. For example, a tracked stylus may include a hand holdable stylus (not shown) proximate to a recognizable aspect of the item.

In operation, a user may place their fingertip 712 and/or their finger 710 on the surface 661 of the page and proximate to the recognizable text content 664. The tracking module 743 tracks the finger and/or fingertip, and upon occurrence of a predetermined condition acquires data indicative of the recognizable text content 664. The predetermined condition may include a gesture with the finger and/or fingertip proximate to the recognizable text content. For example, in an embodiment, the predetermined condition may include tapping the fingertip three times on the page surface 661 proximate to the recognizable text content. In another embodiment, the predetermined condition may include the user activating the switch 644. In a further embodiment, the predetermined condition may include the user speaking a voice command received at the microphone 622. In an embodiment, the predetermined condition may include the fingertip remaining stationary and proximate to the recognizable text content for a predetermined time. The context-detector generates information indicative of a recognizable aspect of the text content in response to the acquired data. Alternatively, the fingertip may be placed proximate to another recognizable aspect of the book 660. For example, another recognizable aspect of the book may include the cover title 684.

The user may create an expression associated with the recognizable aspect of the book 660. In an embodiment, the user may create a verbal expression for association with the recognizable aspect of the item. The verbal expression may be received by the microphone 622. In another embodiment, the user may create the expression by a user gesture associated with the recognizable aspect of the item. The user gesture may be formed at least a part by a user limb associated with the recognizable aspect of the item. The user gesture may be captured by the image capture module 646.

In another embodiment, the annotation environment capture device may remain incorporated in the system 612, and a microphone and an annotating device may be incorporated into a structure of the book 660. For example, the microphone and annotating device may be incorporated as illustrated in conjunction with the book 661 of FIG. 15.

Figure 17:
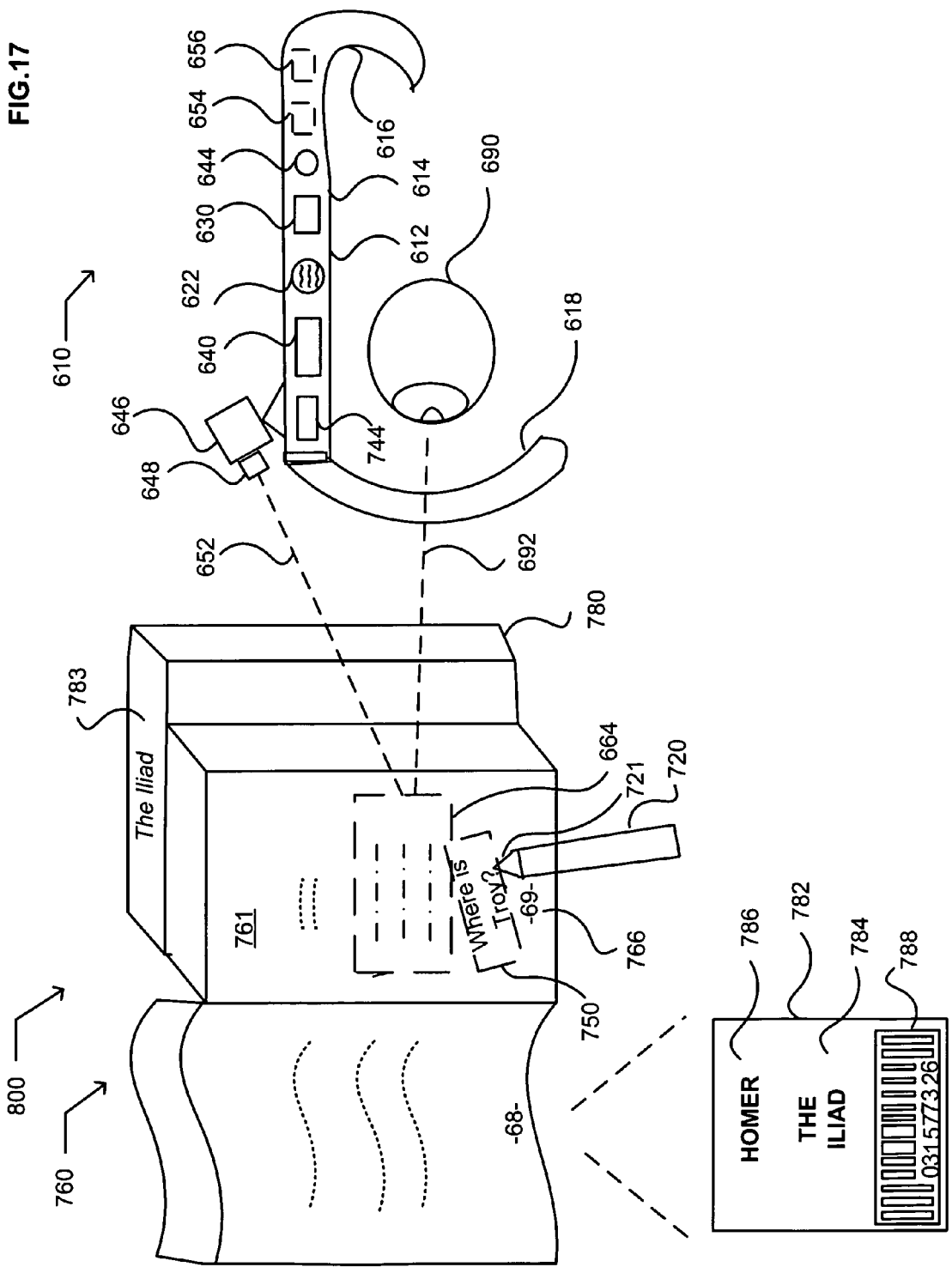
FIG. 17 illustrates an environment that includes a partial view of an exemplary annotation system and a partial view of an exemplary item.

FIG. 17 illustrates an environment 800 that includes a partial view of an exemplary annotation system and a partial view of an exemplary item. The exemplary annotation system is illustrated as an exemplary human wearable system 610, which is further illustrated as the exemplary head mountable system 612. The exemplary item is illustrated as an exemplary bound paper book 760. The exemplary book illustrates several exemplary recognizable aspects, including a cover 782, an author name 786, illustrated as Homer, a cover title 784, illustrated as THE ILIAD, and an electronically readable product code 788, illustrated as a bar code. Further illustrated exemplary recognizable aspects include a page having a page number 766, illustrated as page number "69," a page surface 761, and a binding 780 having a binding title 783, illustrated as THE ILIAD. The exemplary book also illustrates an exemplary recognizable aspect that includes a recognizable text content 664 printed on and native to the page surface 761 of the page number 69.

FIG. 17 also includes a handwriting instrument, illustrated as a pen 720 having a writing tip 721. The pen is illustrated as having formed the handwritten characters "Where is Troy?" 750 in response to a user action.

The exemplary head mountable system 612 includes the frame 614 as described in conjunction with FIG. 13. The frame includes a handwriting-tracking module 744 operable to acquire data indicative of the handwritten annotation 750. In an embodiment, the handwriting-tracking module 744 includes operability to acquire data indicative of the handwritten annotation in response to detected movements by the pen-writing tip 721. In another embodiment, the handwriting-tracking module includes operability acquire data indicative of the handwritten annotation in response to images of the pen-writing tip and/or the handwritten characters. The images may be captured by the capture module 646.

In operation of an embodiment, a user may don and use the exemplary head mountable system 612, and allow the system to generate information indicative of a recognizable aspect of an item in a manner at least substantially similar to the system 612 of FIG. 13. In addition, the user may grasp the pen 720 in their hand and hand generate a user expression, such as the annotation 750, using the pen tip 721 and proximate to a recognizable aspect, such as the recognizable text content 664. Data indicative of the hand-generated annotation is acquired by the handwriting-tracking module 744, and the annotating device 640 generates information indicative of the user expression associated with the recognizable text content 664.

In an alternative embodiment not illustrated, the handwriting instrument may include an annotating device operable to generate information indicative of a user expression associated with the recognizable aspect of the item. The annotating device may be at least substantially similar to the annotating device 530 described in conjunction with FIG. 12.

Figure 18:
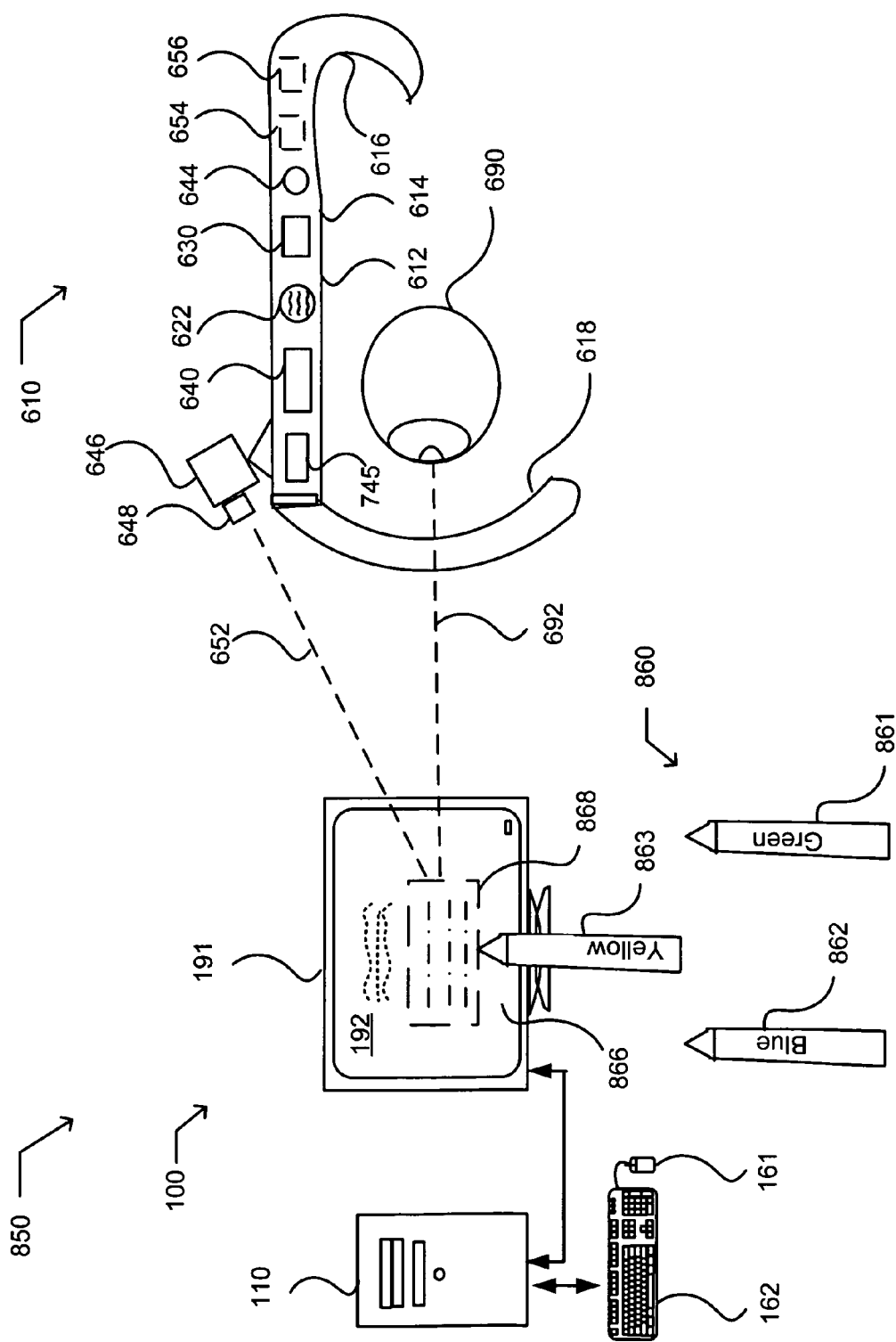
FIG. 18 illustrates an environment that includes a partial view of an exemplary annotation system and a partial view of an exemplary item.

FIG. 18 illustrates an environment 850 that includes a partial view of an exemplary annotation system and a partial view of an exemplary item. The exemplary annotation system is illustrated as an exemplary human wearable system 610, which is further illustrated as an exemplary head mountable system 612 of FIG. 13 and others. The exemplary item is illustrated as an exemplary document with a page 866 thereof displayed through a surface 192 of the monitor 191 of the computing system environment 100 of FIG. 2. The displayed page includes a recognizable text content 868. The head mountable system 612 includes a stylus-tracking module 745 operable to acquire data indicative of a preformed annotation.

The environment 850 also includes a stylus corresponding to a preformed user expression. In an embodiment illustrated in FIG. 18, the stylus is illustrated as a stylus set 860 of three individual styluses that include a green stylus 861, a blue stylus 862, and a yellow stylus 863. In an embodiment, the set of styluses are illustrative of "hi-liter" type highlighting markers used by students and others to annotate course materials. A stylus may have any preformed expression. For example, in an embodiment, the yellow stylus may correspond to a preformed user expression of "highly interesting material." the red stylus may correspond to a preformed user expression of "dumb material." In an embodiment, a stylus may transmit a signal indicative of a preselected or preformed annotation. In another embodiment, a stylus may include an optically recognizable feature indicative of a preselected or preformed annotation. An optically recognizable feature may include a color, a bar code, and/or a shape.

In operation of an embodiment, a user may don and use the exemplary head mountable system 612, and allow the system to generate information indicative of a recognizable aspect of an item in a manner at least substantially similar to the system 612 of FIG. 13. In addition, the user may grasp a stylus in their hand, such as the yellow stylus 863, and use the stylus to associate a preformed user expression with the recognizable text content 868 of the document. The user expression may be associated in any manner that may be captured by the stylus-tracking module 745. For example, in an embodiment, the stylus-tracking module may be operable to capture a tapping of a tip of the yellow stylus 863 proximate to the recognizable text content as a preformed user expression of "highly interesting material." In another embodiment, the stylus-tracking module may be operable to capture a closed figure drawn around the recognizable text content with the tip of a stylus as a preformed user expression, the nature of which is established by the particular stylus selected from the stylus set 860. The annotating device 630 generates information indicative of the user expression associated with the recognizable text context in response to the captured preformed user expression.

Figure 19:
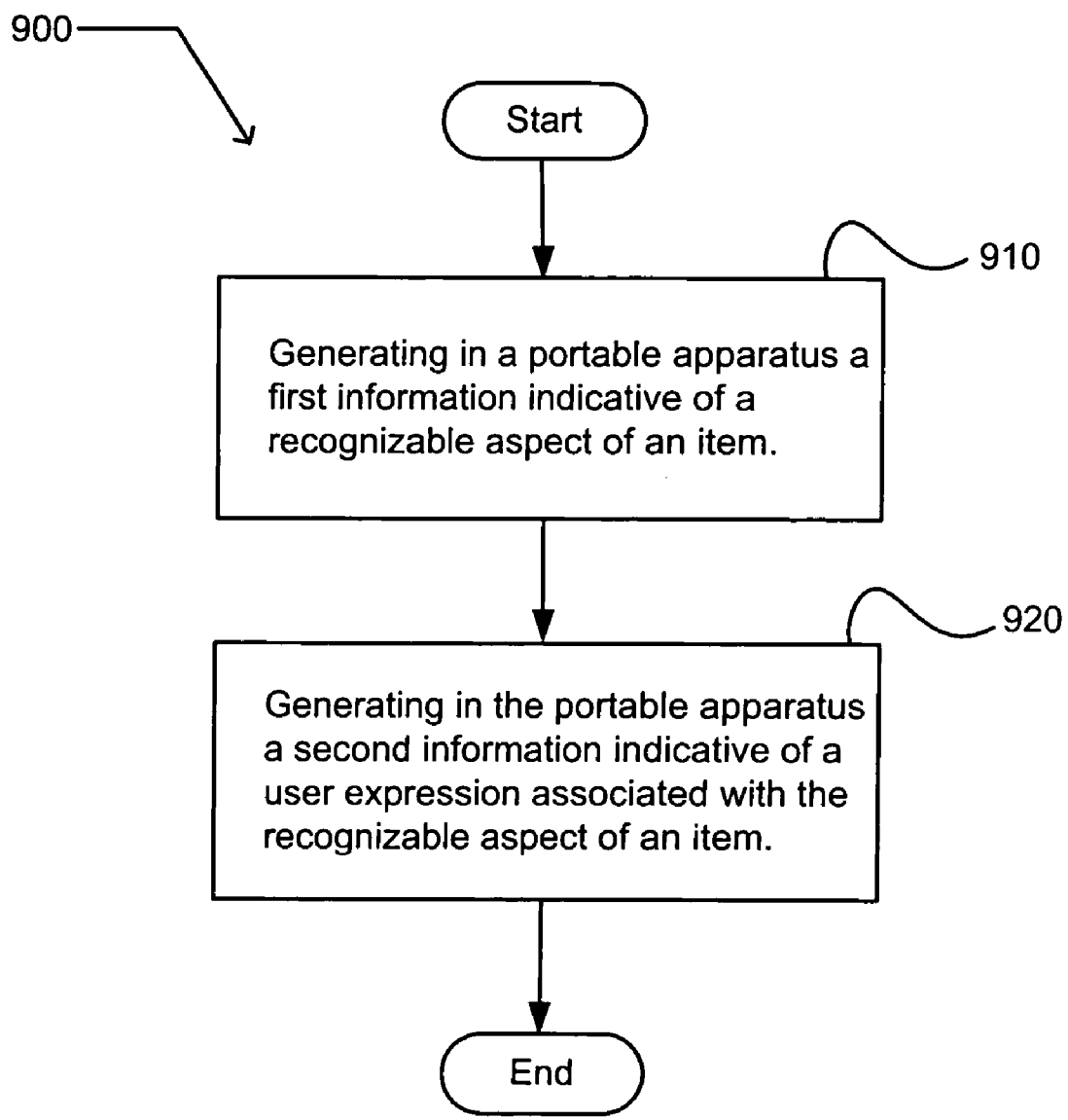
FIG. 19 illustrates an exemplary operational flow.

FIG. 19 illustrates an exemplary operational flow 900. After a start operation, the operational flow moves to a context operation 910. At the context operation, a first information indicative of a recognizable aspect of an item is generated in a portable apparatus. At a context operation 920, a second information indicative of a user expression associated with the recognizable aspect of an item is generated in the portable apparatus. The operational flow then moves to an end operation.

Figure 20:
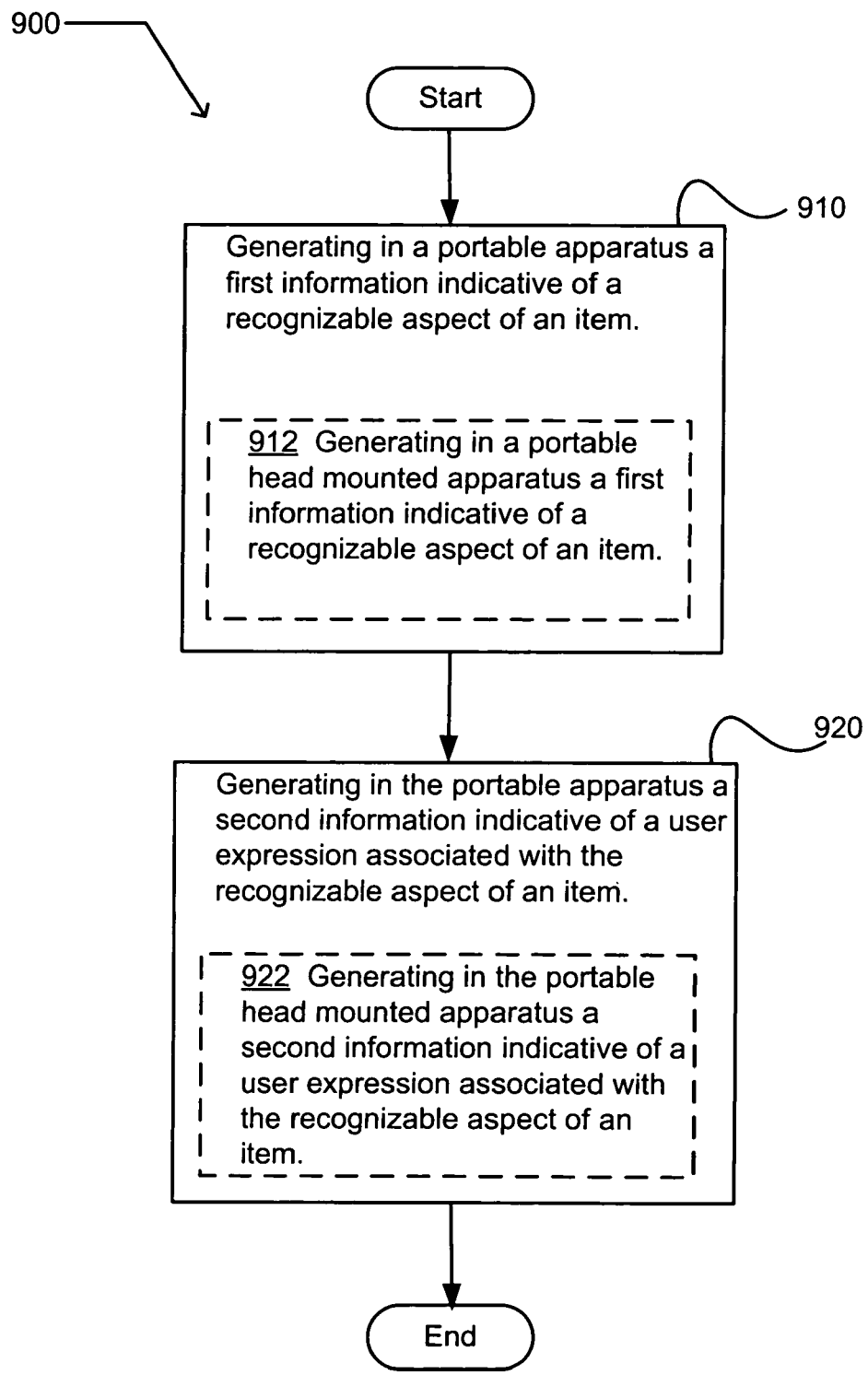
FIG. 20 illustrates an alternative embodiment of the exemplary operational flow of FIG. 19.

FIG. 20 illustrates an alternative embodiment of the exemplary operational flow 900 of FIG. 19. The context operation 910 may include at least one additional operation, such as an operation 912. At the operation 912, a first information indicative of a recognizable aspect of an item is generated in a portable head mountable apparatus. The content operation 920 may include at least one additional operation, such as an operation 922. At the operation 922, a second information indicative of a user expression associated with the recognizable aspect of an item is generated in the portable head mountable apparatus.

Figure 21:
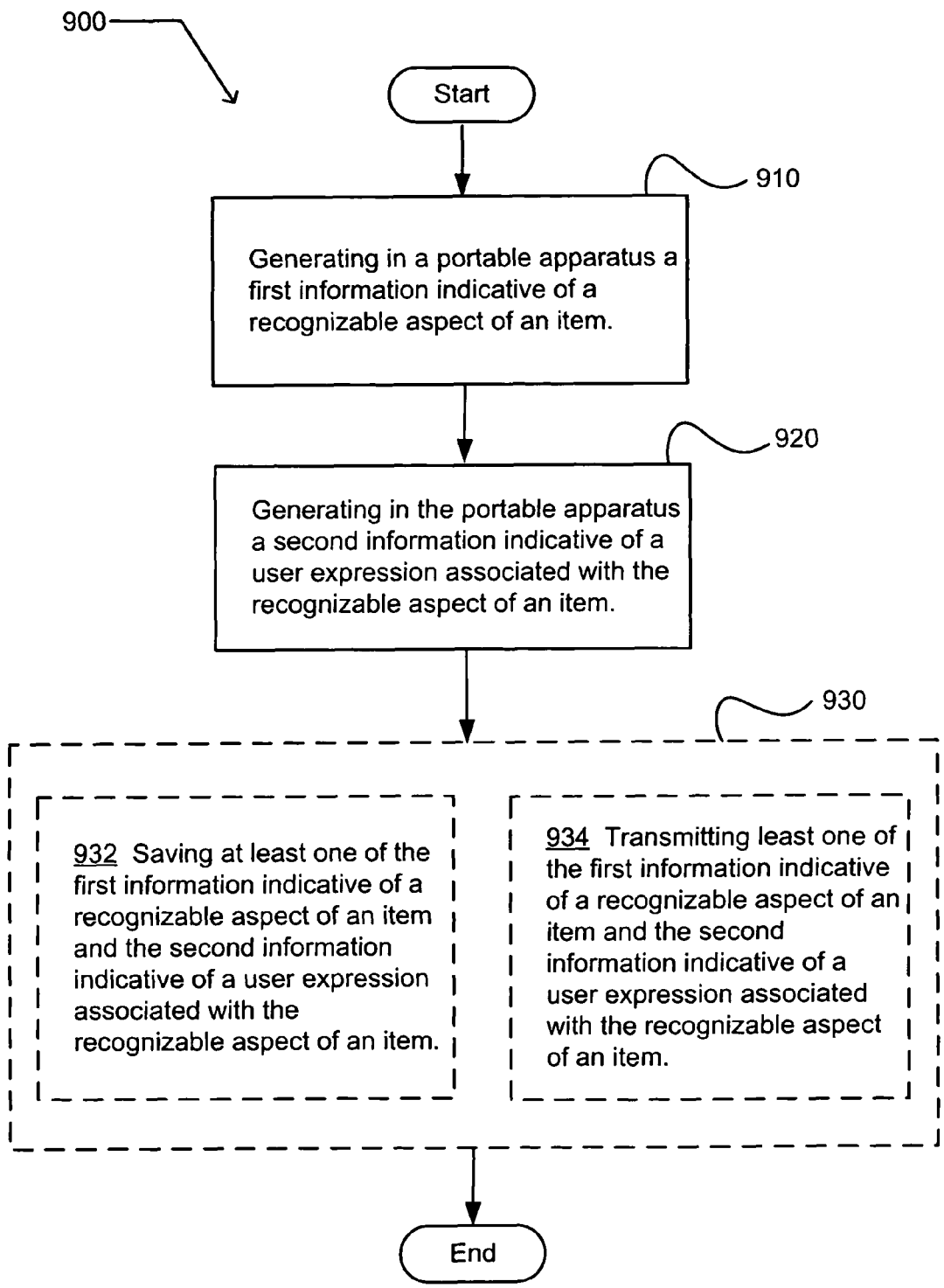
FIG. 21 illustrates another alternative embodiment of the exemplary operational flow of FIG. 19.

FIG. 21 illustrates another alternative embodiment of the exemplary operational flow 900 of FIG. 19. The operational flow 900 may include at least one additional operation 930. The additional operation 930 may include a storage operation 932 and/or a communication operation 934. The storage operation 932 may include saving at least one of the first information indicative of a recognizable aspect of an item and the second information indicative of a user expression associated with the recognizable aspect of an item. The communication operation 934 may include transmitting least one of the first information indicative of a recognizable aspect of an item and the second information indicative of a user expression associated with the recognizable aspect of an item.

FIG. 22 illustrates a partial view of an exemplary wearable apparatus 950. The apparatus includes a context module 955 operable to generate a first information indicative of a recognizable aspect of an item. The apparatus also includes an annotation module 960 operable to generate a second information indicative of a user expression associated with the recognizable aspect of an item. In an embodiment, the apparatus may include at least one additional module. The additional module may include a communications module 965 operable to transmit at least one of the first information indicative of a recognizable aspect of an item and the second information indicative of a user expression associated with the recognizable aspect of an item. The additional module may include a storage module 970 operable to save at least one of the first information indicative of a recognizable aspect of an item and the second information indicative of a user expression associated with the recognizable aspect of an item.

Figure 23:
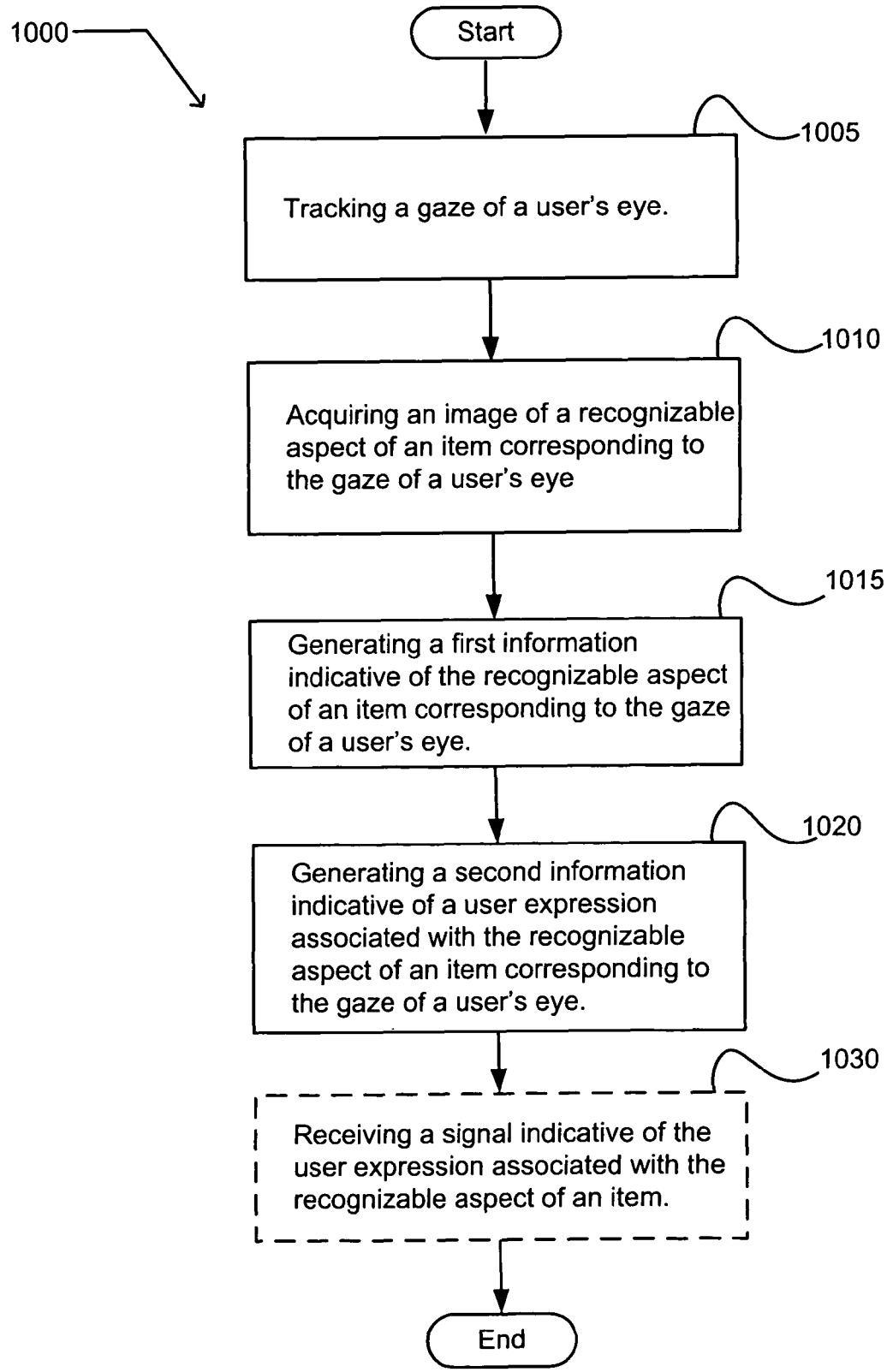
FIG. 23 illustrates an exemplary operational flow.

FIG. 23 illustrates an exemplary operational flow 1000. After a start operation, the operational flow moves to a monitoring operation 1005. At the monitoring operation, a gaze of a user's eye is tracked. At a capture operation 1010, an image is acquired of a recognizable aspect of an item corresponding to the gaze of a user's eye. At a context processing operation 1015, a first information is generated indicative of the recognizable aspect of an item corresponding to the gaze of a user's eye. At an annotation processing operation 1020, a second information is generated indicative of a user expression associated with the recognizable aspect of an item corresponding to the gaze of a user's eye. The operational flow then proceeds to an end operation.

In an embodiment, the operational flow 1000 may include at least one additional operation, such as an operation 1030. At the operation 1030, a signal is received indicative of the user expression associated with the recognizable aspect of an item.

Figure 24:
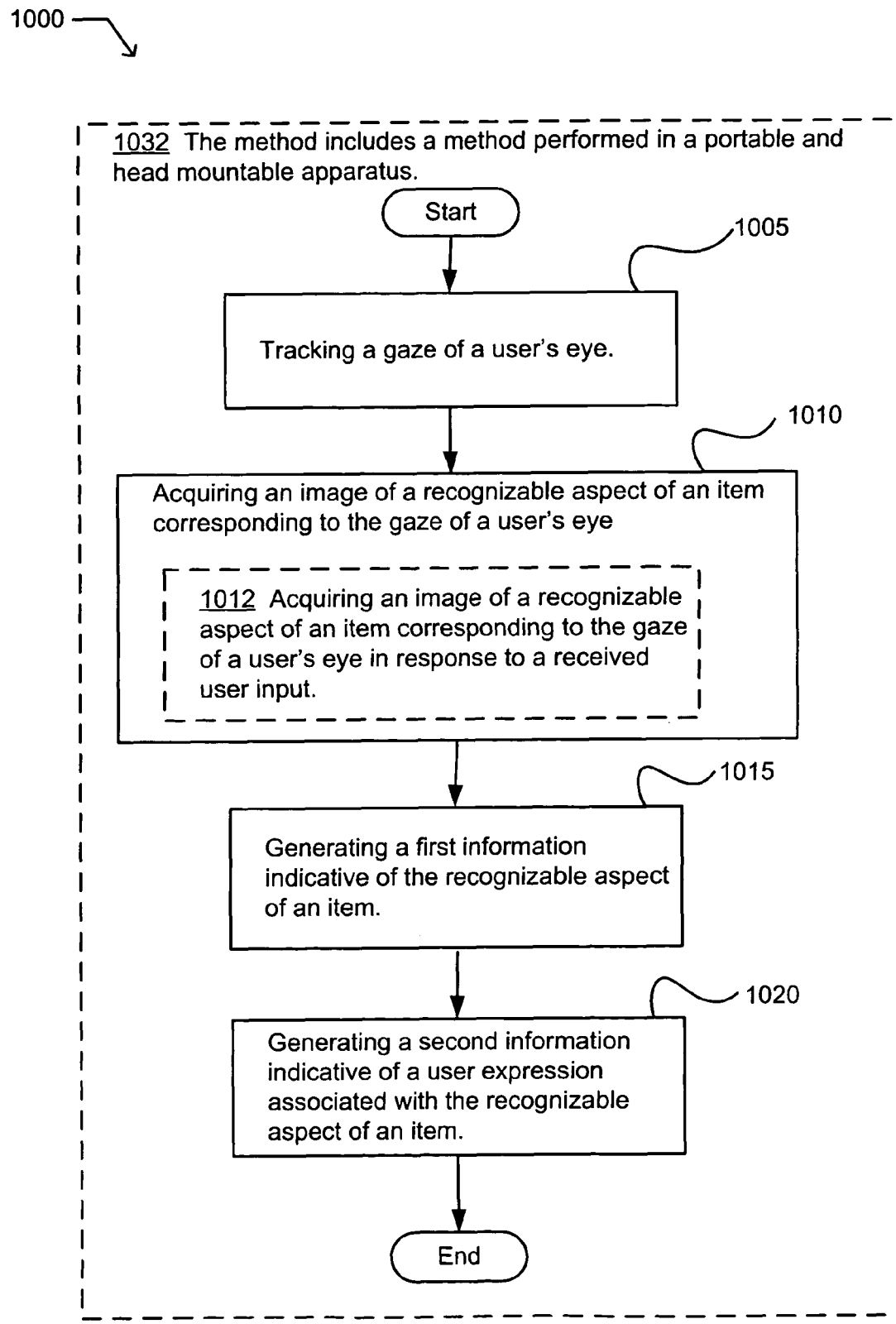
FIG. 24 illustrates an alternative embodiment of the operational flow of FIG. 23.

FIG. 24 illustrates an alternative embodiment of the operational flow 1000 of FIG. 23. In an embodiment, the operational flow 1000 may include an operational flow 1032 performed in a head mountable apparatus. In a further embodiment, the capture operation 1010 may include at least one additional operation, such as an operation 1012. At the operation 1012, an image is acquired of a recognizable aspect of an item corresponding to the gaze of a user's eye in response to a received user input. The received user command may include any suitable command, for example a sound, such as a finger snap, a voice command, such as "acquire this," and/or activation of a button.

Figure 25:
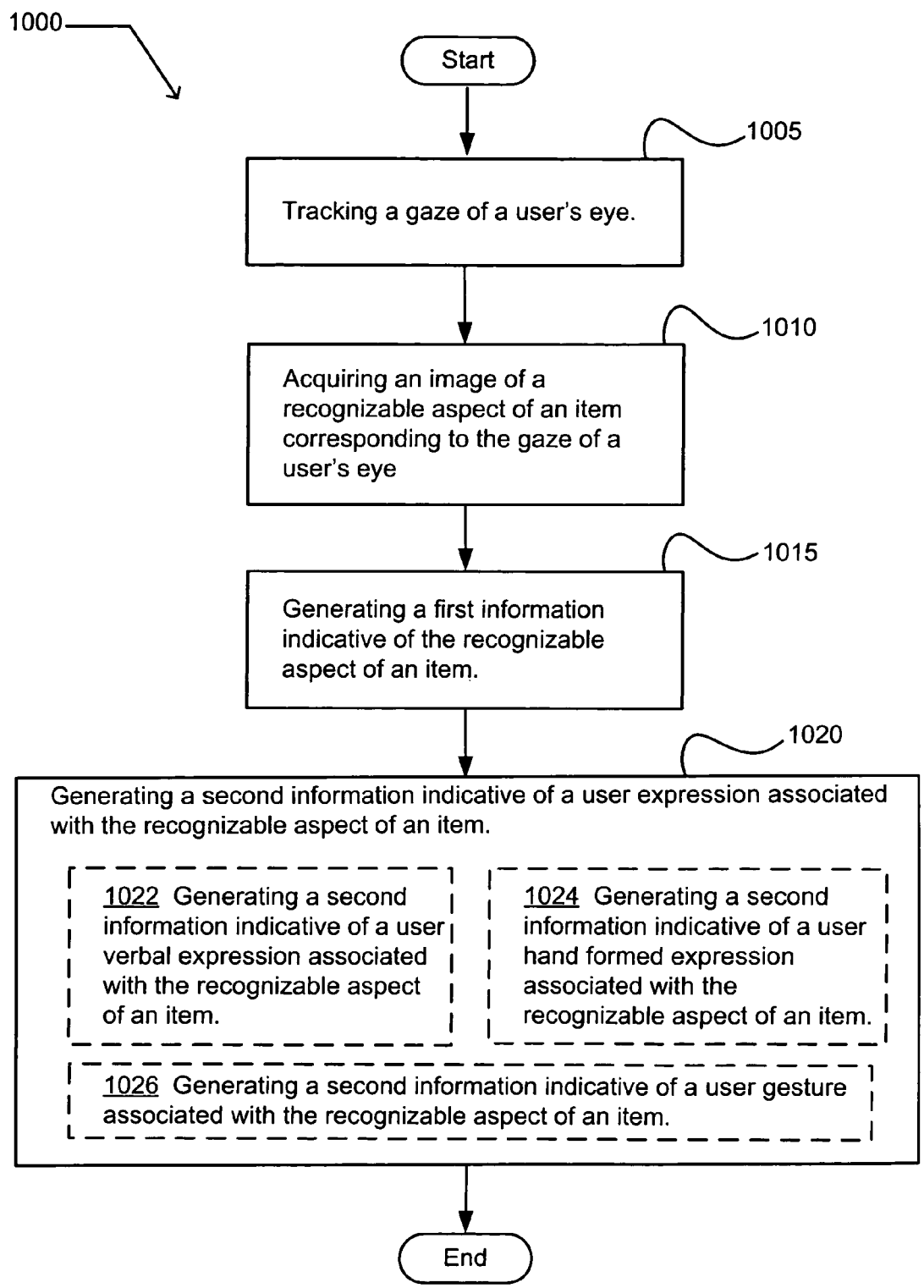
FIG. 25 illustrates another alternative embodiment of the operational flow of FIG. 23.

FIG. 25 illustrates another alternative embodiment of the operational flow 1000 of FIG. 23. The annotation processing operation 1020 may include at least one additional operation. An additional operation may include an operation 1022, an operation 1024, and an operation 1026. At the operation 1022, a second information is generated indicative of a user verbal expression associated with the recognizable aspect of an item. At the operation 1024, a second information is generated indicative of a user hand formed expression associated with the recognizable aspect of an item. At the operation 1026 a second information is generated indicative of a user gesture associated with the recognizable aspect of an item.

Figure 26:
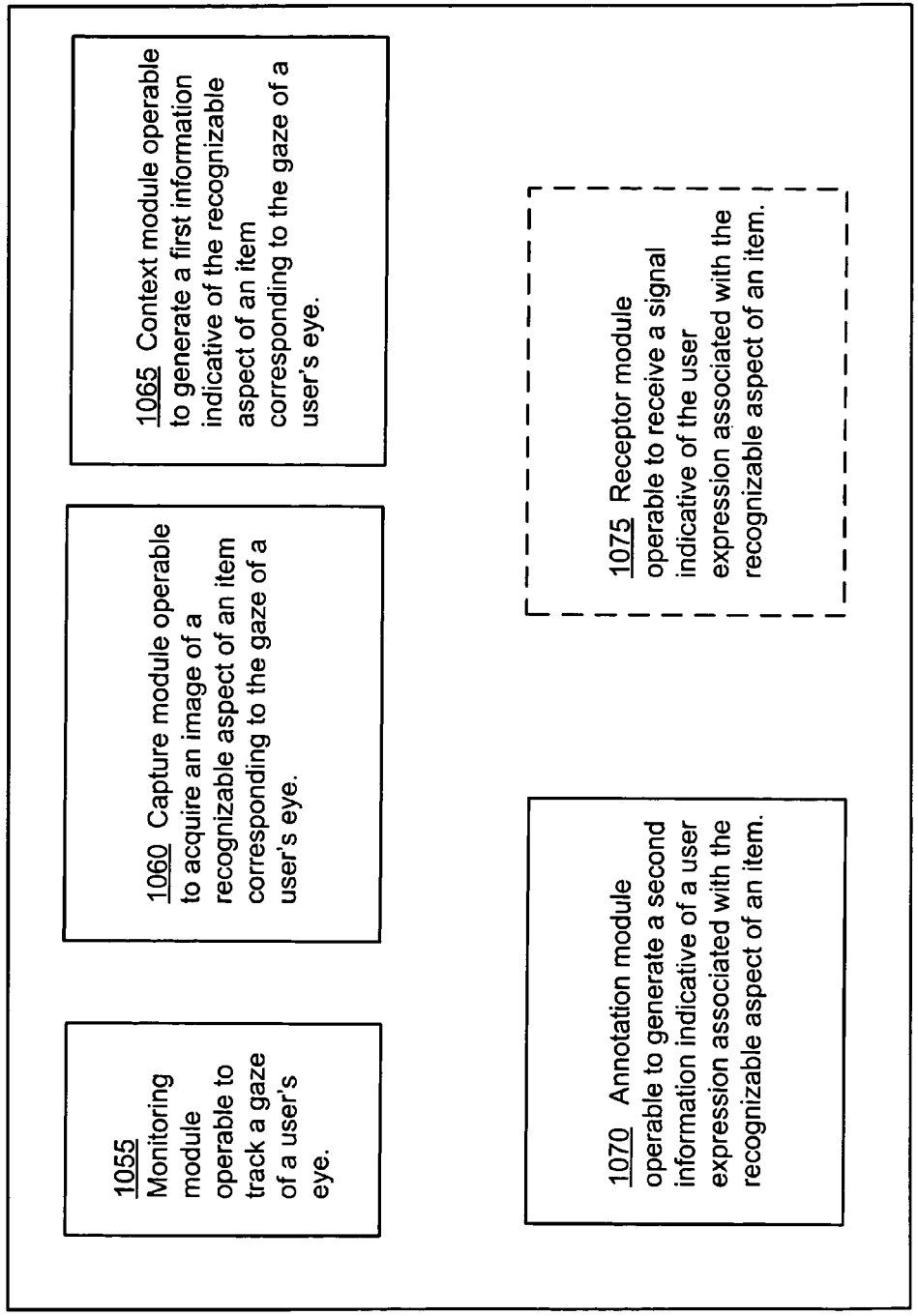
FIG. 26 illustrates a partial view of an exemplary wearable apparatus.

FIG. 26 illustrates a partial view of an exemplary wearable apparatus 1050. The apparatus includes a monitoring module 1055 operable to track a gaze of a user's eye, and a capture module 1060 operable to acquire an image of a recognizable aspect of an item corresponding to the gaze of a user's eye. The apparatus also includes a context module 1065 operable to generate a first information indicative of the recognizable aspect of an item corresponding to the gaze of a user's eye. The apparatus includes an annotation module 1070 operable to generate a second information indicative of a user expression associated with the recognizable aspect of an item. In an alternative embodiment, the apparatus may include a receiver module 1075 operable to receive a signal indicative of the user expression associated with the recognizable aspect of an item. The signal indicative of the user expression may include a video signal indicative of a handwritten user expression, a signal indicative of a spoken user expression, and/or a signal indicative of a user gesture (none shown).

Figure 27:
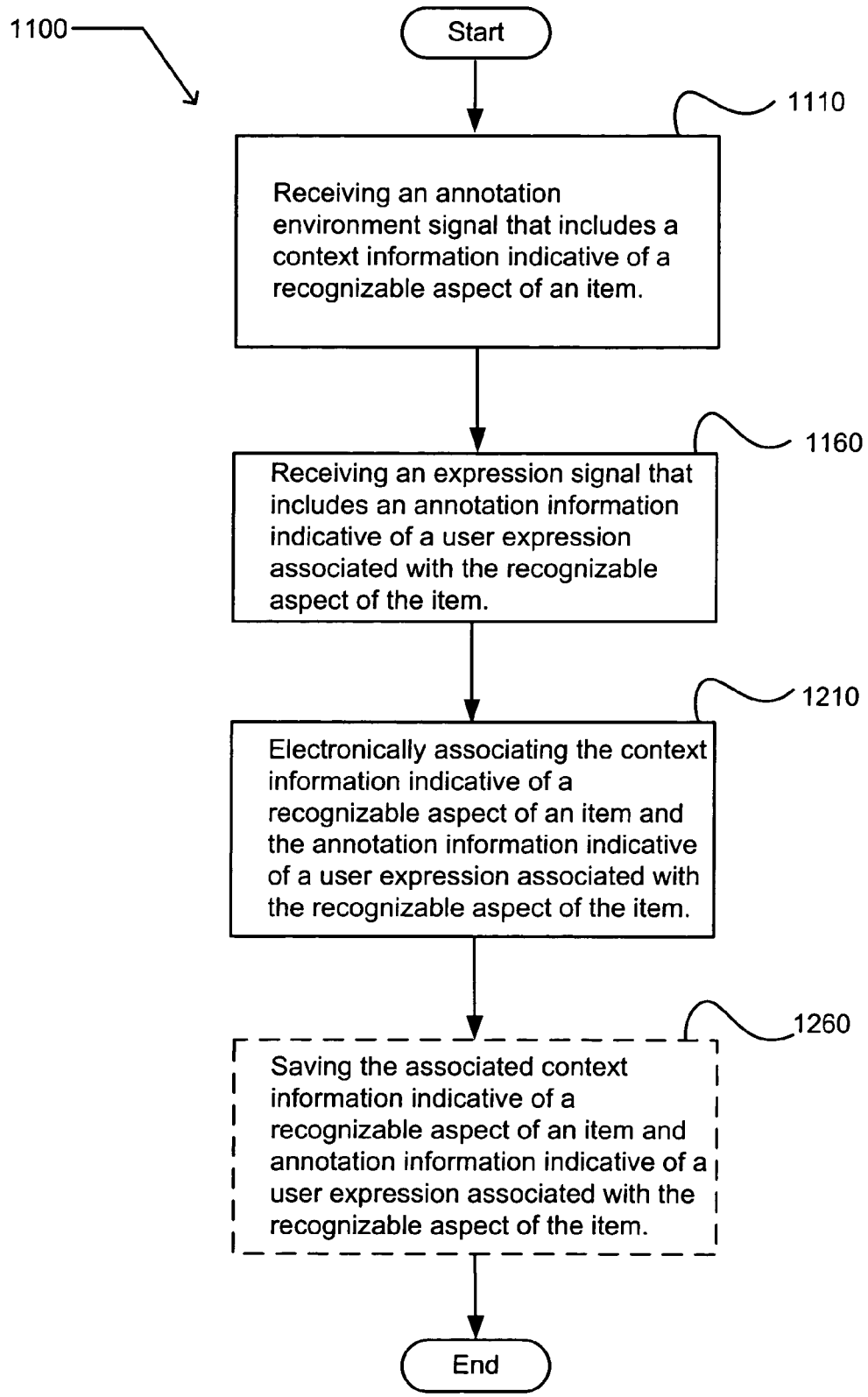
FIG. 27 illustrates an exemplary operational flow.

FIG. 27 illustrates an exemplary operational flow 1100. After a start operation, the operational flow moves to a first acquisition operation 1110. The first acquisition operation receives an annotation environment signal that includes a context information indicative of a recognizable aspect of an item. In an embodiment, a context may include a setting, a circumstance, an event, and/or an environment within which an annotation is formed, exists, and/or takes place. A second acquisition operation 1160 receives an expression signal that includes an annotation information indicative of a user expression associated with the recognizable aspect of the item. A linking operation 1210 electronically associates the context information indicative of a recognizable aspect of an item and the annotation information indicative of a user expression associated with the recognizable aspect of the item. The operational flow then moves to an end operation.

In an embodiment, the operational flow 1100 may include a storage operation 1260. At the storage operation, the electronically associated context information indicative of a recognizable aspect of an item and annotation information indicative of a user expression associated with the recognizable aspect of the item are saved. The electronically associated information may be stored in a computer-readable media, such as, for example, a computer storage media.

Operation of an embodiment of the operational flow 1100 is illustrated here in conjunction with the above described exemplary annotation systems. For example, the exemplary human wearable annotation system 610 described in conjunction with FIG. 13 includes an annotation device 630 operable to generate information indicative of a user expression associated with the recognizable aspect of the item. In an embodiment, the exemplary human wearable annotation system may provide the information indicative of a user expression associated with the recognizable aspect of the item as an expression signal that includes an annotation information indicative of a user expression associated with the recognizable aspect of the item. The exemplary human wearable annotation system also includes an annotation environment capture device 640 operable to generate information indicative of a recognizable aspect of an item. The exemplary human wearable annotation system may also provide information indicative of a recognizable aspect of an item as an annotation environment signal that includes a context information indicative of a recognizable aspect of an item.

In operation, the first acquisition operation 1110 may receive an annotation environment signal generated by the annotation capture device 640 that includes a context information indicative of a recognizable aspect of an item. The annotation environment signal may be raw, or may be processed. The annotation environment signal may be received in substantially real time, or it may be received in non-real time. The second acquisition operation may receive an expression signal generated by the annotation device 630 that includes an annotation information indicative of a user expression associated with the recognizable aspect of the item. The expression signal may be raw, or may be processed. The expression signal may be received in substantially real time, or it may be received in non-real time. The linking operation 1210 electronically associates the context information indicative of a recognizable aspect of an item and the annotation information indicative of a user expression associated with the recognizable aspect of the item. In an embodiment, the electronic association may include a simple linking of signals in response to a common element of a time track present in both signals. In another embodiment where both signals include a processing before they are acquired by the operational flow 1100, the electronic association may include a linking of the signals based at least in part on information present in at least one of the signals.

Another example of an operation of an embodiment of the operational flow 1300 may be illustrated in conjunction with the exemplary system 800 described in conjunction with FIG. 17. In addition to the exemplary human wearable annotation system 610, the system 800 includes a handwriting instrument, illustrated as the pen 720. In an embodiment, the pen 720 includes an annotating device (not shown) similar to the annotating device 530 of FIG. 12 and operable to generate information indicative of a user expression associated with a recognizable aspect of an item. In the embodiment, the annotating device of the pen 720 may provide the information indicative of a user expression associated with the recognizable aspect of the item as an expression signal that includes an annotation information indicative of a user expression associated with the recognizable aspect of the item.

In operation, as above, the first acquisition operation 1110 may receive an annotation environment signal generated by the annotation capture device 640 that includes a context information indicative of a recognizable aspect of an item. The annotation environment signal may be raw, or may be processed. The annotation environment signal may be received in substantially real time, or it may be received in non-real time. The second acquisition operation may receive an expression signal generated by the annotation device 9 (not shown) of the pen 720 that includes an annotation information indicative of a user expression associated with the recognizable aspect of the item. The expression signal may be raw, or may be processed. The expression signal may be received in substantially real time, or it may be received in non-real time. As described above, the linking operation 1210 electronically associates the context information indicative of a recognizable aspect of an item and the annotation information indicative of a user expression associated with the recognizable aspect of the item.

Figure 28:
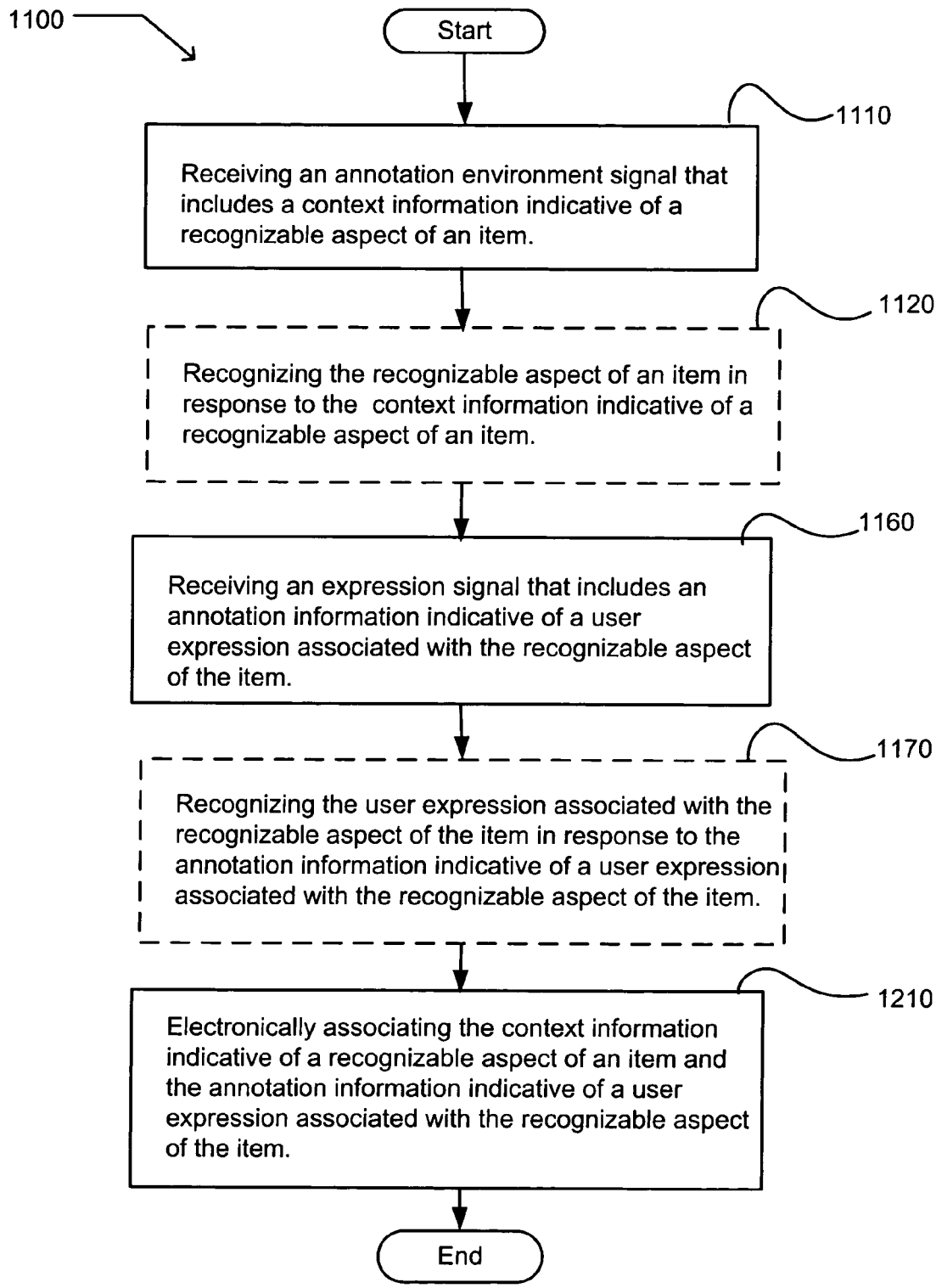
FIG. 28 illustrates an embodiment of the exemplary operational flow of FIG. 27.

FIG. 28 illustrates an embodiment of the exemplary operational flow 1100 of FIG. 27. The operational flow may include at least one additional operation. An additional operation may include a context identification operation 1120, and/or an annotation identification operation 1170. At the context identification operation, the recognizable aspect of an item is recognized in response to the context information indicative of a recognizable aspect of an item. At the annotation identification operation, the user expression associated with the recognizable aspect of the item is recognized in response to the annotation information indicative of a user expression associated with the recognizable aspect of the item.

In an embodiment, a degree resolution and/or recognizing provided by the operation 1120 and/or the operation 1170 may occur at any point along a continuum of recognition that spans from a minimal recognition to a complete recognition. For example, in an embodiment, only a minimal recognition of the recognizable aspect of an item and/or recognition of the user expression may be required to associate a context information and an annotation information at the linking operation 1210. This may occur in a first pass, or pre-recognition form, of the operational flow 1100 that performs an initial linking of a context information and an annotation information. In an embodiment where the context information includes a photograph of an environment, a degree of recognizing the recognizable aspect of an item may include recognizing that a book is present in the environment. Another degree of recognizing the recognizable aspect of an item may include recognizing one book in an environment that includes two books. In another embodiment, if the context information indicative of a recognizable aspect of an item includes information indicative of a "blue book" on a shelf that contains at least two books respectively of different colors, a minimal degree of recognizing may include recognizing the "blue" aspect of the "book" item.

In a further example, the user expression may include a verbal expression, a gesture, and/or a preformed expression. In an embodiment, a minimal degree of recognition of a user expression may include recognizing that a user verbal expression occurred, that a user handwritten expression occurred, and/or that a user preformed expression occurred. In another embodiment, a degree of recognizing the user expression associated with the recognizable aspect of the item may include recognizing that a handwritten character is associated with the recognizable aspect of the item. In a further embodiment, a degree of recognizing the user expression associated with the recognizable aspect of the item may include recognizing that a spoken word is associated with the recognizable aspect of the item. In another embodiment, a high degree of recognition of the recognizable aspect of an item and/or recognition of the user expression may be required. For example, a high degree of recognition may be required to associate a context information and an annotation information at the linking operation 1210. In another example, a high degree of recognition, or a detailed recognition may be required to produce an output useable by a human and/or machine user. A machine user may include a security system. The security system may receive a verbal user expression by a security guard associated with a suspicious person in a crowd. For example, a security guard may point to a monitor displaying a crowd that includes a suspicious person wearing a black beret, and verbally express or annotate the display by saying "find out who that person is."

Continuing with the previous example, a high degree of recognizing an aspect of an item may include recognizing to a point of recognizing a title of a book in the environment, such as identifying "THE ILIAD" as the title of the "blue book," or "Homer" as the author of the "blue book." A high degree of recognizing a user expression may include recognizing a spoken word of the verbal expression, recognizing a word or character of a handwritten expression, and/or recognizing the particular preformed expression from the possible instances of preformed expressions.

Continuing with the previous example, in another embodiment, a degree of recognizing the user expression associated with the recognizable aspect of the item may include recognizing the handwritten character associated with the recognizable aspect of the item. For example, the handwritten character may be recognized as a particular ASCII character, and/or a particular Asian language character. In a further embodiment, a degree of recognizing the user expression associated with the recognizable aspect of the item may include recognizing a particular spoken word associated with the recognizable aspect of the item.

In a further embodiment, the item may include a document, a paper, a book, a book in a paper form, and/or a book in an electronic form (collectively referred to as a "book."). In this embodiment, the recognizing the recognizable aspect of an item may include recognizing a version of a book as well as a recognizable text aspect of the book. At the operation 1210, the electronically associated context information and annotation information may include information about the book in which the annotation was written and the location on a particular page of the book. The physical book may be identified from the content information alone. The identification may be for any purpose, such as for purchase, location in a library, and/or gathering annotations made by a user over time. The electronic association of context information and annotation information may allow a user to see a specified annotation placed in context, such as on the relevant page of the appropriate book on a display screen. A user may request that the page containing an annotation be printed (with or without the annotation, which can appear in context on that page, either as written, or as recognized text. A user may query the electronically associated context information and annotation information for annotations and see either matching annotations or pages/passages associated with the matching annotations results (e.g. "find where I have said 'what poetry'" produces images of several key pages of the Silmarillion.

In another embodiment, a user can select particular page of a book, and query an electronically associated context information and annotation information to determine whether they ever made an annotation to the selected page or a selected textual portion of the page. A system may then retrieve and provide the annotation in association with the selected page or selected textual portion of the page. In an embodiment, an annotation may be used to find a book, and a book may be used to find an annotation.

In an embodiment, the exemplary operational flow 1100 of FIG. 28 allows a user to make handwritten annotations to an item at any place and/or at any time in their life. The user may or may not have the entire document. In a book embodiment, the context may include a reference to a book being annotated that exists in at least two forms. For example, many books, such as the classic book THE ILIAD of FIG. 17, may have been printed in various versions, editions, and languages. An advantage may be provided if the electronic association of the context information of a book and the annotation information include an electronic association of a canonical representation of the book and the annotation information. A user may query a plurality of instances of the electronically associated context information and content information for annotation information related to a canonical book.

A book being annotated may be an exemplar, such as a portion of physical printed page of a book. A user may annotate a photocopy of a subset of a book, such as a page, at least two pages, a chapter, etc. A user may annotate their copy of a book, or even a copy of a book checked out from the library. All of the annotations may be electronically associated with that book. A user could go back to some central location and access all of the annotations they ever made to a book that they encountered in their life, such as THE ILIAD. In some situations, a user may have read or annotated several copies or editions of the book during their life. All of the annotations they ever made for the book and its various editions would be available at a central place. The annotations may be saved with respect to a canonical or ultimate representation of the book. For example, the annotator may request "Show me the annotations I've made to THE ILIAD."

Figure 29:
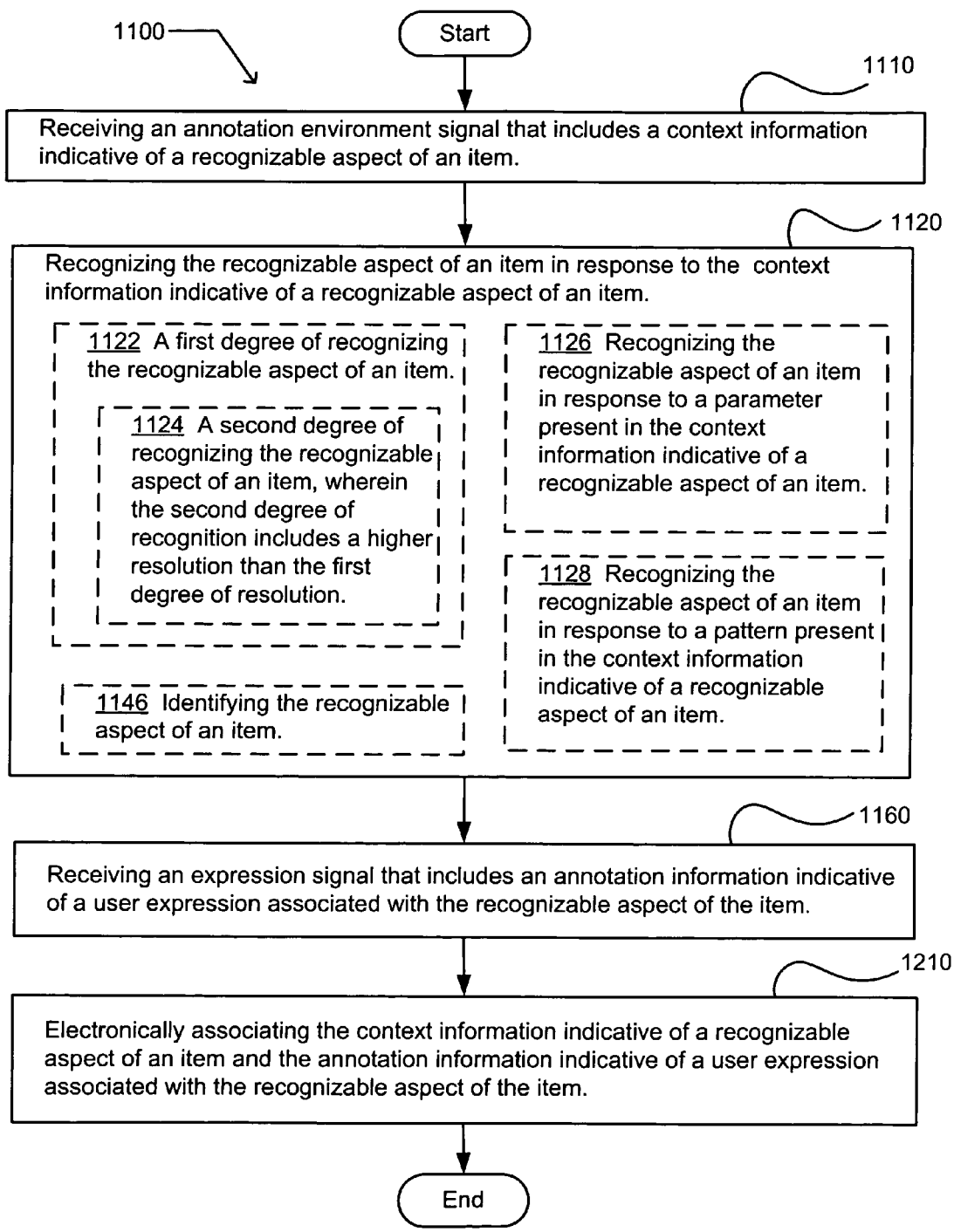
FIG. 29 illustrates an embodiment of the context identification operation of FIG. 28

FIG. 29 illustrates an embodiment of the context identification operation 1120 of FIG. 28. The context identification operation may include at least one additional operation. An additional operation may include an operation 1122, an operation 1126, an operation 1128, and an operation 1146. At the operation 1122, the recognizable aspect of an item is recognized to a first degree of recognizing. In an embodiment, the first degree of recognizing may be considered as a pre-recognition. The operation 1122 may include at least one additional operation, such as the operation 1124. At the operation 1124, the recognizable aspect of an item is recognized to a second degree of recognizing, wherein the second degree of recognizing includes a higher resolution than the first degree of recognizing. In an embodiment, the second degree of recognizing may be considered a detailed recognition.

At the operation 1126, the recognizable aspect of an item is recognized in response to a parameter present in the context information indicative of a recognizable aspect of an item. In an embodiment, the parameter may include a temporal parameter, such as a time stamp, and or a time track. In another embodiment, the parameter may include a coordinate system, such as GPS coordinates. In a further embodiment, the parameter may include a temperature, a date, an orientation of a device that captured the parameter with respect to the item. The operation 1146 identifies the recognizable aspect of an item.

Figure 30:
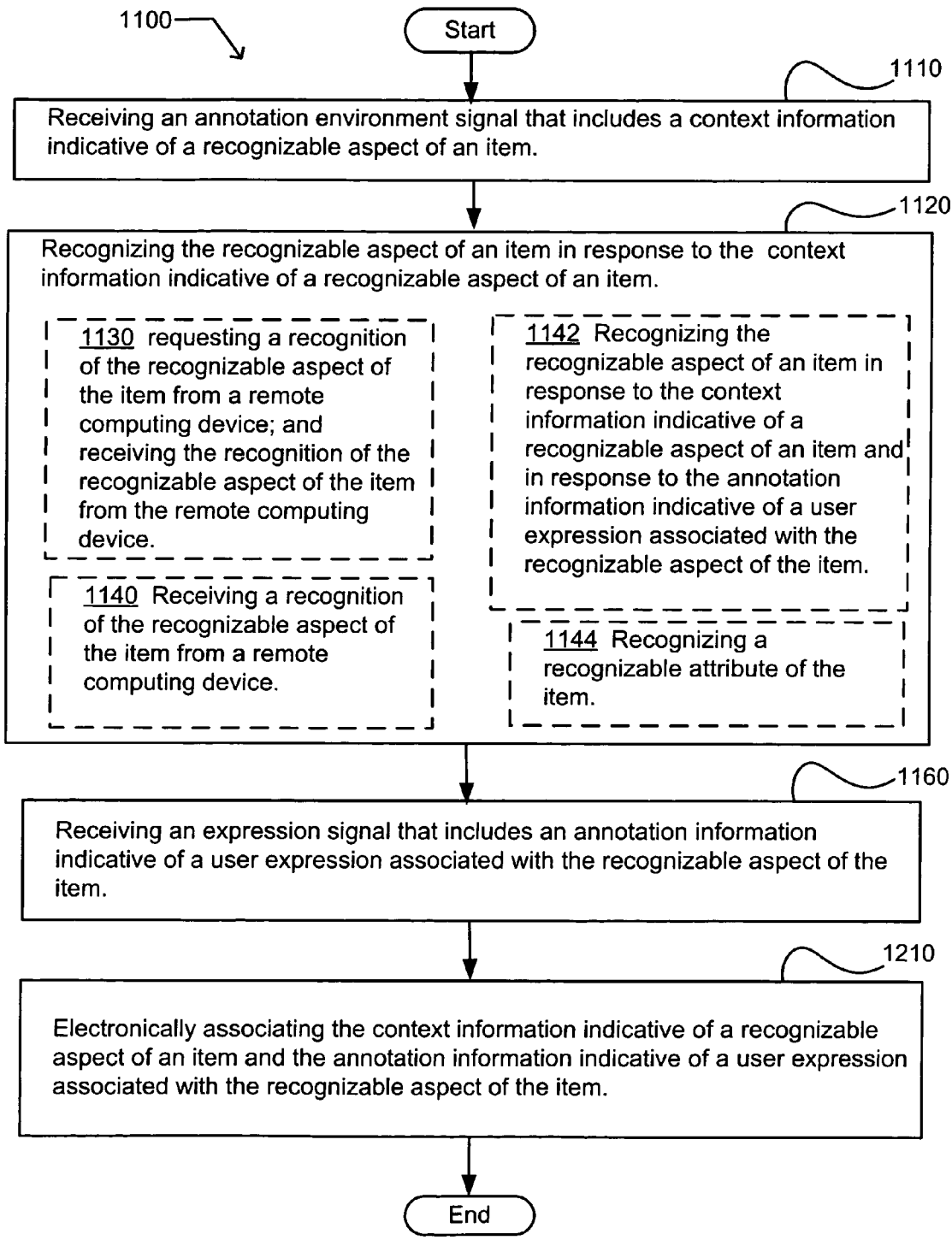
FIG. 30 illustrates another embodiment of the context identification operation of FIG. 28.

FIG. 30 illustrates another embodiment of the context identification operation 1120 of FIG. 28. The context identification operation may include at least one additional operation. An additional operation may include an operation 1130, an operation 1140, an operation 1142, and/or an operation 1144. At the operation 1130, a recognition of the recognizable aspect of the item is requested from a remote computing device, and the recognition of the recognizable aspect of the item is received from the remote computing device. At the operation 1140, a recognition of the recognizable aspect of the item is received from a remote computing device. Communication with the remote computing device may include communication using a local area network, a wide area network, and/or a global public network, such as the Internet. At the operation 1142, the recognizable aspect of an item is recognized in response to the context information indicative of a recognizable aspect of an item and in response to the annotation information indicative of a user expression associated with the recognizable aspect of the item. The operation 1144 recognizes an attribute of an item. In an embodiment, the recognizing an attribute of an item may include at least one of recognizing an instance of an item, a class of an item, a canonical version of the item, an ownership of an item, a manufacturer of an item, a property of an item, a parameter of an item, and/or a relationship between the item and another item. For example, in an embodiment, an attribute of the ski 560 described in conjunction with FIG. 12 may include a unique instance of a pair skis annotated by a user in a ski shop. In another embodiment, an attribute of the ski 560 may include that it is a slalom class of ski instead of a giant slalom class or a downhill class. In a further embodiment, an attribute of the ski may include a name of its manufacturer, illustrated as Head Ski. In another example, in an embodiment, an attribute of the book 760 THE ILIAD described in conjunction with FIG. 16 may include an ownership class, such as a user owed, a library owned, and/or unknown owner. In addition, an attribute of the book THE ILIAD may include a version class, such as an abridged version, a canonical version, an English language version, and/or a Greek language version.

Figure 31:
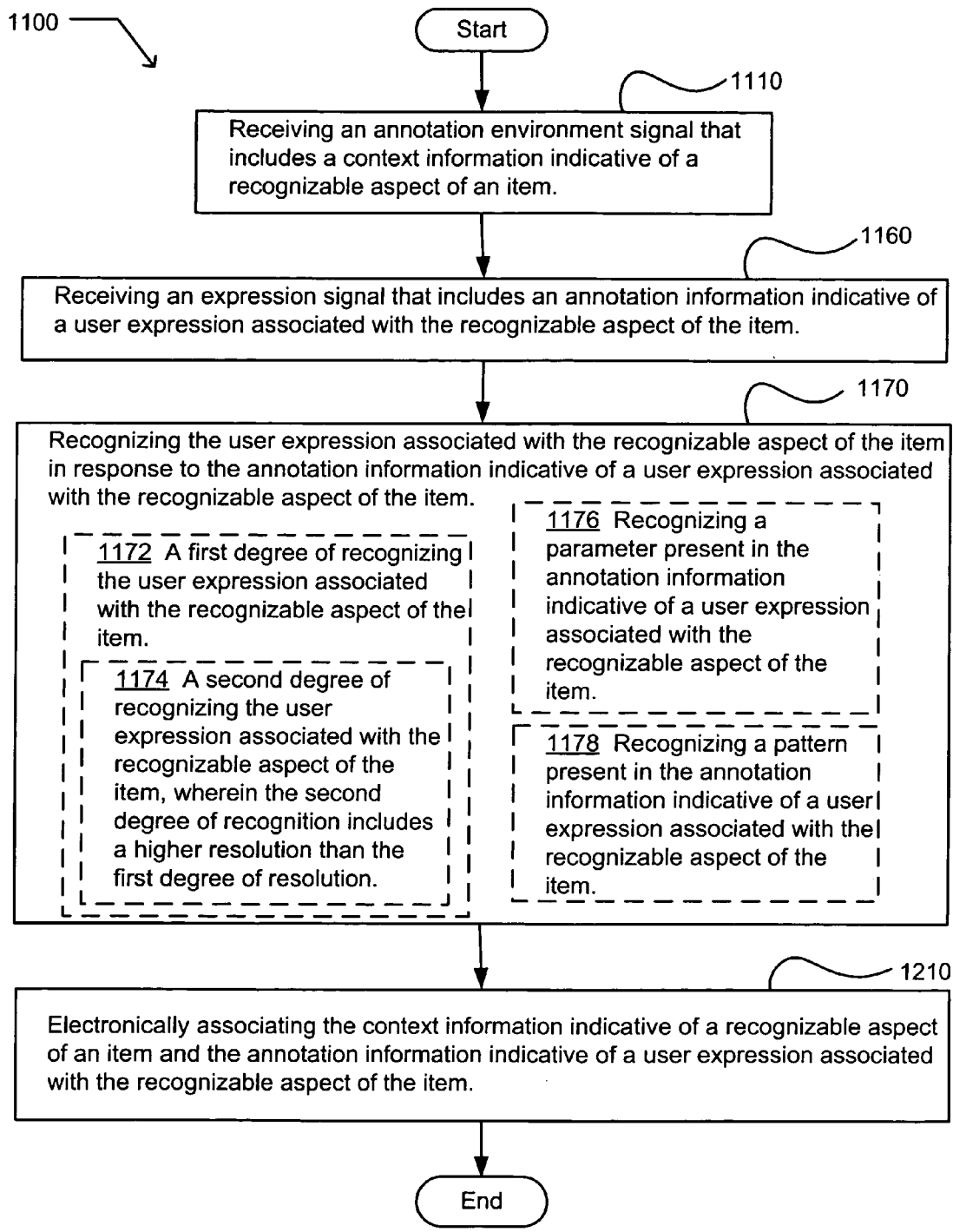
FIG. 31 illustrates an embodiment of the annotation identification operation of FIG. 28.

FIG. 31 illustrates an embodiment of the annotation identification 30 operation 1170 of FIG. 28. The annotation identification operation may include at least one additional operation. An additional operation may include an operation 1172, an operation 1176, and/or an operation 1178. At the operation 1172, the user expression associated with the recognizable aspect of the item is recognized to a first degree of recognizing. In an embodiment the first degree of recognizing may be considered as a pre-recognition. The operation 1172 may include at least one additional operation, such as the operation 1174. At the operation 1174, the user expression associated with the recognizable aspect of the item is recognized to a second degree of recognizing, wherein the second degree of recognizing includes a higher resolution than the first degree of recognizing. In an embodiment, the second degree of recognizing may be considered a detailed recognition. At the operation 1176, a parameter present in the annotation information indicative of a user expression associated with the recognizable aspect of the item is recognized. At the operation 1178, a pattern present in the annotation information indicative of a user expression associated with the recognizable aspect of the item is recognized. In an embodiment, the recognition of the pattern may include a recognition using artificial intelligence. In another embodiment, the recognition of the pattern may include a recognition using a pattern recognition process.

Figure 32:
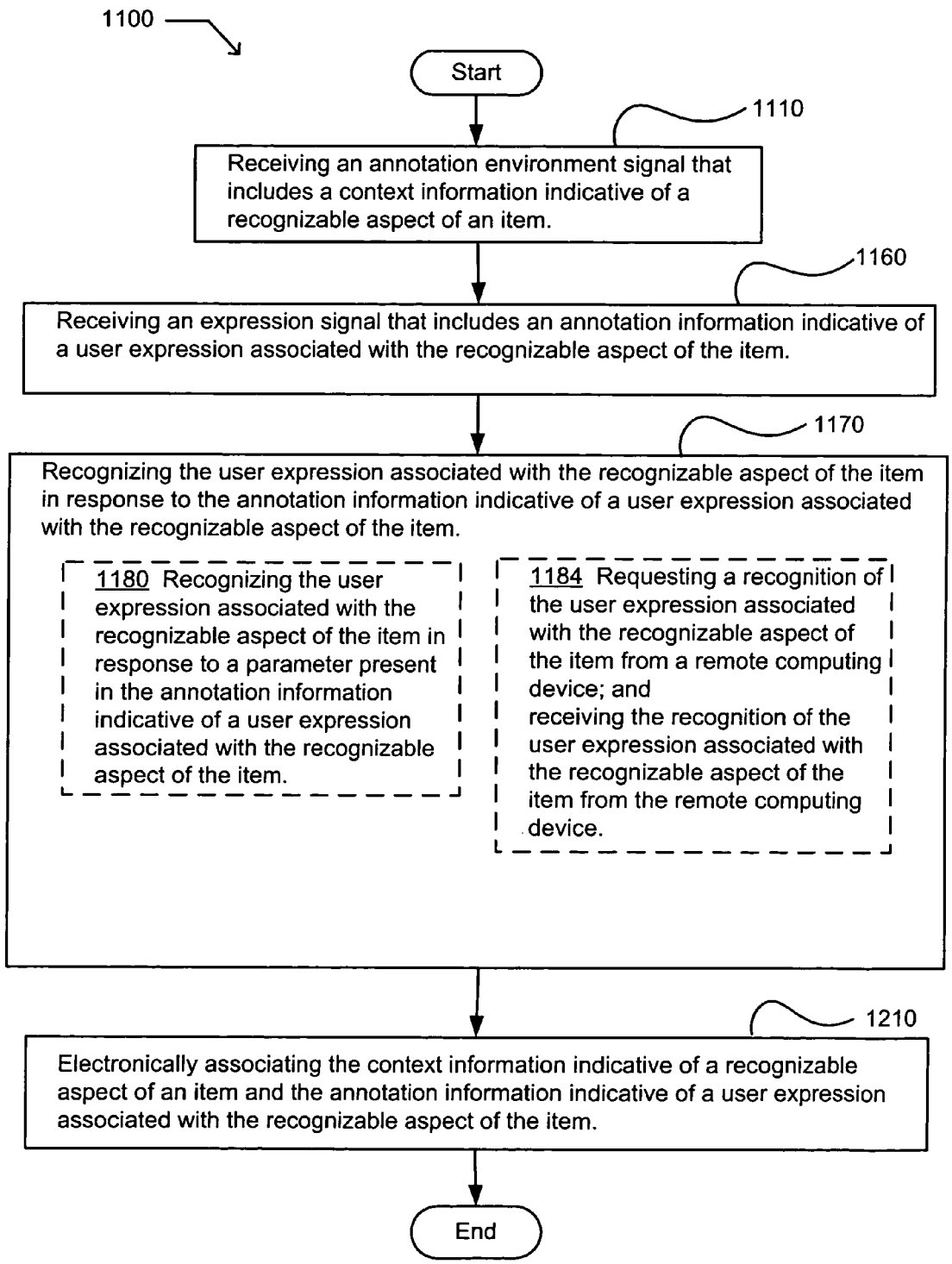
FIG. 32 illustrates another embodiment of the annotation identification operation of FIG. 28.

FIG. 32 illustrates another embodiment of the annotation identification operation 1170 of FIG. 28. The annotation identification operation may include at least one additional operation. An additional operation may include an operation 1180, and/or an operation 1184. At the operation 1180, the user expression associated with the recognizable aspect of the item is recognized in response to a parameter present in the annotation information indicative of a user expression associated with the recognizable aspect of the item. At the operation 1184, recognition of the user expression associated with the recognizable aspect of the item is requested from a remote computing device, and the recognition of the user expression associated with the recognizable aspect of the item is received from the remote computing device.

Figure 33:
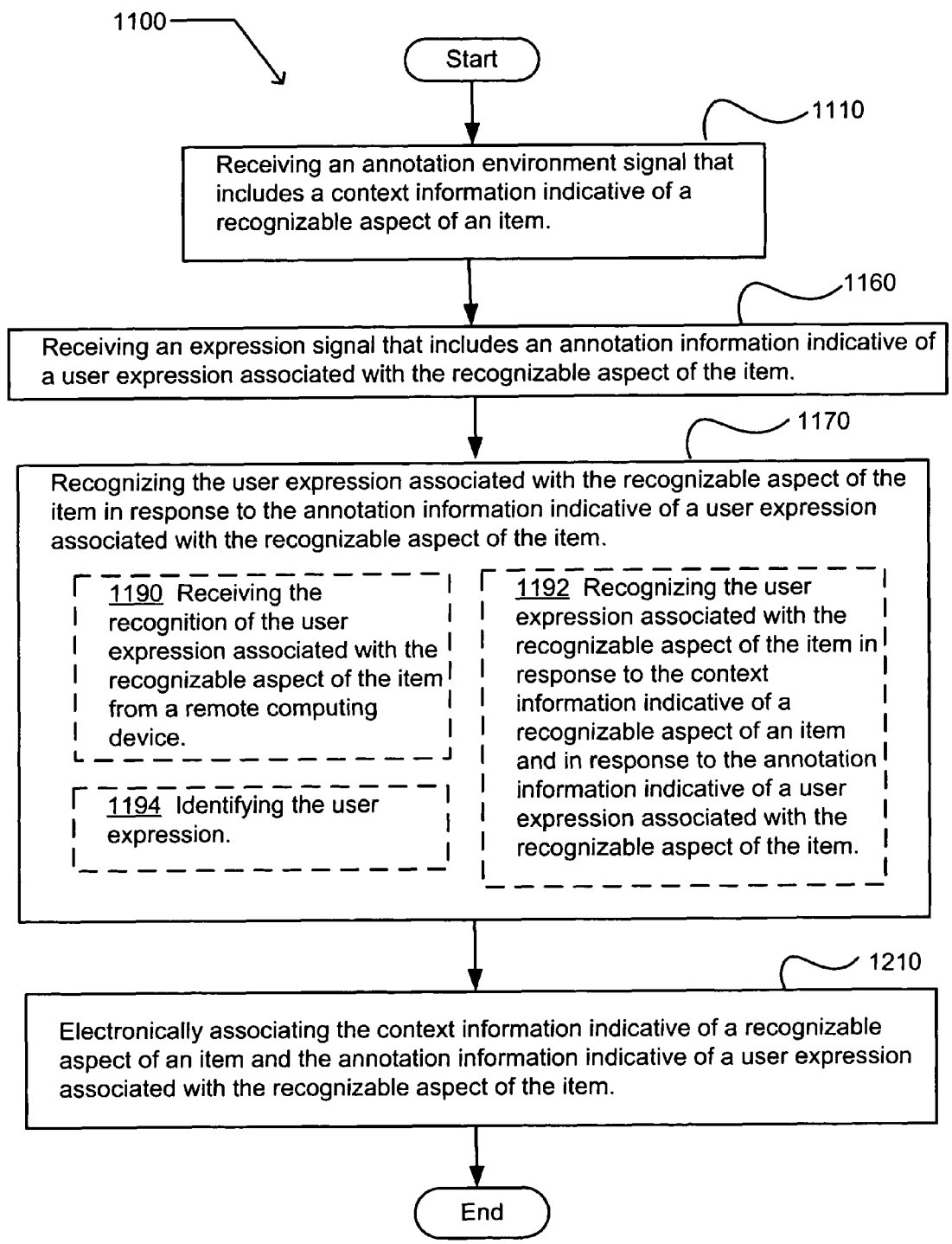
FIG. 33 illustrates a further embodiment of the annotation identification operation of FIG. 28.

FIG. 33 illustrates a further embodiment of the annotation identification operation 1170 of FIG. 28. The annotation identification operation may include at least one additional operation. An additional operation may include an operation 1190, an operation 1192, and/or an operation 1194. At the operation 1190, the recognition of the user expression associated with the recognizable aspect of the item is received from a remote computing device. At the operation 1192, the user expression associated with the recognizable aspect of the item is recognized in response to the context information indicative of a recognizable aspect of an item and in response to the annotation information indicative of a user expression associated with the recognizable aspect of the item. At the operation 1194, the user expression is identified.

Figure 34:
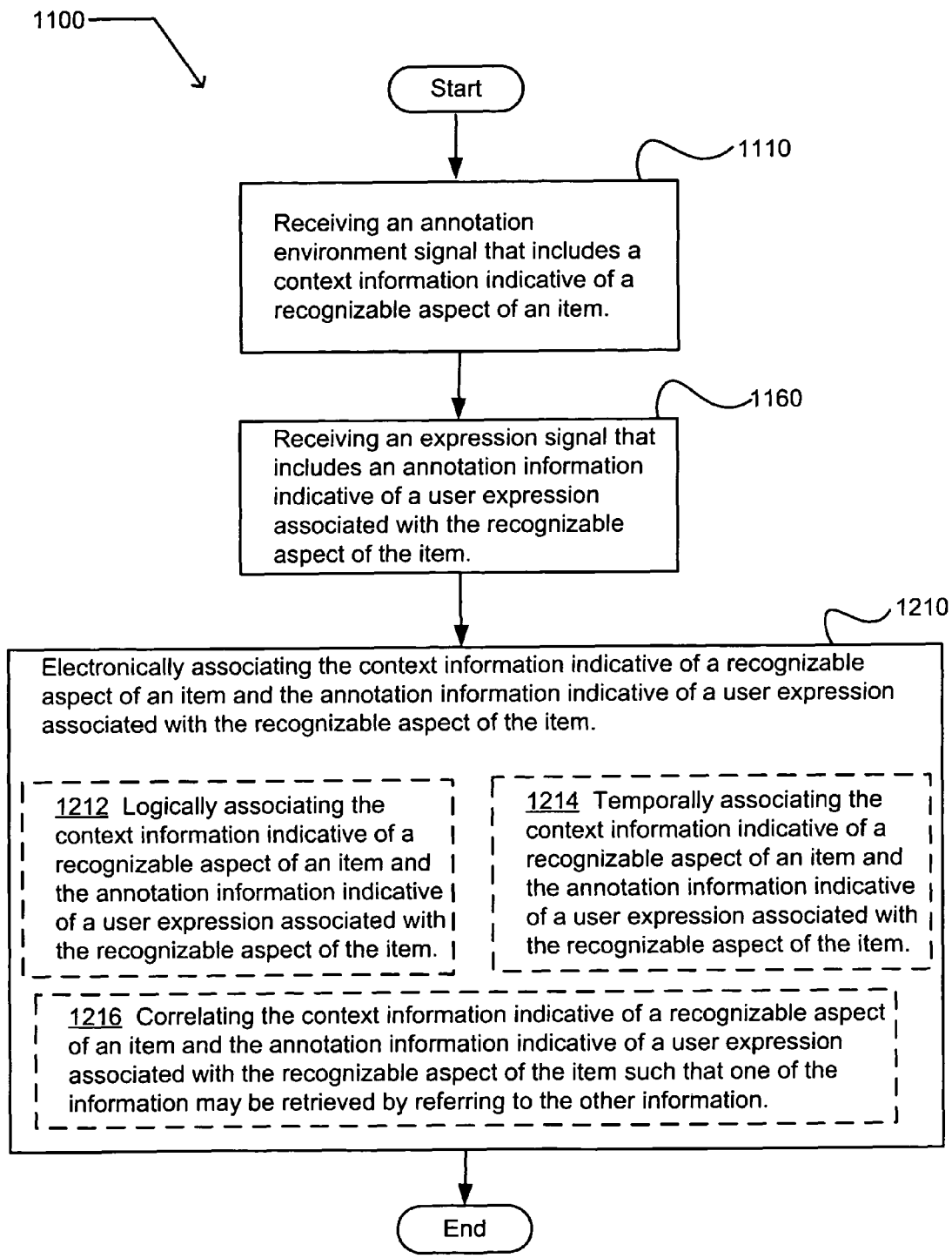
FIG. 34 illustrates an embodiment of the linking operation of FIG. 27.

FIG. 34 illustrates an embodiment of the linking operation 1210 of FIG. 27. The linking operation may include at least one additional operation. An additional operation may include an operation 1212, an operation 1214, and/or an operation 1216. The operation 1212 logically associates the context information indicative of a recognizable aspect of an item and the annotation information indicative of a user expression associated with the recognizable aspect of the item. In an embodiment, the context information and the annotation information are logically associated when, if one is known, a user can find the other. The operation 1214 temporally associates the context information indicative of a recognizable aspect of an item and the annotation information indicative of a user expression associated with the recognizable aspect of the item. The operation 1216 correlates the context information indicative of a recognizable aspect of an item and the annotation information indicative of a user expression associated with the recognizable aspect of the item, such that one of the information may be retrieved by referring to the other information.

Figure 35:
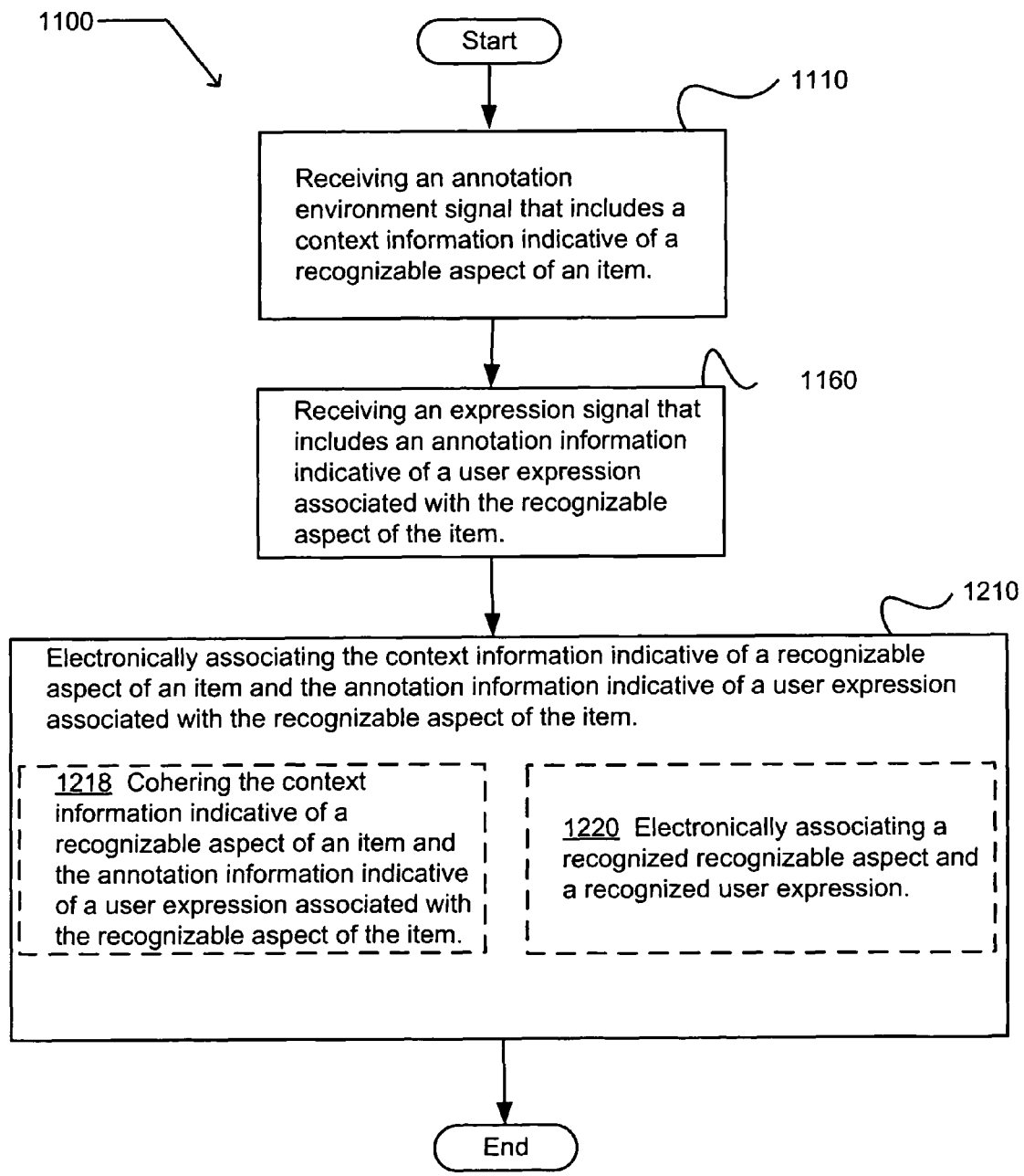
FIG. 35 illustrates another embodiment of the linking operation of FIG. 27.

FIG. 35 illustrates another embodiment of the linking operation 1210 of FIG. 27. The linking operation may include at least one additional operation. An additional operation may include an operation 1218, and/or an operation 1220. The operation 1218 coheres the context information indicative of a recognizable aspect of an item and the annotation information indicative of a user expression associated with the recognizable aspect of the item. The operation 1220 electronically associates a recognized recognizable aspect and a recognized user expression.

Figure 36:
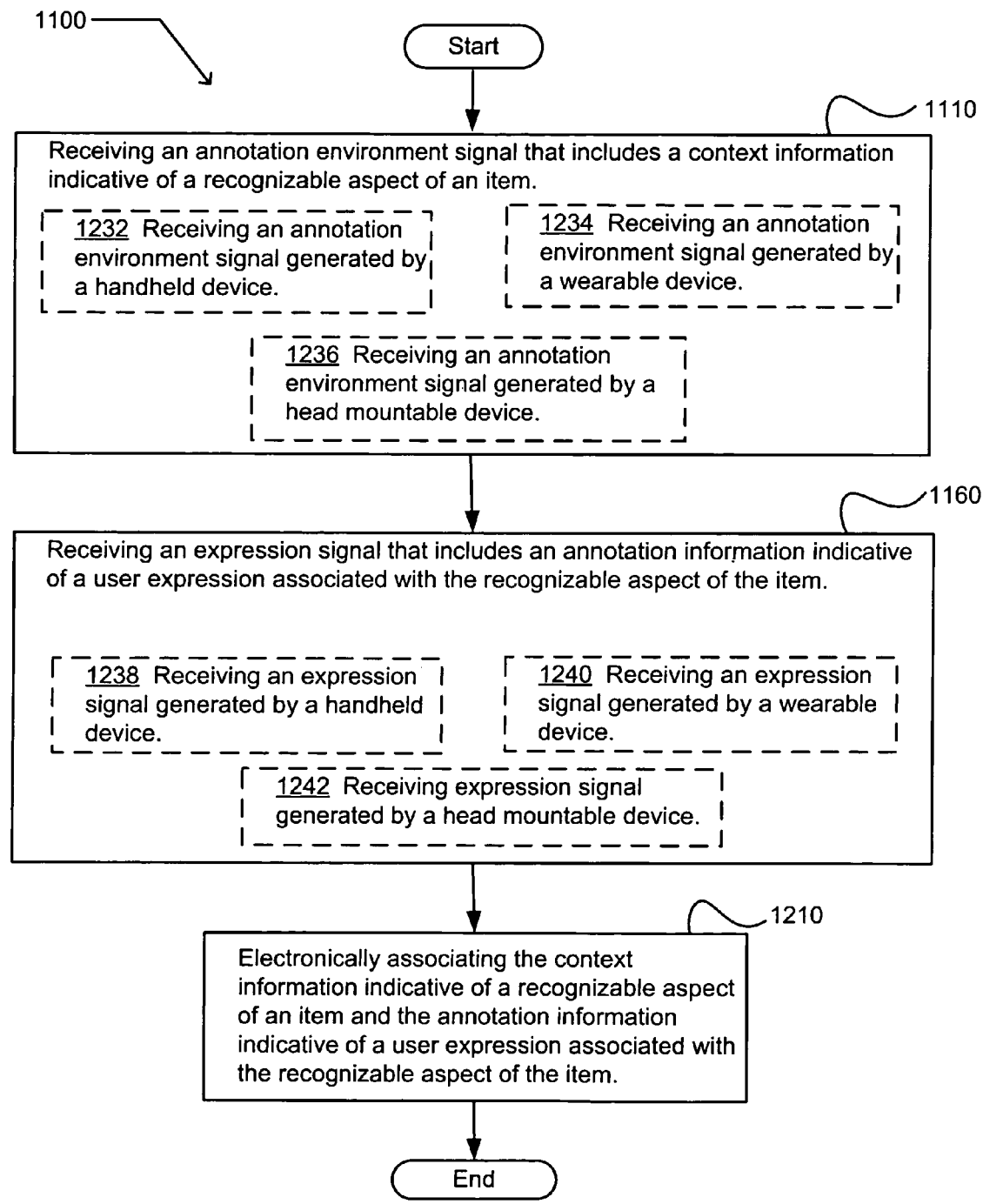
FIG. 36 illustrates embodiments of the first acquisition operation and embodiments of the second acquisition operation of FIG. 27.

FIG. 36 illustrates embodiments of the first acquisition operation 1110 and embodiments of the second acquisition operation 1160 of FIG. 27. The first acquisition operation may include at least one additional embodiment. Additional embodiments may include an operation 1232, an operation 1234, and/or an operation 1236. The operation 1232 receives an annotation environment signal generated by a handheld device. The operation 1234 receives an annotation environment signal generated by a wearable device. The operation 1236 receives an annotation environment signal generated by a head mountable device. The second annotation operation may include at least one additional embodiment. Additional embodiments may include an operation 1238, an operation 1240, and/or an operation 1242. The operation 1238 receives an expression signal generated by a handheld device. The operation 1240 receives an expression signal generated by a wearable device. The operation 1242 receives an expression signal generated by a head mountable device.

Figure 37:
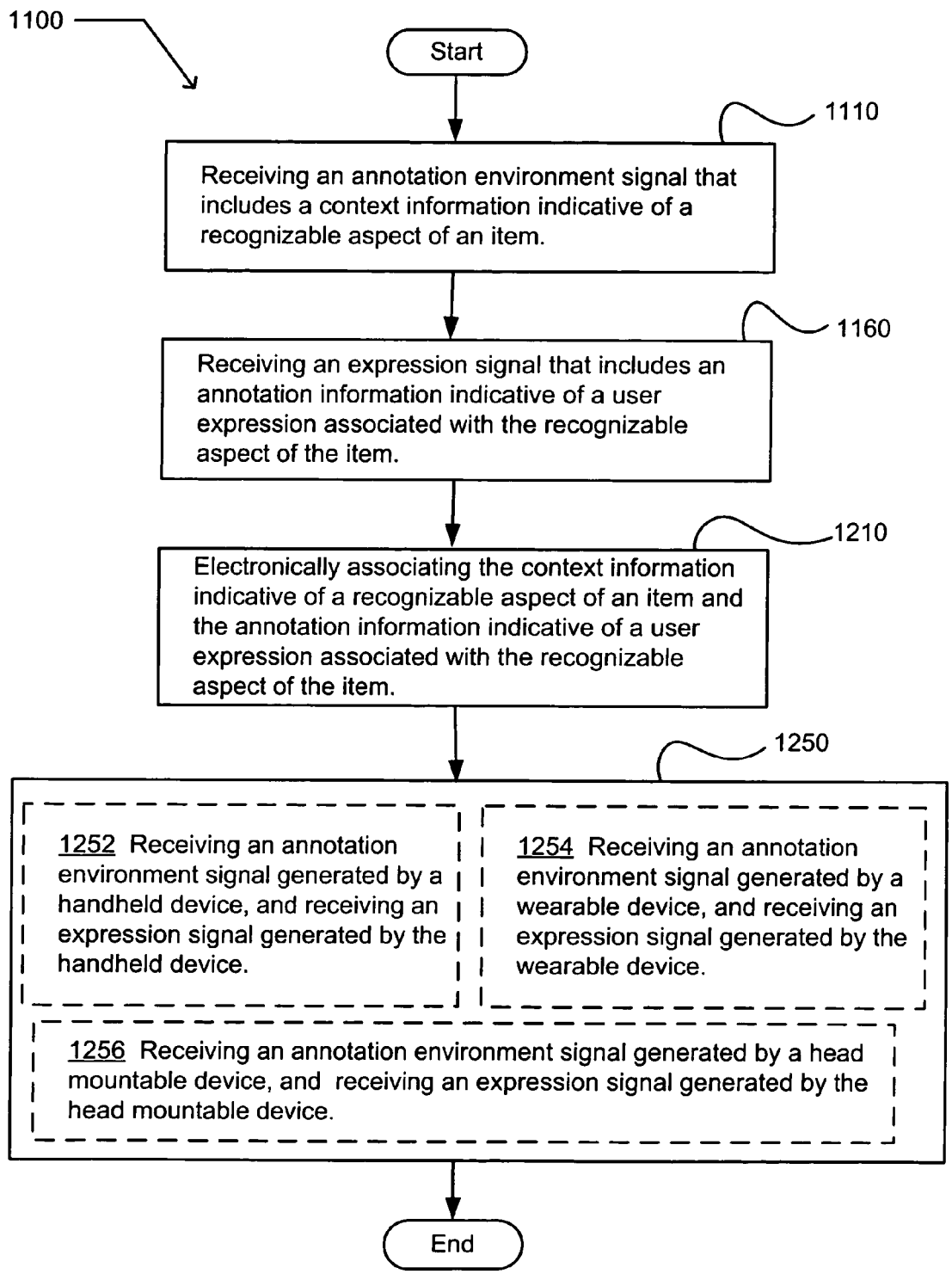
FIG. 37 illustrates another embodiment of the exemplary operational flow of FIG. 27.

FIG. 37 illustrates another embodiment of the exemplary operational flow 1100 of FIG. 27. The operational flow may include at least one additional operation, illustrated as an operation 1250. The operation 1250 may include an operation 1252, an operation 1254, and/or an operation 1256. The operation 1252 includes receiving an annotation environment signal generated by a handheld device, and includes receiving an expression signal generated by the handheld device. The operation 1254 includes receiving an annotation environment signal generated by a wearable device, and includes receiving an expression signal generated by the wearable device. The operation 1256 includes receiving an annotation environment signal generated by a head mountable device, and includes receiving an expression signal generated by the head mountable device.

Figure 38:
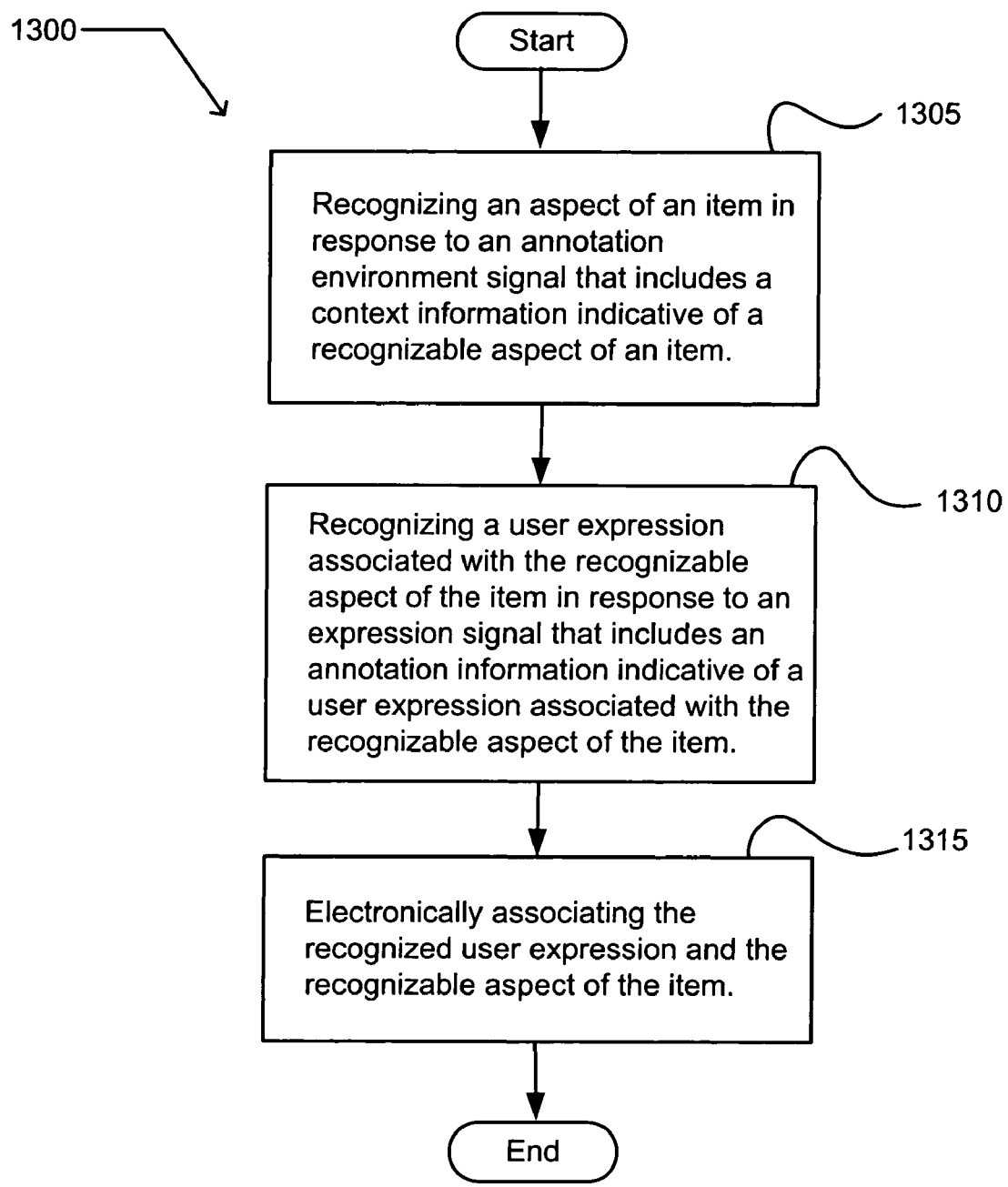
FIG. 38 illustrates an embodiment of logical operations that associate a user expression and a context of the user expression.

FIG. 38 illustrates an embodiment of logical operations 1300 that associate a user expression and a context of the user expression. After a start operation, the logical operations 1300 move to an identification operation 1305. The identification operation 1305 recognizes an aspect of an item in response to an annotation environment signal that includes a context information indicative of a recognizable aspect of an item. The annotation operation 1310 recognizes a user expression associated with the recognizable aspect of the item in response to an expression signal that includes an annotation information indicative of a user expression associated with the recognizable aspect of the item. A linking operation 1315 electronically associates the recognized user expression and the recognizable aspect of the item. The logical operations move to an end operation.

Figure 39:
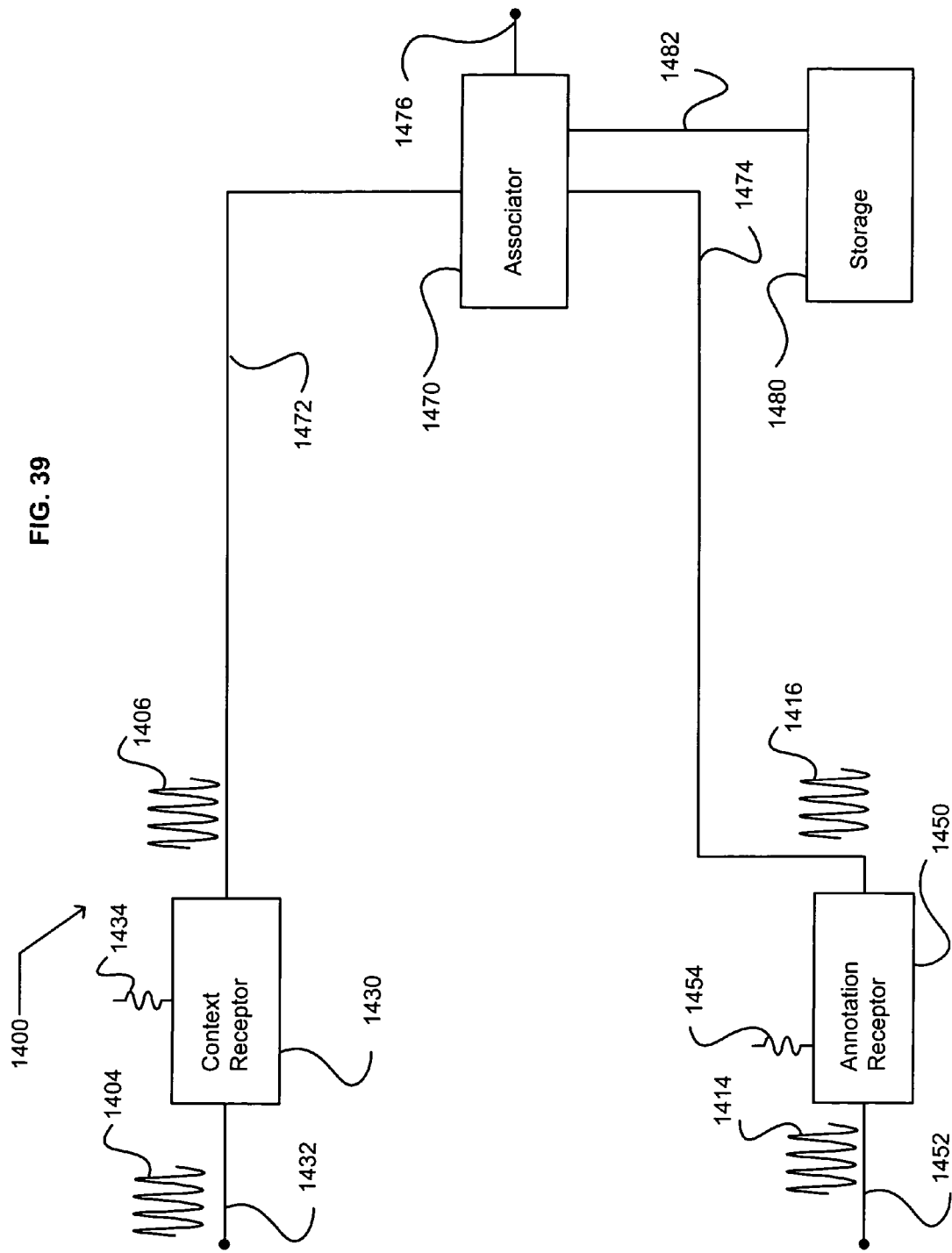
FIG. 39 illustrates an environment in which embodiments may be implemented.

FIG. 39 illustrates an environment 1400 in which embodiments may be implemented. The environment includes a context receptor module 1430, an annotation receptor module 1450, an associator module 1470, and an optional storage module 1480. The context receptor module and the associator module are coupled by a connector 1472. "Coupled" means either a direct electrical connection between the things that are coupled, or an indirect electrical connection through one or more passive or active intermediary devices. The annotation receptor module and the associator module are coupled by a connection 1474. The associator module and the storage module are coupled by a connector 1482.

The context receptor module 1430 includes operability to receive an annotation environment signal 1404 that includes a context information indicative of a recognizable aspect of an item. The annotation environment signal may be generated by any source. For example, sources of the annotation environment signal may include the exemplary handheld writing device 210 described in conjunction with FIG. 3, the exemplary apparatus 212 described in conjunction with FIG. 5, the exemplary handheld system 510 described in conjunction with FIG. 12, and/or the exemplary human wearable system 610 described in conjunction with FIG. 13. In an embodiment, the context receptor module includes wired connector 1432 that receives the annotation environment signal. In another embodiment, the context receptor module includes a wireless receiver or transceiver 1434 that receives the annotation environment signal. In an embodiment, the context receptor module receives the annotation environment signal 1432 and provides it substantially unchanged, illustrated as a signal 1406, to the associator 1470 over connection 1472. In another embodiment, the context receptor module may provide a processing of the annotation environment signal and provides it as a signal, illustrated as the signal 1406, to the associator. The processing of the annotation environment signal may include any level of processing. The processing may include a pre-recognition step and/or stage. In an embodiment, the processing may include assigning a time track to the annotation environment signal. In another embodiment, the processing may include slicing the annotation environment signal into segments, such as five-second time segments. Other embodiments may include marking segments of the annotation environment signal based on a location parameter, such as a location based upon GPS coordinates, temperature, an orientation parameter of a device that generated the annotation environment signal, such as a compass direction, and/or date. In an embodiment, the processing may include a noise reduction, and/or a conditioning.

The annotation receptor module 1450 includes operability to receive an expression signal 1414 that includes an annotation information indicative of a user expression associated with the recognizable aspect of the item. The expression signal may be generated by any source. For example, sources of the expression signal may include the exemplary handheld writing device 210 described in conjunction with FIG. 3, the exemplary apparatus 212 described in conjunction with FIG. 5, the exemplary handheld system 510 described in conjunction with FIG. 12, the exemplary human wearable system 610 described in conjunction with FIG. 13, the exemplary pen 720 described in conjunction with FIG. 17, and/or the exemplary stylus and/or stylus set 860 described in conjunction with FIG. 18. In an embodiment, the annotation receptor module includes wired connector 1452 that receives the expression signal. In another embodiment, the annotation receptor module includes a wireless receiver and/or transceiver 1454 that receives the expression signal. In an embodiment, the annotation receptor module receives the expression signal and provides it substantially unchanged, illustrated as a signal 1416, to the associator 1470 over connection 1474. In another embodiment, the context receptor module may provide a processing of the annotation environment signal before providing it, illustrated as the signal 1416, to the associator. The processing may include a pre-recognition step and/or stage. In an embodiment, the processing may include assigning a time track to the expression signal. In another embodiment, the processing may include slicing the expression signal into segments, such as five-second time segments. Other embodiments may include marking segments of the expression signal based on a location parameter, such as a location based upon GPS coordinates, temperature, an orientation parameter of a device that generated the expression signal, such as a compass direction, and/or a date. In an embodiment, the processing may include a noise reduction, and/or a conditioning.

The associator module 1476 includes operability to associate the context information indicative of a recognizable aspect of an item and the annotation information indicative of a user expression associated with the recognizable aspect of the item. In another embodiment, the associator module includes operability to establish a correlation between the context information indicative of a recognizable aspect of an item and the annotation information indicative of a user expression associated with the recognizable aspect of the item. The associator receives the signal 1406 provided by the context receptor module 1430 and the signal 1416 provided by the annotation receptor module 1450. The associator may associate the context information indicative of a recognizable aspect of an item and the annotation information indicative of a user expression associated with the recognizable aspect of the item using any suitable technique, manner, and/or method. For example, in an embodiment, the associator may associate the context information and the annotation information in response to a temporal aspect. In another embodiment, the associator may associate in response to a pre-recognition processing of the expression signal and/or the annotation environment signal. For example, the associator may associate in response to corresponding time segments of the expression signal and the annotation environment signal.

The storage module 1480 includes operability to save the electronically associated context information indicative of a recognizable aspect of an item and the annotation information indicative of a user expression associated with the recognizable aspect of the item. The storage module receives the electronically associated context information and annotation information from the associator module 1470 over the connector 1482. In an embodiment, the storage module may include any suitable computer-readable storage media, such as described in conjunction with FIGS. 1 and 2.

Figure 40:
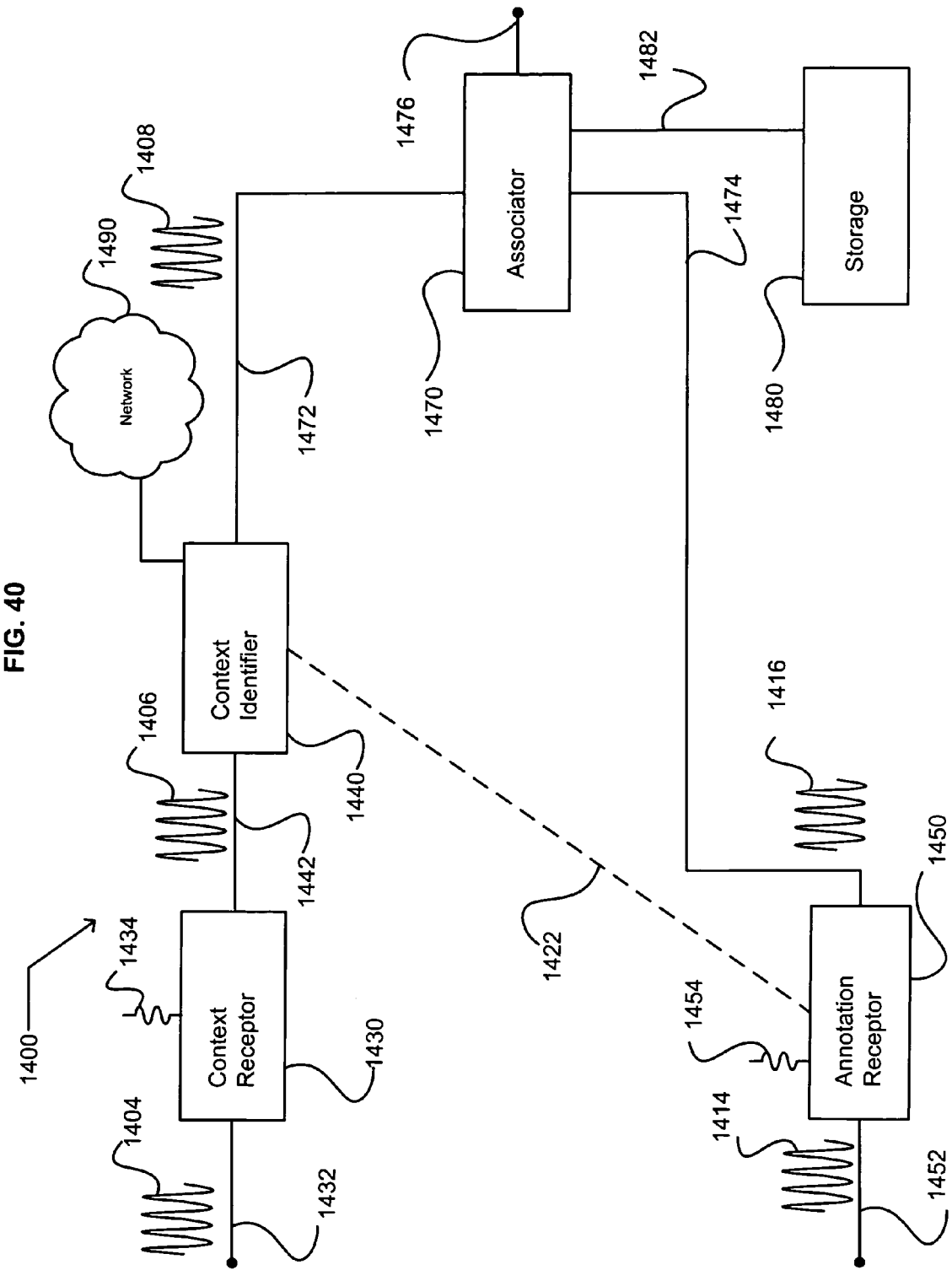
FIG. 40 illustrates an alternative embodiment of the environment of FIG. 39 in which embodiments may be implemented.

FIG. 40 illustrates an alternative embodiment of the environment 1400 of FIG. 39 in which embodiments may be implemented. The environment further includes a context identifier module 1440. A connector 1442 couples the context identifier module and the context receptor module 1430, such that the context identifier module receives the signal 1406 provided by the context receptor module. The connector 1472 couples context identifier module and the associator module 1470, such that the associator module receives a signal 1408 provided by the context identifier module. The context identifier module is coupled to a network 1490. In an embodiment, the network 1490 may include a local area network, a wide area network, and/or a public global network, such as the Internet. The context identifier module includes operability to recognize the recognizable aspect of an item in response to the context information indicative of a recognizable aspect of an item. The signal 1408 corresponds to a recognized aspect of an item.

In an alternative embodiment, the annotation receptor module 1450 and the context identifier module 1440 are coupled by a connector 1422 that is operable to communicate a first signal (not shown). In an embodiment, the first signal may include a first data signal provided by the annotation receptor module corresponding to an attribute of the expression signal, which may be used by the context identifier in recognizing the recognizable aspect of the item. For example, the first data signal may be responsive to a time track present in the expression signal. The time track may indicate when a preformed stylus touched a page of a document, such as the stylus 863 touching the surface 192 displaying the recognizable text content 868 of FIG. 18. The context identifier module may receive and recognize the recognizable aspect of an item in response to the first data signal and the context information indicative of a recognizable aspect of an item. In another embodiment, the first signal may include a first data signal provided by the context identifier module responsive to a recognized recognizable aspect of an item.

Figure 41:
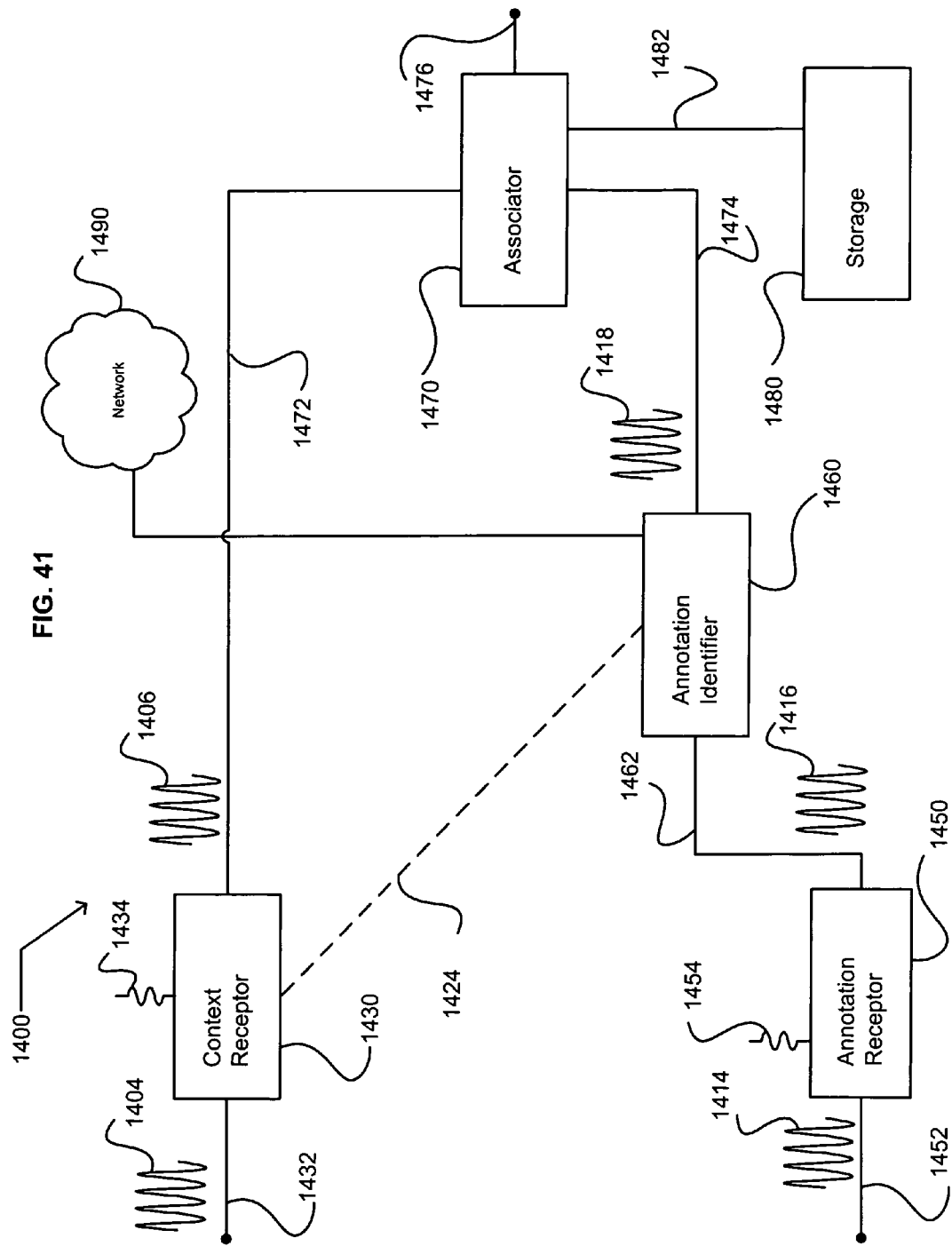
FIG. 41 illustrates an alternative embodiment of the environment of FIG. 39.

FIG. 41 illustrates an alternative embodiment of the environment 1400 of FIG. 39 in which embodiments may be implemented. The environment further includes an annotation identifier module 1460. A connector 1462 couples the annotation identifier module and the annotation receptor module 1450, such that the annotation identifier module receives the signal 1416 provided by the annotation receptor module. The connector 1474 couples the annotation identifier module and the associator module 1470, such that the associator module receives a signal 1418 provided by the annotation identifier module. The annotation identifier module is further coupled to the network 1490. In an embodiment, the annotation identifier module includes operability to recognize the user expression associated with the recognizable aspect of the item in response to the annotation information indicative of a user expression associated with the recognizable aspect of the item. The operability to recognize the user expression may include an operability to recognize the user expression at one or more levels of recognition. In an embodiment, the user expression may be recognized as an arrangement of pixels. In another embodiment, the user expression may be recognized as a character, such as an ASCII character, or such as a character of an Asian language. In a further embodiment, the user expression may be recognized as at least two line segments having a differing orientation. In another embodiment, the user expression may be recognized as a figure, such as a rectangle, and/or a human form. The signal 1418 corresponds to a recognized user expression associated with the recognizable aspect of the item.

In an alternative embodiment, the annotation identifier module 1460 and the context reception module 1430 are coupled by a connection 1424 operable to communicate a second signal (not shown). In an embodiment, the second signal may include a second data signal provided by the context receptor module corresponding to an attribute of the context information indicative of a recognizable aspect of an item. The second signal may be used by the annotation identifier module in recognizing the user expression associated with the recognizable aspect of the item. In another embodiment, the second signal may include a second data signal provided by the annotation identifier module corresponding to an attribute of the annotation information indicative of a user expression associated with the recognizable aspect of the item, which may be used by the context receptor.

Figure 42:
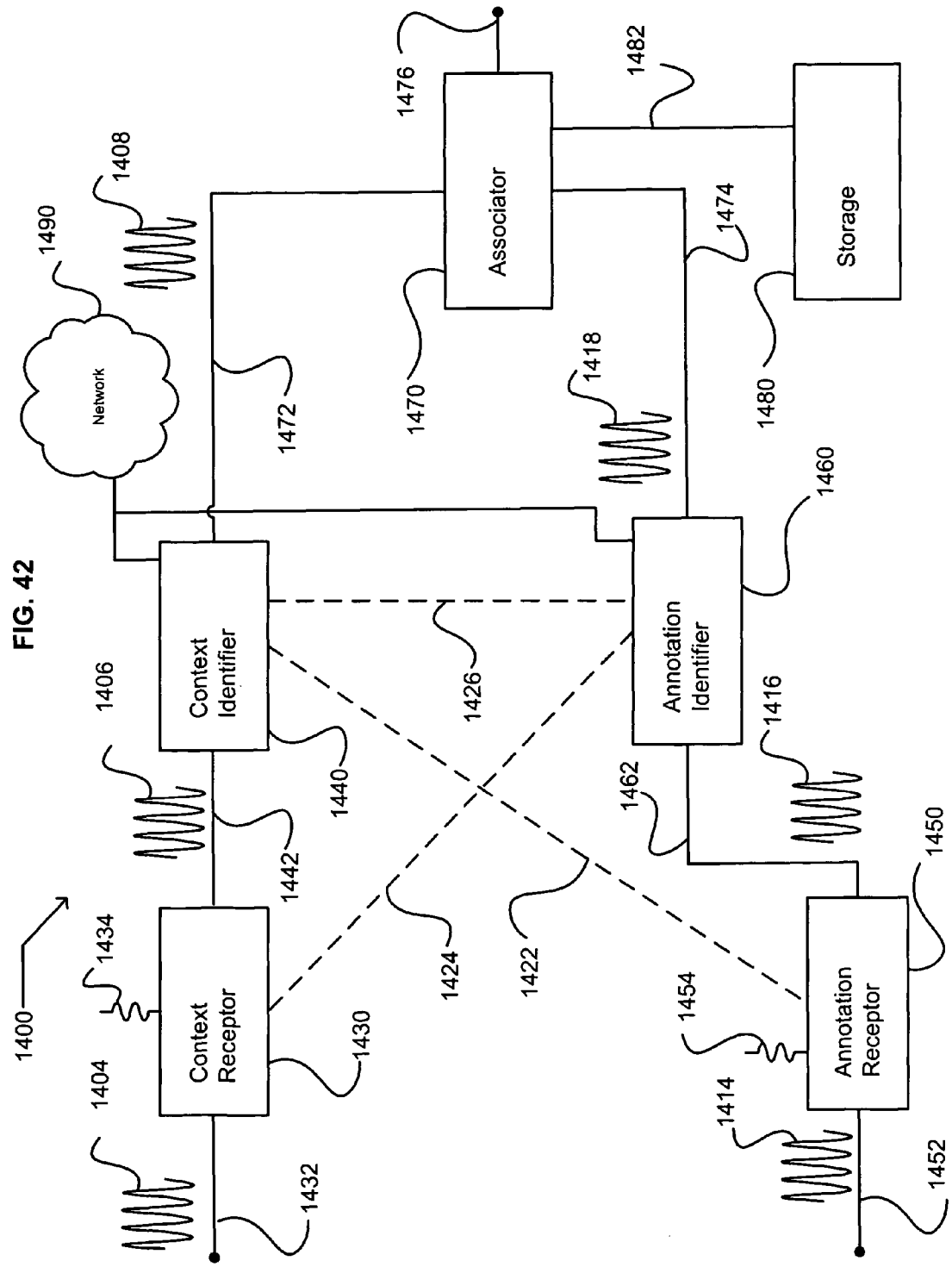
FIG. 42 illustrates an alternative embodiment of the environment of FIG. 39.

FIG. 42 illustrates an alternative embodiment of the environment 1400 of FIG. 39 in which embodiments may be implemented. The environment further includes the context identifier module 1440, the annotation identifier module 1460, the coupler 1422, the coupler 1424, and a coupler 1426. The context identifier module 1440 and the annotation identifier module 1460 are coupled by the coupler 1426. The coupler 1426 is configured to communicate a third signal (not shown). In an embodiment, the third signal may include a third data signal provided by the context identification module corresponding to an attribute of the recognized recognizable aspect of an item. The third signal may be used by the annotation identifier module in recognizing the user expression associated with the recognizable aspect of the item. In another embodiment, the third signal may include a third data signal provided by the annotation identifier module corresponding to an attribute of the annotation information indicative of a user expression associated with the recognizable aspect of the item, which may be used by the context identification module.

The context receptor module 1430, the context identifier module 1440, the annotation receptor module 1450, the annotation identifier module 1413, the associator module 1470, and/or the storage module 1480 may be implemented in any manner. In an embodiment, an implementation of a module may include an implementation in hardware, software, and/or firmware. In another embodiment, an implementation of a module may include a combination of hardware, software, and/or firmware. In a further embodiment, one or more of the modules may be implemented in a thin computing device, such as the thin computing device 20 of FIG. 1, and/or a computing system, such as the computing system environment 100 of FIG. 2.

FIG. 43 illustrates a partial view of an exemplary computer-program product 1500 that includes a computer program. The computer-program product includes a computer-readable signal-bearing media 1502 and program instructions 1504. The program includes operability to perform a process that associates information in a computer system. The process includes receiving an annotation environment signal that includes a context information indicative of a recognizable aspect of an item. The process also includes receiving an expression signal that includes an annotation information indicative of a user expression associated with the recognizable aspect of the item. The process further includes associating the context information indicative of a recognizable aspect of an item and the annotation information indicative of a user expression associated with the recognizable aspect of the item. The computer-readable signal-bearing media includes a computer-readable signal-bearing media bearing the program instructions. In an embodiment, program instructions may implemented in any manner. For example, the program instructions may be implemented in at least two sets of program instructions.

In an embodiment, the process may include recognizing the recognizable aspect of an item in response to the context information indicative of a recognizable aspect of an item 1506. In another embodiment, the process may includes recognizing the user expression associated with the recognizable aspect of the item in response to the annotation information indicative of a user expression associated with the recognizable aspect of the item 1508. In a further embodiment, the process may further include requesting a recognition of the recognizable aspect of the item from a remote computing device, and receiving the recognition of the recognizable aspect of the item from the remote computing device 1510. In an embodiment, the process may include saving the associated context information indicative of a recognizable aspect of an item and annotation information indicative of a user expression associated with the recognizable aspect of the item 1512.

In an embodiment, the signal-bearing media may include a computer storage media 1514. In another embodiment, the signal-bearing media may include a communications media 1516.

Figure 44:
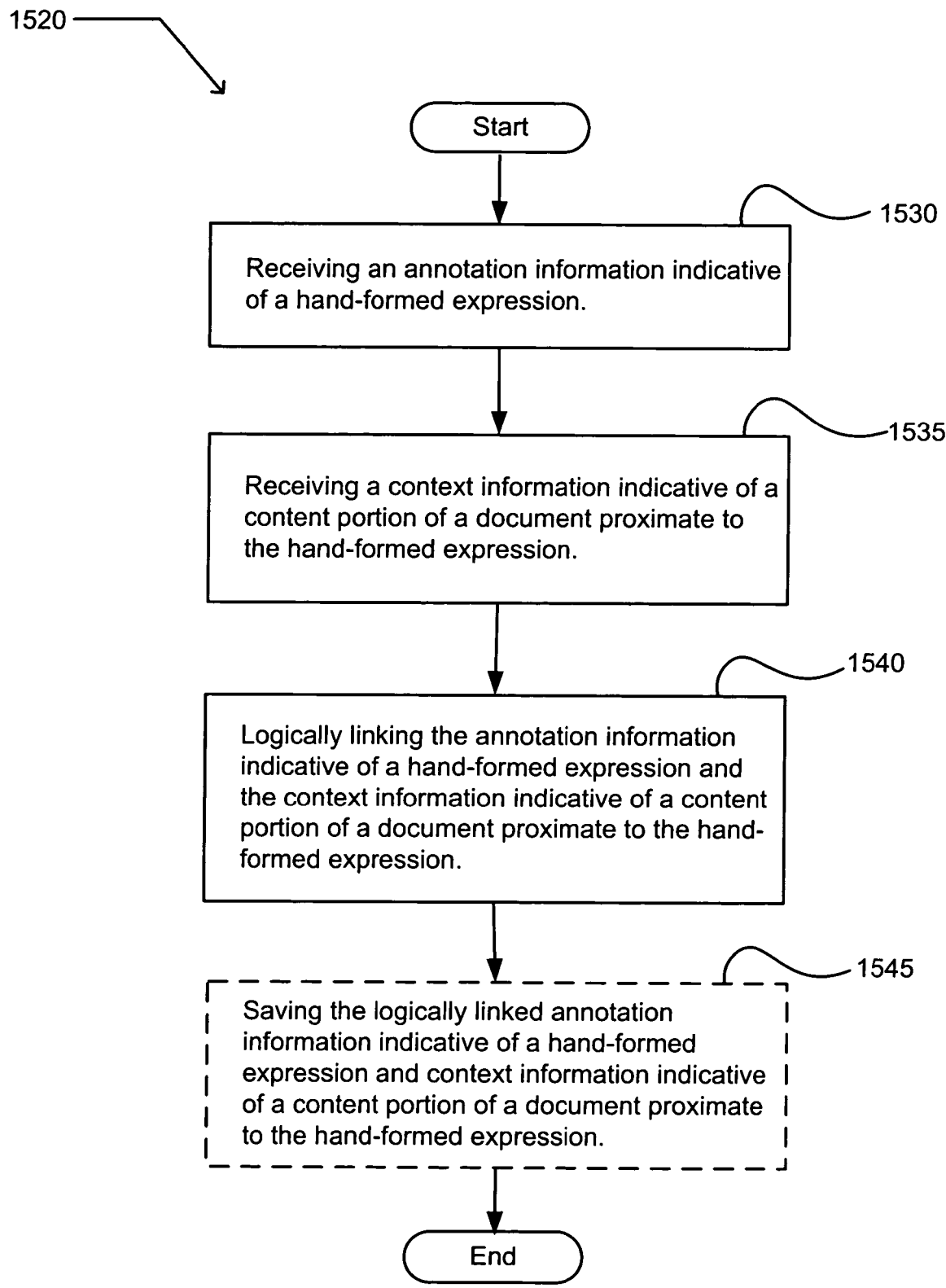
FIG. 44 illustrates an exemplary operational flow.

FIG. 44 illustrates an exemplary operational flow 1520. After a start operation, the flow moves to a first acquisition operation 1530. The first acquisition operation receives an annotation information indicative of a hand-formed expression. In an embodiment, the hand-formed expression may include a preformed expression, handwritten expression, a hand gesture, and/or a hand-driven expression. A second acquisition operation 1535 receives a context information indicative of a content portion of a document proximate to the hand-formed expression. An association operation 1540 logically links the annotation information indicative of a hand-formed expression and the context information indicative of a content portion of a document proximate to the hand-formed expression. The flow then moves to an end operation.

In an embodiment, the exemplary operational flow may include at least one additional operation, such as the storage operation 1545. The storage operation saves the logically linked annotation information indicative of a hand-formed expression and context information indicative of a content portion of a document proximate to the hand-formed expression.

Figure 45:
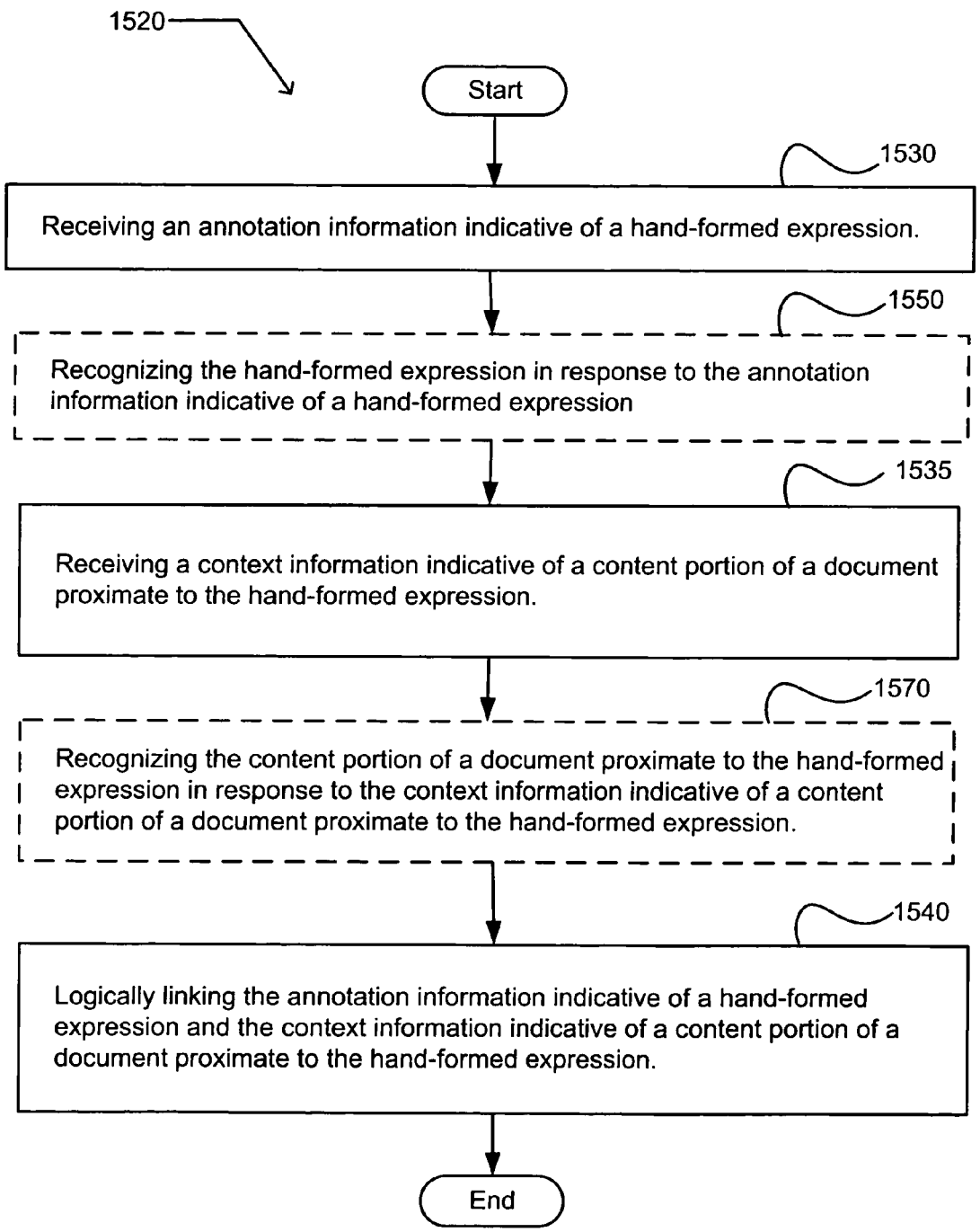
FIG. 45 illustrates an alternative embodiment of the exemplary operational flow of FIG. 44.

FIG. 45 illustrates an alternative embodiment of the exemplary operational flow 1520 of FIG. 44. The operational flow may include at least one additional operation, such as a content recognition operation 1550 and/or a context recognition operation 1570. The content recognition operation 1550 recognizes the hand-formed expression in response to the annotation information indicative of a hand-formed expression. The context recognition operation 1570 recognizes the content portion of a document proximate to the hand-formed expression in response to the context information indicative of a content portion of a document proximate to the hand-formed expression.

Figure 46:
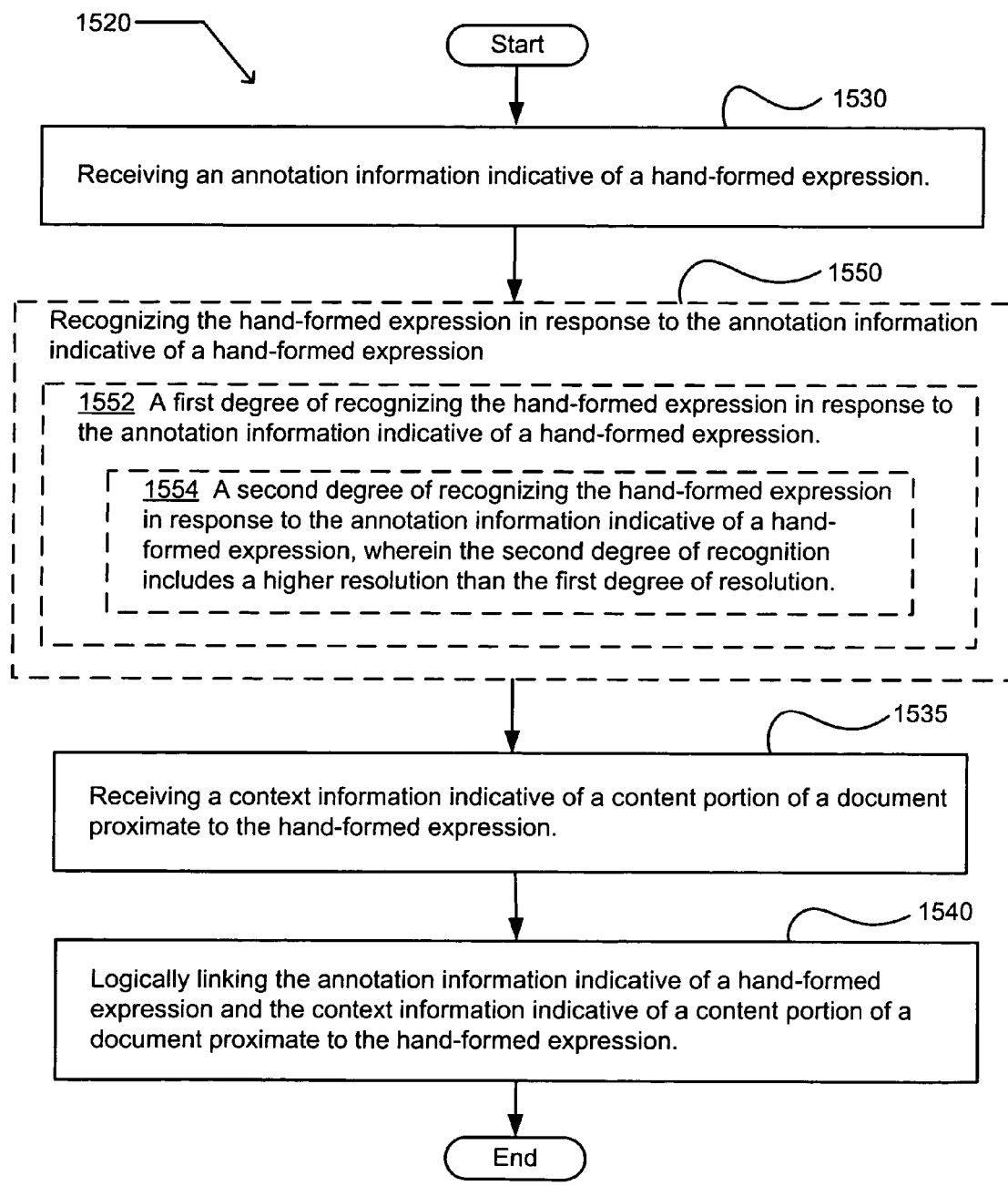
FIG. 46 illustrates an alternative embodiment of the content recognition operation of FIG. 45.

FIG. 46 illustrates an alternative embodiment of the content recognition operation 1550 of FIG. 45. The content recognition operation 1550 may include at least one additional operation, such as an operation 1552. The operation 1552 includes a first degree of recognizing the hand-formed expression in response to the annotation information indicative of a hand-formed expression. The operation 1552 may include at least one additional operation, such as an operation 1554. The operation 1554 includes a second degree of recognizing the hand-formed expression in response to the annotation information indicative of a hand-formed expression, wherein the second degree of recognizing includes a higher resolution than the first degree of recognizing.

Figure 47:
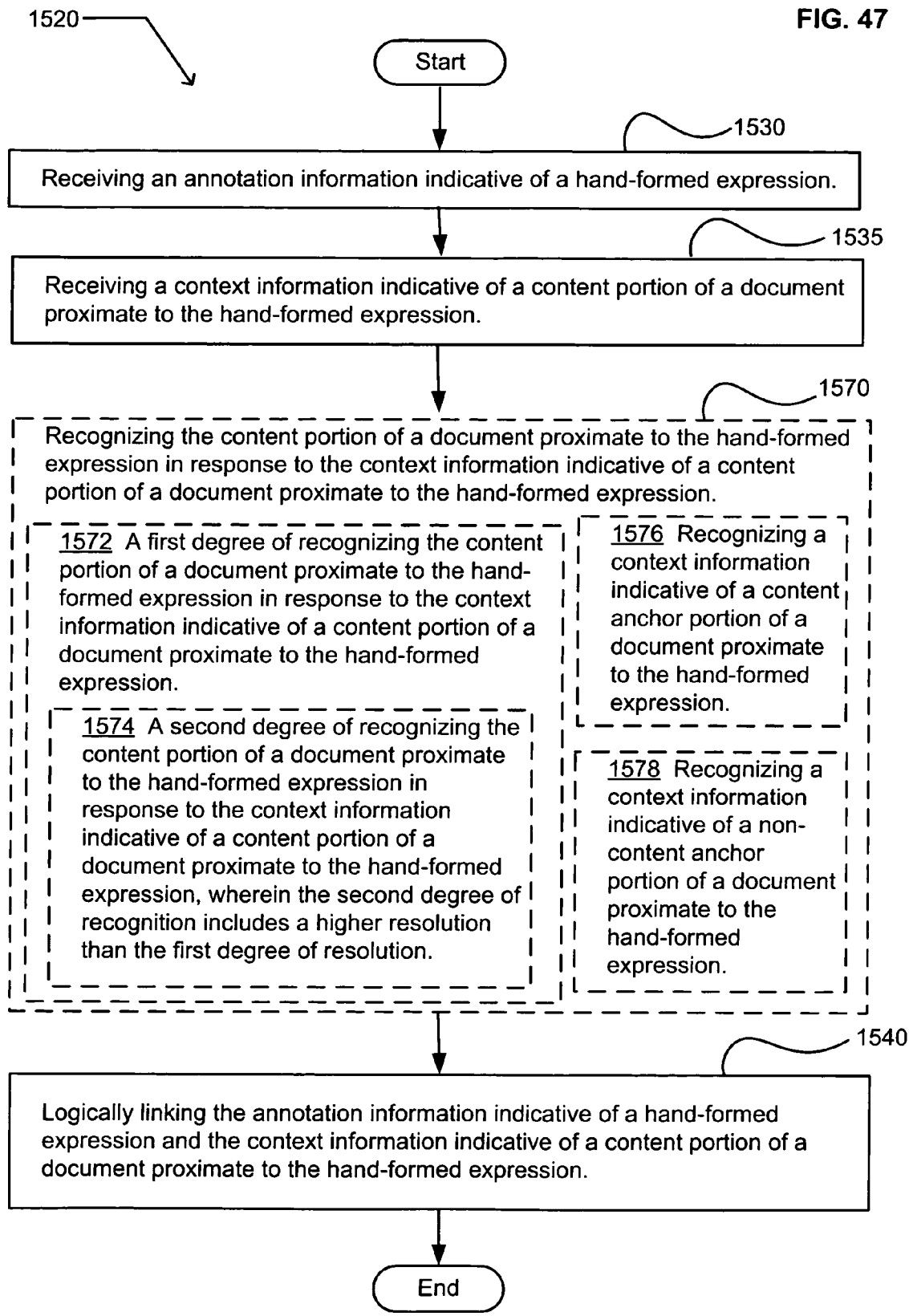
FIG. 47 illustrates an alternative embodiment of the context recognition operation of FIG. 45.

FIG. 47 illustrates an alternative embodiment of the context recognition operation 1570 of FIG. 45. The context recognition operation 1570 may include at least one additional operation, such as an operation 1572, an operation 1576, and/or an operation 1578. The operation 1572 includes a first degree of recognizing the content portion of a document proximate to the hand-formed expression in response to the context information indicative of a content portion of a document proximate to the hand-formed expression. The operation 1572 may include at least one additional operation, such as an operation 1574. The operation 1574 includes a second degree of recognizing the content portion of a document proximate to the hand-formed expression in response to the context information indicative of a content portion of a document proximate to the hand-formed expression, wherein the second degree of recognizing includes a higher resolution than the first degree of recognizing. The operation 1576 recognizes a context information indicative of a content anchor portion of a document proximate to the hand-formed expression. The operation 1578 recognizes a context information indicative of a non-content anchor portion of a document proximate to the hand-formed expression.

Figure 48:
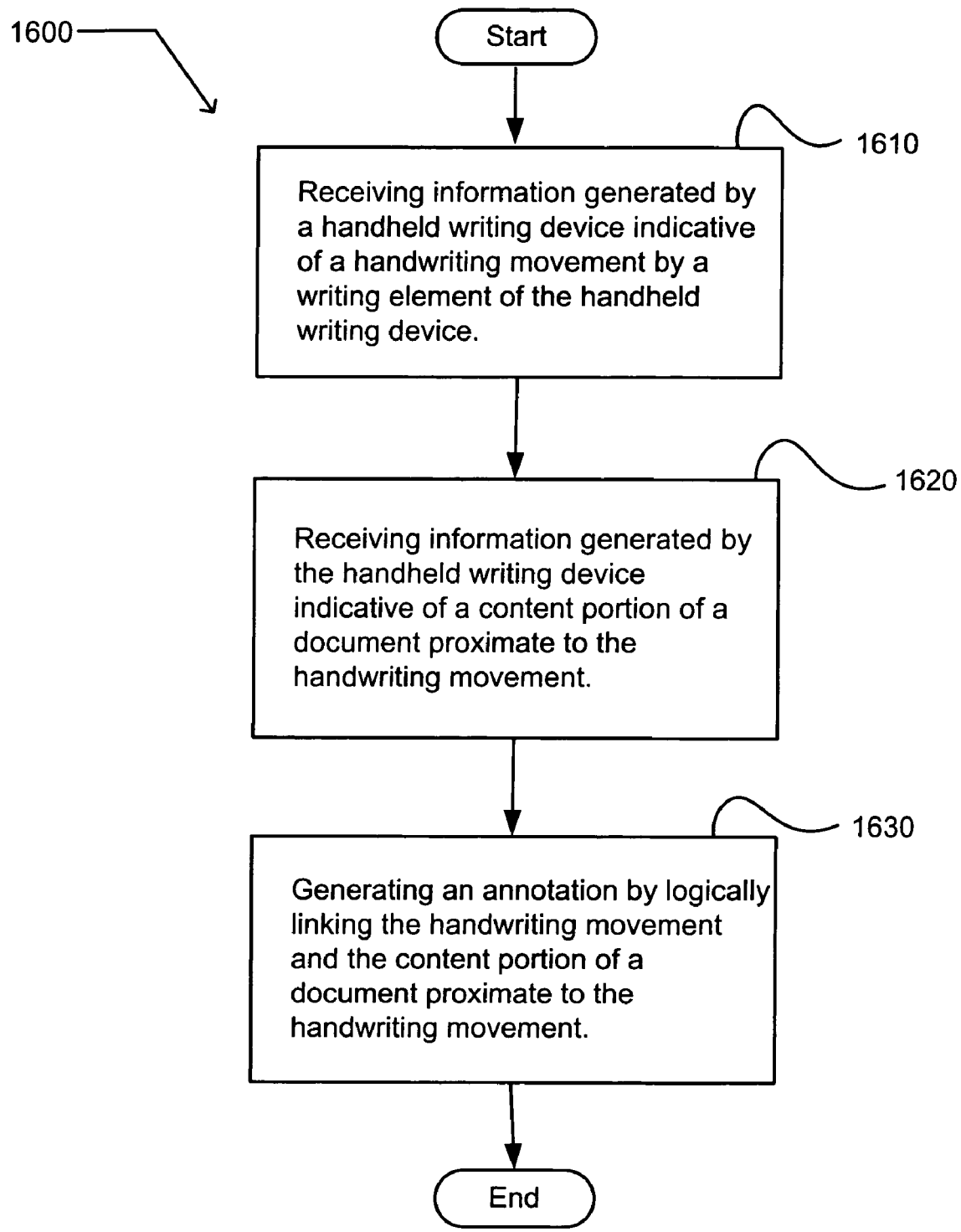
FIG. 48 illustrates an exemplary operational flow.

FIG. 48 illustrates an exemplary operational flow 1600. After a start operation, the flow moves to a content reception operation 1610. The content reception operation receives information generated by a handheld writing device indicative of a handwriting movement by a writing element of the handheld writing device. A context reception operation 1620 receives information generated by the handheld writing device indicative of a content portion of a document proximate to the handwriting movement. An association operation 1630 generates an annotation by logically linking the handwriting movement and the content portion of a document proximate to the handwriting movement.

FIG. 49 illustrates a partial view of an exemplary computer-program product 1650 that includes a computer program. The computer-program product includes a computer-readable signal-bearing media 1652 and program instructions 1654. The program instructions includes program instructions configured to perform a process that associates information in a computer system. The process includes receiving information generated by a handheld writing device indicative of a handwriting movement by a writing element of the handheld writing device. The process also includes receiving information generated by the handheld writing device indicative of a content portion of a document proximate to the handwriting movement. The process further includes generating an annotation by logically linking the handwriting movement and the content portion of a document proximate to the handwriting movement. The signal-bearing media may include a computer storage media 1656. The signal-bearing media may include a communication media 1658.

An embodiment provides a method. The method includes receiving an annotation environment signal that includes a context information indicative of a recognizable aspect of an item. The method also includes receiving an expression signal that includes an annotation information indicative of a user expression associated with the recognizable aspect of the item. The method further includes electronically associating the context information indicative of a recognizable aspect of an item and the annotation information indicative of a user expression associated with the recognizable aspect of the item. The method may further include saving the electronically associated context information indicative of a recognizable aspect of an item and annotation information indicative of a user expression associated with the recognizable aspect of the item.

The method may include recognizing the recognizable aspect of an item in response to the context information indicative of a recognizable aspect of an item. The recognizing the recognizable aspect of an item may include a first degree of recognizing the recognizable aspect of an item. The recognizing the recognizable aspect of an item may include a second degree of recognizing the recognizable aspect of an item, wherein the second degree of recognizing may include a higher resolution than the first degree of recognizing. The recognizing the recognizable aspect of an item in response to the context information indicative of a recognizable aspect of an item may include recognizing the recognizable aspect of an item in response to a parameter present in the context information indicative of a recognizable aspect of an item. The recognizing the recognizable aspect of an item in response to the context information indicative of a recognizable aspect of an item may include recognizing the recognizable aspect of an item in response to a pattern present in the context information indicative of a recognizable aspect of an item. The recognizing the recognizable aspect of an item may include requesting a recognition of the recognizable aspect of the item from a remote computing device, and receiving the recognition of the recognizable aspect of the item from the remote computing device. The recognizing the recognizable aspect of an item may include receiving a recognition of the recognizable aspect of the item from a remote computing device. The recognizing the recognizable aspect of an item may include recognizing the recognizable aspect of an item in response to the context information indicative of a recognizable aspect of an item and in response to the annotation information indicative of a user expression associated with the recognizable aspect of the item. The recognizing the recognizable aspect of an item may include recognizing a recognizable aspect of a canonical version of the item. The method may further include identifying the recognizable aspect of an item.

The method may further include recognizing the user expression associated with the recognizable aspect of the item in response to the annotation information indicative of a user expression associated with the recognizable aspect of the item. The recognizing the user expression associated with the recognizable aspect of the item may include a first degree of recognizing the user expression associated with the recognizable aspect of the item. The recognizing the user expression associated with the recognizable aspect of the item may include a second degree of recognizing the user expression associated with the recognizable aspect of the item, wherein the second degree of recognizing may include a higher resolution than the first degree of recognizing. The recognizing the user expression associated with the recognizable aspect of the item in response to the annotation information indicative of a user expression associated with the recognizable aspect of the item may include recognizing a parameter present in the annotation information indicative of a user expression associated with the recognizable aspect of the item. The recognizing the user expression associated with the recognizable aspect of the item in response to the annotation information indicative of a user expression associated with the recognizable aspect of the item may include recognizing a pattern present in the annotation information indicative of a user expression associated with the recognizable aspect of the item. The recognizing the user expression associated with the recognizable aspect of the item in response to the annotation information indicative of a user expression associated with the recognizable aspect of the item may include recognizing the user expression associated with the recognizable aspect of the item in response to a parameter present in the annotation information indicative of a user expression associated with the recognizable aspect of the item. The recognizing the user expression associated with the recognizable aspect of the item may include requesting a recognition of the user expression associated with the recognizable aspect of the item from a remote computing device, and receiving the recognition of the user expression associated with the recognizable aspect of the item from the remote computing device. The recognizing the user expression associated with the recognizable aspect of the item may include receiving the recognition of the user expression associated with the recognizable aspect of the item from a remote computing device. The recognizing the user expression associated with the recognizable aspect of the item may include recognizing the user expression associated with the recognizable aspect of the item in response to the context information indicative of a recognizable aspect of an item and in response to the annotation information indicative of a user expression associated with the recognizable aspect of the item. The method may further include identifying the user expression.

The electronically associating the context information indicative of a recognizable aspect of an item and the annotation information indicative of a user expression associated with the recognizable aspect of the item may include logically associating the context information indicative of a recognizable aspect of an item and the annotation information indicative of a user expression associated with the recognizable aspect of the item. The electronically associating the context information indicative of a recognizable aspect of an item and the annotation information indicative of a user expression associated with the recognizable aspect of the item may include temporally associating the context information indicative of a recognizable aspect of an item and the annotation information indicative of a user expression associated with the recognizable aspect of the item. The electronically associating the context information indicative of a recognizable aspect of an item and the annotation information indicative of a user expression associated with the recognizable aspect of the item may include correlating the context information indicative of a recognizable aspect of an item and the annotation information indicative of a user expression associated with the recognizable aspect of the item such that one of the information may be retrieved by referring to the other information. The electronically associating the context information indicative of a recognizable aspect of an item and the annotation information indicative of a user expression associated with the recognizable aspect of the item may include cohering the context information indicative of a recognizable aspect of an item and the annotation information indicative of a user expression associated with the recognizable aspect of the item. The electronically associating the context information indicative of a recognizable aspect of an item and the annotation information indicative of a user expression associated with the recognizable aspect of the item may include electronically associating a recognized recognizable aspect and a recognized user expression.

The receiving an annotation environment signal may include receiving an annotation environment signal generated by a handheld device. The receiving an annotation environment signal may include receiving an annotation environment signal generated by a wearable device. The receiving an annotation environment signal may include receiving an annotation environment signal generated by a head mountable device. The receiving an expression signal may include receiving an expression signal generated by a handheld device. The receiving an expression signal may include receiving an expression signal generated by a wearable device. The receiving an expression signal may include receiving an expression signal generated by a head mountable device. The receiving an annotation environment signal may include receiving an annotation environment signal generated by a handheld device, and the receiving an expression signal may include receiving an expression signal generated by the handheld device. The receiving an annotation environment signal may include receiving an annotation environment signal generated by a wearable device, and the receiving an expression signal may include receiving an expression signal generated by the wearable device. The receiving an annotation environment signal may include receiving an annotation environment signal generated by a head mountable device, and the receiving an expression signal may include receiving an expression signal generated by the head mountable device.

An embodiment provides a method. The method includes electronically associating a context information indicative of a recognizable item and an annotation information indicative of a user expression associated with the recognizable item. The method also includes saving the electronically associated context information indicative of an item and annotation information indicative of a user expression associated with the item. The context information indicative of a recognizable item may include a context information indicative of a recognizable aspect of an item, and the annotation information indicative of a user expression associated with the recognizable item may include annotation information indicative of a user expression associated with the recognizable aspect of the item.

Another embodiment provides a method. The method includes recognizing an aspect of an item in response to an annotation environment signal that may include a context information indicative of a recognizable aspect of an item. The method also includes recognizing a user expression associated with the recognizable aspect of the item in response to an expression signal that may include an annotation information indicative of a user expression associated with the recognizable aspect of the item. The method further includes electronically associating the recognized user expression and the recognizable aspect of the item.

A further embodiment provides a device. The device includes a context receptor module operable to receive an annotation environment signal that includes a context information indicative of a recognizable aspect of an item. The device also includes an annotation receptor module operable to receive an expression signal that includes an annotation information indicative of a user expression associated with the recognizable aspect of the item. The device further includes an associator module operable to associate the context information indicative of a recognizable aspect of an item and the annotation information indicative of a user expression associated with the recognizable aspect of the item. The device may include a context identifier module operable to recognize the recognizable aspect of an item in response to the context information indicative of a recognizable aspect of an item. The device may include a first coupler between the context identifier module and the annotation receptor module and operable to communicate a first signal. The device may include an annotation identifier module operable to recognize the user expression associated with the recognizable aspect of the item in response to the annotation information indicative of a user expression associated with the recognizable aspect of the item. The device may include a second coupler between the annotation identifier module and the context receptor module operable to communicate a second signal. The device may include a context identifier module operable to recognize the recognizable aspect of an item in response to the context information indicative of a recognizable aspect of an item, and an annotation identifier module operable to recognize the user expression associated with the recognizable aspect of the item in response to the annotation information indicative of a user expression associated with the recognizable aspect of the item. The device may include a third coupling between the annotation identifier module and the context identifier module operable to communicate a third signal. The associator module operable to associate the context information indicative of a recognizable aspect of an item and the annotation information indicative of a user expression associated with the recognizable aspect of the item may include an associator module operable to establish a correlation between the context information indicative of a recognizable aspect of an item and the annotation information indicative of a user expression associated with the recognizable aspect of the item. The device may further include a storage device operable to save the electronically associated context information indicative of a recognizable aspect of an item and the annotation information indicative of a user expression associated with the recognizable aspect of the item. The storage device may include a non-volatile storage device.

An embodiment provides a computer-program product. The computer-program product includes program instructions operable to perform a process that associates information in a computer system and a computer-readable signal-bearing media bearing the program instructions. The process includes receiving an annotation environment signal that includes a context information indicative of a recognizable aspect of an item, and receiving an expression signal that includes an annotation information indicative of a user expression associated with the recognizable aspect of the item. The process also includes associating the context information indicative of a recognizable aspect of an item and the annotation information indicative of a user expression associated with the recognizable aspect of the item. The process may further include recognizing the recognizable aspect of an item in response to the context information indicative of a recognizable aspect of an item. The process may further include recognizing the user expression associated with the recognizable aspect of the item in response to the annotation information indicative of a user expression associated with the recognizable aspect of the item. The process may further include requesting a recognition of the recognizable aspect of the item from a remote computing device, and receiving the recognition of the recognizable aspect of the item from the remote computing device. The process may further include saving the associated context information indicative of a recognizable aspect of an item and annotation information indicative of a user expression associated with the recognizable aspect of the item. The signal-bearing media may include a computer storage media. The signal-bearing media may include a communications media.

Another embodiment provides a method. The method includes receiving an annotation information indicative of a hand-formed expression. The method also includes receiving a context information indicative of a content portion of a document proximate to the hand-formed expression, and logically linking the annotation information indicative of a hand-formed expression and the context information indicative of a content portion of a document proximate to the hand-formed expression. The method may include recognizing the hand-formed expression in response to the annotation information indicative of a hand-formed expression. The recognizing the hand-formed expression in response to the annotation information indicative of a hand-formed expression may include a first degree of recognizing the hand-formed expression in response to the annotation information indicative of a hand-formed expression. The recognizing the hand-formed expression in response to the annotation information indicative of a hand-formed expression may include a second degree of recognizing the hand-formed expression in response to the annotation information indicative of a hand-formed expression, wherein the second degree of recognizing includes a higher resolution than the first degree of recognizing.

The method may further include recognizing the content portion of a document proximate to the hand-formed expression in response to the context information indicative of a content portion of a document proximate to the hand-formed expression. The recognizing the content portion of a document proximate to the hand-formed expression in response to the context information indicative of a content portion of a document proximate to the hand-formed expression may include a first degree of recognizing the content portion of a document proximate to the hand-formed expression in response to the context information indicative of a content portion of a document proximate to the hand-formed expression. The recognizing the content portion of a document proximate to the hand-formed expression in response to the context information indicative of a content portion of a document proximate to the hand-formed expression may include a second degree of recognizing the content portion of a document proximate to the hand-formed expression in response to the context information indicative of a content portion of a document proximate to the hand-formed expression, wherein the second degree of recognizing includes a higher resolution than the first degree of recognizing. The recognizing the context information indicative of a content portion of a document proximate to the hand-formed expression may include recognizing a context information indicative of a content anchor portion of a document proximate to the hand-formed expression. The recognizing the context information indicative of a content portion of a document proximate to the hand-formed expression may include recognizing a context information indicative of a non-content anchor portion of a document proximate to the hand-formed expression. The method may further include saving the logically linked annotation information indicative of a hand-formed expression and context information indicative of a content portion of a document proximate to the hand-formed expression.

A further embodiment provides a method. The method includes receiving information generated by a handheld writing device indicative of a handwriting movement by a writing element of the handheld writing device, and receiving information generated by the handheld writing device indicative of a content portion of a document proximate to the handwriting movement. The method also includes generating an annotation by logically linking the handwriting movement and the content portion of a document proximate to the handwriting movement.

An embodiment provides a computer-program product. The computer-program product includes program instructions configured to perform a process that associates information in a computer system and a computer-readable signal-bearing media bearing the program instructions. The process includes receiving information generated by a handheld writing device indicative of a handwriting movement by a writing element of the handheld writing device. The process also includes receiving information generated by the handheld writing device indicative of a content portion of a document proximate to the handwriting movement, and generating an annotation by logically linking the handwriting movement and the content portion of a document proximate to the handwriting movement. The signal-bearing media may include a computer storage media. The signal-bearing media may include a communication media.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will require optically-oriented hardware, software, and or firmware.

The foregoing detailed description has set forth various embodiments of the devices and/or processes via the use of block diagrams, flow diagrams, operation diagrams, flowcharts, illustrations, and/or examples. Insofar as such block diagrams, operation diagrams, flowcharts, illustrations, and/ or examples contain one or more functions and/or operations, it will be understood by those within the art that each function and/or operation within such block diagrams, operation diagrams, flowcharts, illustrations, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components.

While particular aspects of the present subject matter described herein have been shown and described, it will be apparent to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is solely defined by the appended claims.

What is claimed is:

1. A method comprising:
   receiving an annotation environment signal that includes a context information indicative of a recognizable aspect of an item, the recognizable aspect of the item being indicative of an incidental element capable of distinguishing the item, the incidental element comprising at least a physical attribute of the item;
   processing the annotation environment signal, the processing comprising at least a pre-recognition stage, a slicing stage, and a marking stage;
   receiving an expression signal that includes an annotation information indicative of a user expression associated with the recognizable aspect of the item; and electronically associating the context information indicative of a recognizable aspect of an item and the annotation information indicative of a user expression associated with the recognizable aspect of the item.

2. The method of claim 1, further comprising:
recognizing the recognizable aspect of an item in response to the context information indicative of a recognizable aspect of an item.

3. The method of claim 2, wherein the recognizing the recognizable aspect of an item includes recognizing the recognizable aspect of an item to a degree.

4. The method of claim 3, wherein the recognizing the recognizable aspect of an item to a degree includes recognizing a book in an environment.

5. The method of claim 3, wherein the recognizing the recognizable aspect of an item to a degree includes recognizing the recognizable aspect of an item to a first degree, and recognizing the recognizable aspect of an item to a second degree of recognizing includes a higher resolution than the first degree of recognizing.

6. The method of claim 5, wherein the recognizing the recognizable aspect of an item to a first degree includes recognizing a book in an environment, and the recognizing the recognizable aspect of an item to a second degree includes recognizing a title of the book in the environment.

7. The method of claim 2, wherein the recognizing the recognizable aspect of an item includes:
requesting a recognition of the recognizable aspect of the item from a remote computing device; and
receiving the recognition of the recognizable aspect of the item from the remote computing device.

8. The method of claim 2, wherein the recognizing the recognizable aspect of an item includes receiving a recognition of the recognizable aspect of the item from a remote computing device.

9. The method of claim 2, wherein the recognizing the recognizable aspect of an item includes recognizing the recognizable aspect of an item in response to the context information indicative of a recognizable aspect of an item and in response to the annotation information indicative of a user expression associated with the recognizable aspect of the item.

10. The method of claim 1, further comprising:
recognizing the user expression associated with the recognizable aspect of the item in response to the annotation information indicative of a user expression associated with the recognizable aspect of the item.

11. The method of claim 10, wherein the recognizing the user expression associated with the recognizable aspect of the item includes recognizing the user expression associated with the recognizable aspect of the item to a degree.

12. The method of claim 10, wherein the recognizing the user expression associated with the recognizable aspect of the item includes recognizing the user expression associated with the recognizable aspect of the item to a first degree, and recognizing the user expression associated with the recognizable aspect of the item to a second degree, wherein the second degree of recognizing includes a higher resolution than the first degree of recognizing.

13. The method of claim 10, wherein the recognizing the user expression associated with the recognizable aspect of the item includes:
requesting a recognition of the user expression associated with the recognizable aspect of the item from a remote computing device; and
receiving the recognition of the user expression associated with the recognizable aspect of the item from the remote computing device.

14. The method of claim 10, wherein the recognizing the user expression associated with the recognizable aspect of the item includes receiving the recognizition of the user expression associated with the recognizable aspect of the item includes receiving the recognition of the user expression associated with the recognizable aspect of the item from a remote computing device.

15. The method of claim 10, wherein the recognizing the user expression associated with the recognizable aspect of the item includes recognizing the user expression associated with the recognizable aspect of the item in response to the context information indicative of a recognizable aspect of an item and in response to the annotation information indicative of a user expression associated with the recognizable aspect of the item.

16. The method of claim 10, wherein the recognizable aspect of the item includes recognizing a spoken user expression associated with a recognizable aspect of a book in an environment, the recognizing being in response to a context information indicative of a recognizable aspect of the book and in response to the annotation information indicative of a spoken user expression associated with the title of the book.

17. The method of claim 10, further comprising:
identifying the user expression.

18. The method of claim 1, wherein the electronically associating the context information indicative of a recognizable aspect of an item and the annotation information indicative of a user expression associated with the recognizable aspect of the item includes logically associating the context information indicative of a recognizable aspect of an item and the annotation information indicative of a user expression associated with the recognizable aspect of the item.

19. The method of claim 1, wherein the electronically associating the context information indicative of a recognizable aspect of an item and the annotation information indicative of a user expression associated with the recognizable aspect of the item includes temporally associating the context information indicative of a recognizable aspect of an item and the annotation information indicative of a user expression associated with the recognizable aspect of the item.

20. The method of claim 1, wherein the electronically associating the context information indicative of a recognizable aspect of an item and the annotation information indicative of a user expression associated with the recognizable aspect of the item includes correlating the context information indicative of a recognizable aspect of an item and the annotation information indicative of a user expression associated with the recognizable aspect of the item such that one of the information may be retrieved by referring to the other information.

21. The method of claim 1, wherein the electronically associating the context information indicative of a recognizable aspect of an item and the annotation information indicative of a user expression associated with the recognizable aspect of the item includes electronically associating a recognized recognizable aspect and a recognized user expression.

22. The method of claim 1, wherein the receiving an annotation environment signal includes receiving an annotation environment signal generated by a handheld device, and the receiving an expression signal includes receiving an expression signal generated by the handheld device.

23. The method of claim 1, wherein the receiving an annotation environment signal includes receiving an annotation environment signal generated by a wearable device, and the receiving an expression signal includes receiving an expression signal generated by the wearable device.

24. The method of claim 1, further comprising:
saving the electronically associated context information indicative of a recognizable aspect of an item and annotation information indicative of a user expression associated with the recognizable aspect of the item.

25. A method comprising:
electronically associating a context information indicative of a recognizable item, the recognizable aspect of the item being indicative of an incidental element of distinguishing the item, capable of distinguishing the item, the incidental element comprising at least a physical attribute of the item, and an annotation information indicative of a user expression associated with the recognizable item;
processing the context information, the processing comprising at least a pre-recognition stage, a slicing stage, and a marking stage; and
saving the electronically associated context information indicative of a recognizable item and annotation information indicative of a user expression associated with the recognizable item.

26. The method of claim 25, wherein the context information indicative of a recognizable item includes a context information indicative of a recognizable aspect of an item and the annotation information indicative of a user expression associated with the recognizable item includes annotation information indicative of a user expression associated with the recognizable aspect of the item.

27. A method comprising:
recognizing an aspect of an item in response to an annotation environment signal that includes a context information indicative of a recognizable aspect of an item, the recognizable aspect of the item being indicative of an incidental element capable of distinguishing the item, the incidental element comprising at least a physical attribute of the item;
processing the annotation environment signal, the processing comprising at least a pre-recognition stage, a slicing stage, and a marking stage;
recognizing a user expression associated with the recognizable aspect of the item in response to an expression signal that includes an annotation information indicative of a user expression associated with the recognizable aspect of the item; and
electronically associating the recognized user expression and the recognizable aspect of the item.

28. A device comprising:
a context receptor module operable to:
receive an annotation environment signal that includes a context information indicative of a recognizable aspect of an item, the recognizable aspect of the item being indicative of an incidental element capable of distinguishing the item; and
process the annotation environment signal, the processing of the annotation environment signal comprising at least a pre-recognition stage, a slicing stage, and a marking stage;
an annotation receptor module operable to receive an expression signal that includes an annotation information indicative of a user expression associated with the recognizable aspect of the item; and
an associator module operable to associate the context information indicative of a recognizable aspect of an item and the annotation information indicative of a user expression associated with the recognizable aspect of the item.

29. The device of claim 28, further comprising:
a context identifier module operable to recognize the recognizable aspect of an item in response to the context information indicative of a recognizable aspect of an item.

30. The device of claim 29, further comprising:
a first coupler between the context identifier module and the annotation receptor module and operable to communicate a first signal.

31. The device of claim 28, further comprising:
an annotation identifier module operable to recognize the user expression associated with the recognizable aspect of the item in response to the annotation information indicative of a user expression associated with the recognizable aspect of the item.

32. The device of claim 31, further comprising:
a second coupler between the annotation identifier module and the context receptor module operable to communicate a second signal.

33. The device of claim 28, further comprising:
a context identifier module operable to recognize the recognizable aspect of an item in response to the context information indicative of a recognizable aspect of an item; and
an annotation identifier module operable to recognize the user expression associated with the recognizable aspect of the item in response to the annotation information indicative of a user expression associated with the recognizable aspect of the item.

34. The device of claim 33, further comprising:
a third coupling between the annotation identifier module and the context identifier module operable to communicate a third signal.

35. The device of claim 28, wherein the associator module operable to associate the context information indicative of a recognizable aspect of an item and the annotation information indicative of a user expression associated with the recognizable aspect of the item includes an associator module operable to establish a correlation between the context information indicative of a recognizable aspect of an item and the annotation information indicative of a user expression associated with the recognizable aspect of the item.

36. The device of claim 28, further comprising:
a storage device operable to save the electronically associated context information indicative of a recognizable aspect of an item and the annotation information indicative of a user expression associated with the recognizable aspect of the item.

37. The device of claim 36, wherein the storage device includes a non-volatile storage device.

38. A computer-program product, comprising:
a non-transitory computer-readable medium storing program instructions operable to perform a process that associates information in a computer system, the process comprising:
receiving an annotation environment signal that includes a context information indicative of a recognizable item, the recognizable item being indicative of an incidental element primarily employed by a non-human reader and capable of distinguishing the item, the incidental element comprising at least a physical attribute of the item;

processing the annotation environment signal, the processing comprising at least a pre-recognition stage, a slicing stage, and a marking stage;

receiving an expression signal that includes an annotation information indicative of a user expression associated with the recognizable item; and associating the context information indicative of a recognizable item and the annotation information indicative of a user expression associated with the recognizable item.

39. The computer-program product of claim 38, wherein the process further comprises:
recognizing the recognizable item in response to the context information indicative of a recognizable item.

40. The computer-program product of claim 38, wherein the process further comprises:
recognizing the user expression associated with the recognizable item in response to the annotation information indicative of a user expression associated with the recognizable item.

41. The computer-program product of claim 38, wherein the process further comprises:
requesting a recognition of the recognizable item from a remote computing device; and
receiving the recognition of the recognizable item from the remote computing device.

42. The computer-program product of claim 38, wherein the process further comprises:
saving the associated context information indicative of a recognizable item and annotation information indicative of a user expression associated with the recognizable item.

43. The computer-program product of claim 38, wherein the context information indicative of a recognizable item includes a context information indicative of a recognizable aspect of an item and the annotation information indicative of a user expression associated with the recognizable item includes annotation information indicative of a user expression associated with the recognizable aspect of the item.

44. The method of claim 1, wherein the pre-recognition stage is a first degree of recognition.

45. The method of claim 1, wherein the pre-recognition stage is a continuum of recognition ranging from a minimal recognition to a complete recognition.

46. The method of claim 1, wherein the slicing stage includes at least slicing the annotation environment signal into one or more temporal segments.

47. The method of claim 1, wherein the marking stage includes marking segments of the annotation environment signal based upon at least one of one or more GPS coordinates, and/or a temperature, and/or an orientation parameter of a device that generated the annotation signal.

48. The method of claim 25, wherein the pre-recognition stage is a first degree of recognition.

49. The method of claim 25, wherein the pre-recognition stage is a continuum of recognition ranging from a minimal recognition to a complete recognition.

50. The method of claim 25, wherein the slicing stage includes at least slicing the annotation environment signal into one or more temporal segments.

51. The method of claim 25, wherein the marking stage includes marking segments of the annotation environment signal based upon at least one of one or more GPS coordinates, and/or a temperature, and/or an orientation parameter of a device that generated the annotation signal.

52. The method of claim 27, wherein the pre-recognition stage is a first degree of recognition.

53. The method of claim 27, wherein the pre-recognition stage is a continuum of recognition ranging from a minimal recognition to a complete recognition.

54. The method of claim 27, wherein the slicing stage includes at least slicing the annotation environment signal into one or more temporal segments.

55. The method of claim 27, wherein the marking stage includes marking segments of the annotation environment signal based upon at least one of one or more GPS coordinates, and/or a temperature, and/or an orientation parameter of a device that generated the annotation signal.

56. The device of claim 28, wherein the pre-recognition stage is a first degree of recognition.

57. The device of claim 28, wherein the pre-recognition stage is a continuum of recognition ranging from a minimal recognition to a complete recognition.

58. The device of claim 28, wherein the slicing stage includes at least slicing the annotation environment signal into one or more temporal segments.

59. The device of claim 28, wherein the marking stage includes marking segments of the annotation environment signal based upon at least one of one or more GPS coordinates, and/or a temperature, and/or an orientation parameter of a device that generated the annotation signal.

60. The computer-program product of claim 38, wherein the prerecognition stage is a first degree of recognition.

61. The computer-program product of claim 38, wherein the prerecognition stage is a continuum of recognition ranging from a minimal recognition to a complete recognition.

62. The computer-program product of claim 38, wherein the slicing stage includes at least slicing the annotation environment signal into one or more temporal segments.

63. The computer-program product of claim 38, wherein the marking stage includes marking segments of the annotation environment signal based upon at least one of one or more GPS coordinates, and/or a temperature, and/or an orientation parameter of a device that generated the annotation signal.

* * * * *